United States Patent [19]
Yano et al.

[11] Patent Number: 6,035,308
[45] Date of Patent: Mar. 7, 2000

[54] SYSTEM AND METHOD OF MANAGING DOCUMENT DATA WITH LINKING DATA RECORDED ON PAPER MEDIA

[75] Inventors: Takashi Yano, Tokyo; Yasuhiro Tabata; Hisashi Ishijima, both of Yokohama, all of Japan

[73] Assignee: Ricoh Company, Ltd., Tokyo, Japan

[21] Appl. No.: 08/710,662

[22] Filed: Sep. 23, 1996

[30] Foreign Application Priority Data

Sep. 21, 1995 [JP] Japan .................................. 7-242747
Dec. 2, 1995 [JP] Japan .................................. 7-338187

[51] Int. Cl.$^7$ .................................................. G06F 17/21
[52] U.S. Cl. .......................... 707/501; 707/514; 707/515
[58] Field of Search .................................. 707/515, 526, 707/529, 501, 514

[56] References Cited

U.S. PATENT DOCUMENTS

| | | | |
|---|---|---|---|
| 4,153,931 | 5/1979 | Green et al. ............................... | 707/104 |
| 5,208,905 | 5/1993 | Takakura et al. ......................... | 707/515 |
| 5,231,516 | 7/1993 | Kamon et al. ............................ | 358/449 |
| 5,339,137 | 8/1994 | Kusumoto et al. ........................ | 399/50 |
| 5,479,515 | 12/1995 | Longacre, Jr. ............................ | 380/54 |
| 5,495,581 | 2/1996 | Tsai ........................................... | 707/526 |
| 5,513,264 | 4/1996 | Wang et al. ............................... | 380/51 |
| 5,522,921 | 6/1996 | Custer ....................................... | 106/31.15 |
| 5,710,634 | 1/1998 | Kuriyama et al. ........................ | 358/296 |
| 5,717,940 | 2/1998 | Peairs ....................................... | 705/515 |
| 5,765,176 | 6/1998 | Bloomberg ............................... | 707/529 |

FOREIGN PATENT DOCUMENTS

| | | | |
|---|---|---|---|
| 0 219 879 A2 | 2/1985 | European Pat. Off. ......... | G07F 7/10 |
| 2 191 611 | 5/1986 | United Kingdom ............. | G06F 3/02 |
| 2 199 679 | 7/1988 | United Kingdom ............. | G06F 15/42 |

Primary Examiner—James P. Trammell
Assistant Examiner—John Leonard Young
Attorney, Agent, or Firm—McDermott, Will & Emery

[57] ABSTRACT

A document data administrating system comprises a filing means for previously storing data related to particular words, texts, symbols, or graphics as related data files; medium paper in which at least one piece of description data, linking data, and selection data; a reading means for reading out selection data and linking data from the medium data; a searching means for searching corresponding related data files from the filing means according to the selection data and linking data each read out by the reading means; and an outputting means for outputting the related data files each searched by the searching means.

134 Claims, 64 Drawing Sheets

FIG.5

| Dicon | FORM OF DATA | DISPLAYED CONTENTS OF Dicons | CORRESPONDING CONTENTS OF DATA IN RELATED DATA FILE |
|---|---|---|---|
| TITLE Dicon | TEXT | TITLE | DOCUMENT |
| TEXT Dicon | TEXT | REFERENCE<br>ABSTACT<br>WORD<br>PERSON'S NAME<br>· | DOCUMENT<br>ENTIRE TEXT<br>COMMENTARY<br>PERSONAL REPORT<br>(MOVING PICTURE NOTE1, VOICE NOTE2)<br>· |
| SYMBOL Dicon | GRAPHIC | SYMBOL MARK<br>SIZE-REDUCED DISPLAY IN COVER OF DOCUMENT | DOCUMENT<br>(MOVING PICTURE NOTE1, VOICE NOTE2)<br>DOCUMENT |
| GRAPHIC Dicon | GRAPHIC | DISPLAY REDUCED<br>MONOCHROME<br>DITHER<br>· | ORIGINAL SIZE<br>FULL COLOR<br>GRAY SCALE<br>· |

NOTE 1) DISPLAY UNIT REQUIRED AS OUTPUTTING MEANS
NOTE 2) VOICE SYNTHESIZING DEVICE REQUIRED AS OUTPUTTING MEANS

FIG.7A
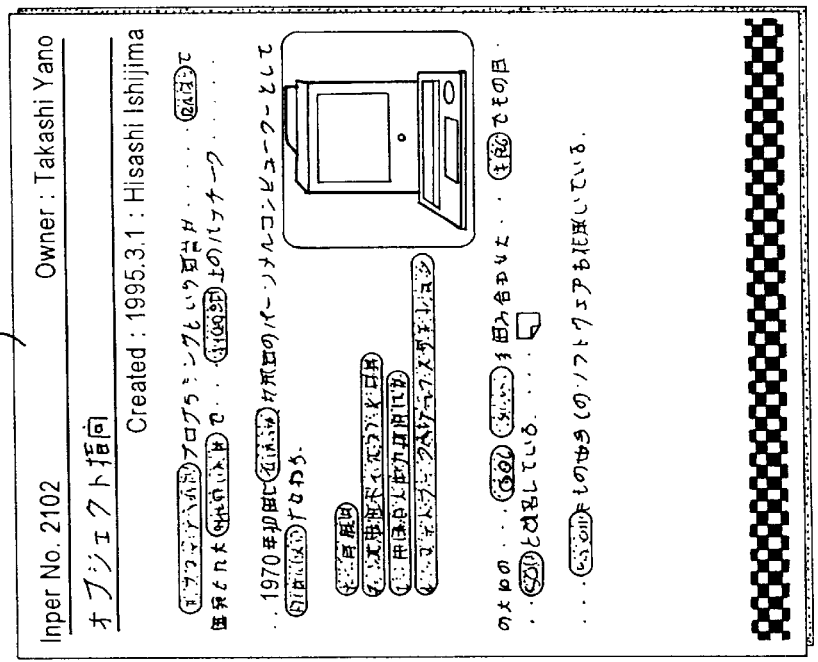
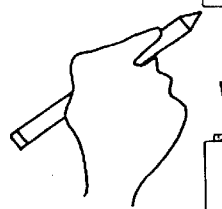
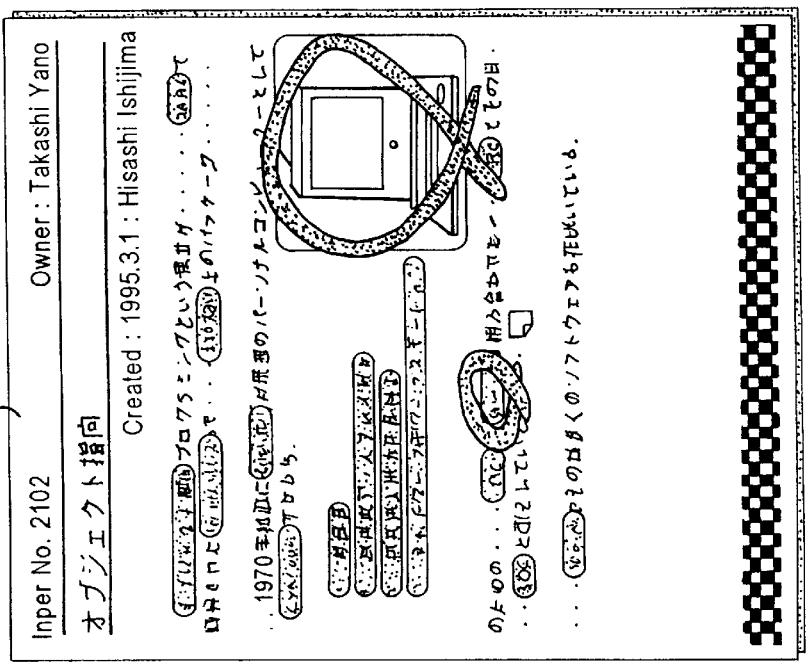

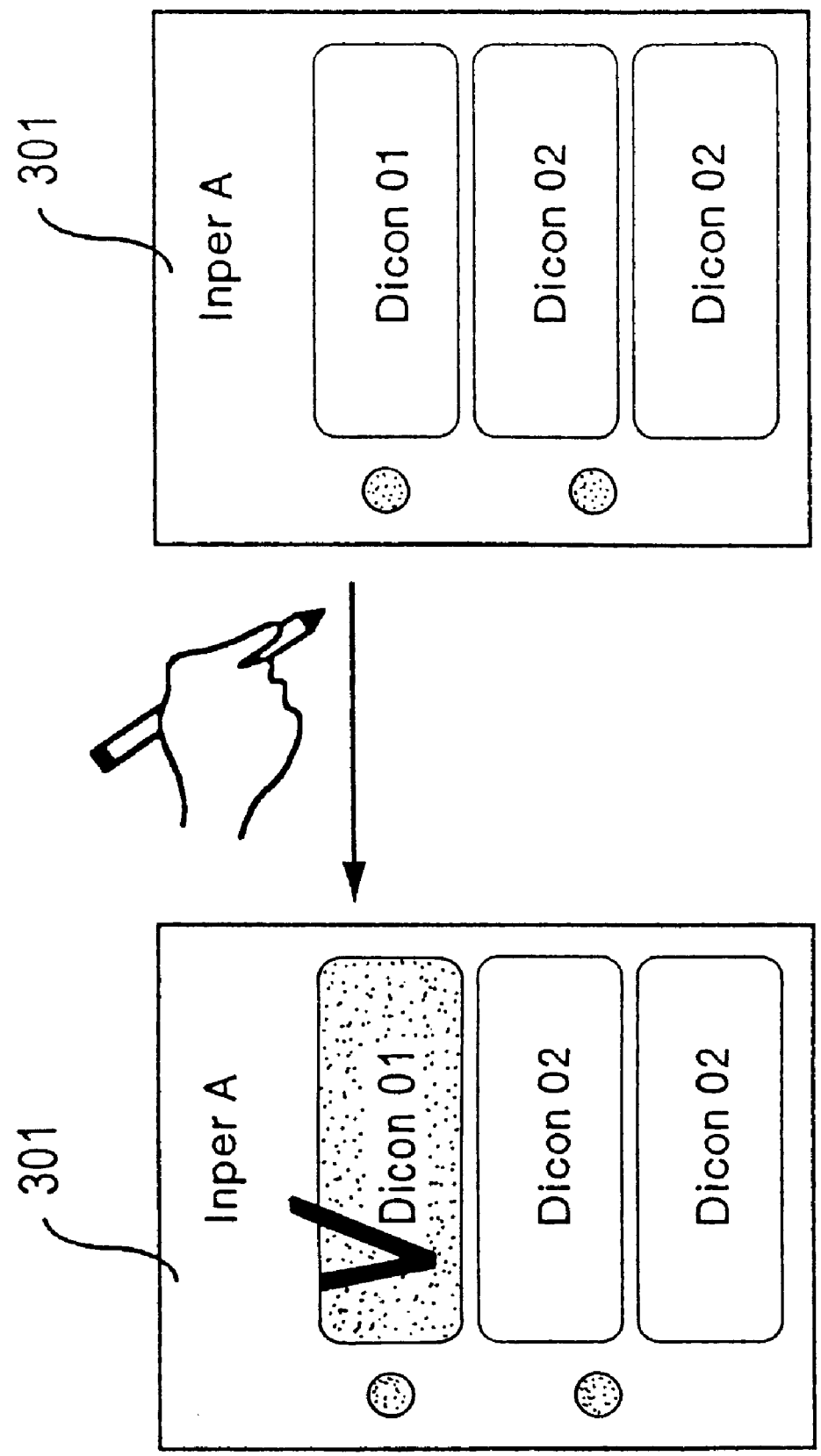

FIG.9

LINKING DATA TABLE
(ADDRESS CONVERSION TABLE)

| DESCRIPTION POSITION DATA (Dicon No.) | ADDRESS DATA (ADDRESS OF RELATED DATA FILE) |
|---|---|
| 01 | 002002 |
| 02 | 004588 |
| 03 | 003224 |
| 04 | 009896 |
| 05 | 001124 |
| • | • |
| • | • |
| 17 | 006520 |

FIG.10A

LINKING DATA TABLE

| DESCRIPTION POSITION DATA (Dicon No.) | DESCRIPTION RECOGNIZING DATA (Dicon ID) |
|---|---|
| 01 | 001325 |
| 02 | 001911 |
| 03 | 001326 |
| 04 | 001328 |
| 05 | 003002 |
| . | . |
| . | . |
| 17 | 005014 |

FIG.10B

ADDRESS CONVERSION TABLE

| DESCRIPTION RECOGNIZING DATA (Dicon ID) | ADDRESS DATA (ADDRESS OF RELATED DATA FILE) |
|---|---|
| 001325 | 002002 |
| 001911 | 004588 |
| 001326 | 003224 |
| 001328 | 009896 |
| 003002 | 001124 |
| . | . |
| . | . |
| 005014 | 006520 |

DIALOG IN PREPARING Inper

DIALOG IN RELATED DATA FILE

LAYERED LINK

MULTI-DIMENSIONAL LINK

INTERACTED LINK

COMBINATION OF MULTI-DIMENSIONAL LINK
AND INTERACTED LINK

LAYERED LINK

COMBINATION OF LAYERED LINK
AND MULTI-DIMENSIONAL LINK

COMBINATION OF LAYERED LINK, MULTI-DIMENSIONNAL LINK AND INTERACTED LINK

SECOND EXAMPLE OF HARDWARE CONFIGURATION
(SYSTEM OF STANDALONE CONFIGURATION USING SCANNER/PRINTER)

THIRD EXAMPLE OF HARDWARE CONFIGURATION
(SYSTEM OF STANDALONE CONFIGURATION
USING COPYING DEVICE)

SIXTH EXAMPLE OF HARDWARE CONFIGURATION
(NETWORK SYSTEM IN WHICH READING MEANS AND
OUTPUTTING MEANS ARE INTEGRATED AS COPYING DEVICE)

Owner : Takashi Yano
最近のPARCの研究成果
Created : 1991.5.6 : Hisashi Ishijima

FIG.26

| [添付情報] | |
|---|---|
| Inper | Dicon |
| オブジェクト指向 | SmallTalk80 |
| Inper ID ;001103 | Dicon ID : 001326 |

— 2601

Owner : Takashi Yano

最近のPARCの研究成果

Created : 1991.5.6 : Hisashi Ishijima

— 2401

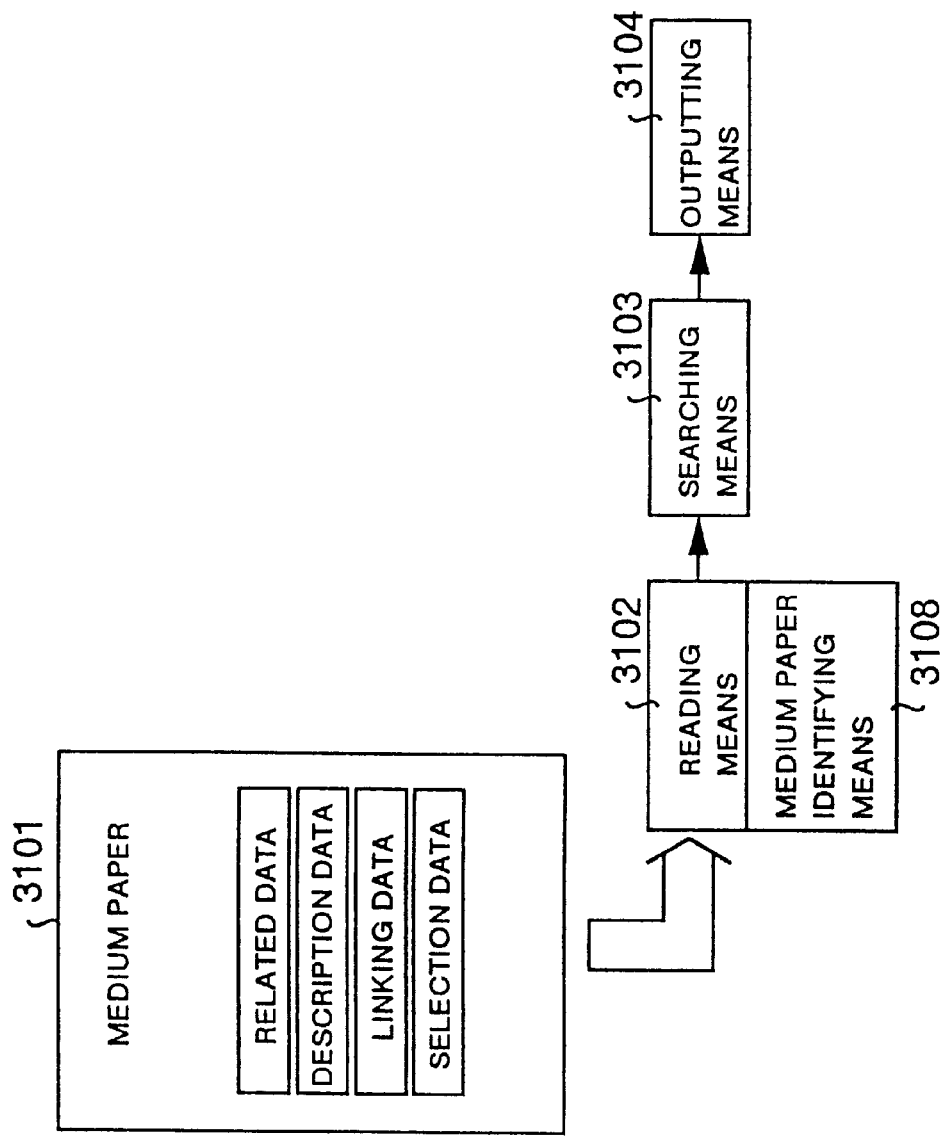

FIG. 38A
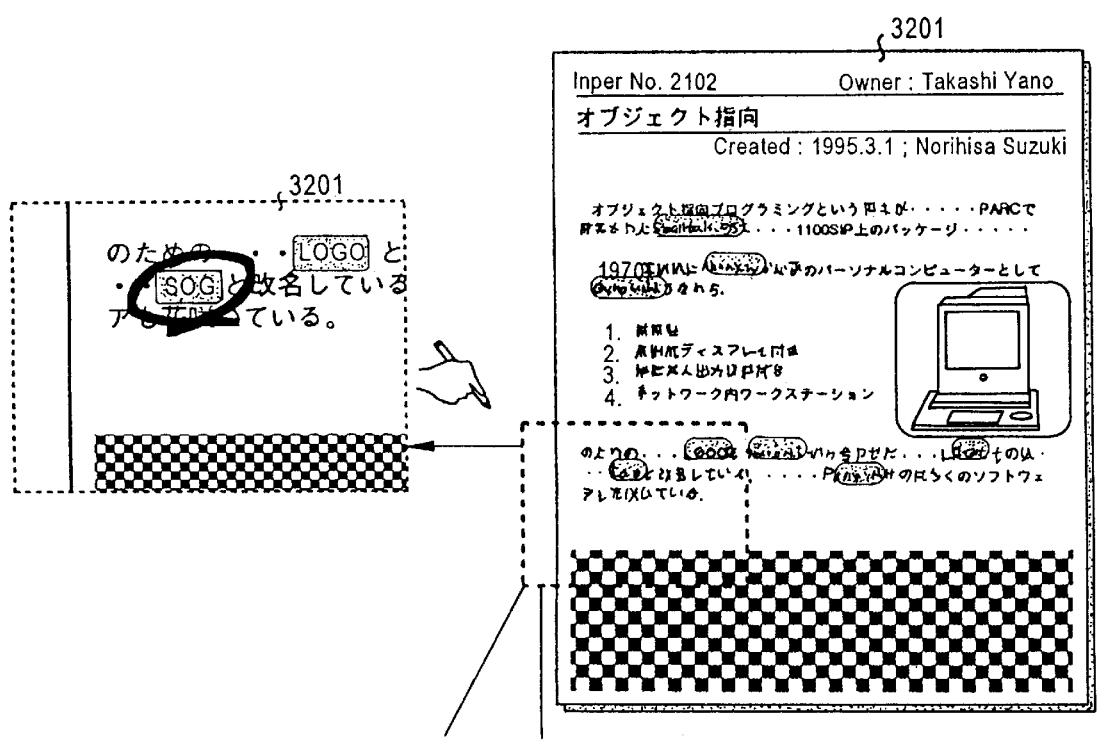
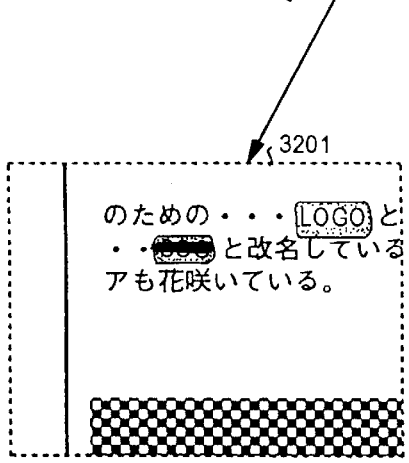
FIG. 38B
FIG. 38C

LINKING DATA TABLE ON CODE AREA
(ADDRESS CONVERSION TABLE)

| DESCRIPTION POSITION DATA (Dicon No.) | ADDRESS DATA (ADDRESS OF RELATED DATA ON CODE AREA) |
|---|---|
| 01 | 00201 |
| 02 | 00202 |
| 03 | 00203 |
| ⋮ | ⋮ |
| 09 | 00209 |

FIG.41A

LINKING DATA TABLE

| DESCRIPTION POSITION DATA (Dicon No.) | DESCRIPTION RECOGNIZING DATA (Dicon ID) |
|---|---|
| 01 | 001325 |
| 02 | 001911 |
| 03 | 001326 |
| 04 | 001328 |
| 05 | 003002 |
| . | . |
| . | . |
| 17 | 005014 |

FIG.41B

ADDRESS CONVERSION TABLE

| DESCRIPTION RECOGNIZING DATA (DIcon ID) | ADDRESS DATA (ADDRESS OF RELATED DATA) |
|---|---|
| 001325 | 002002 |
| 001911 | 004588 |
| 001326 | 003224 |
| 001328 | 009896 |
| 003002 | 001124 |
| . | . |
| . | . |
| 005014 | 006520 |

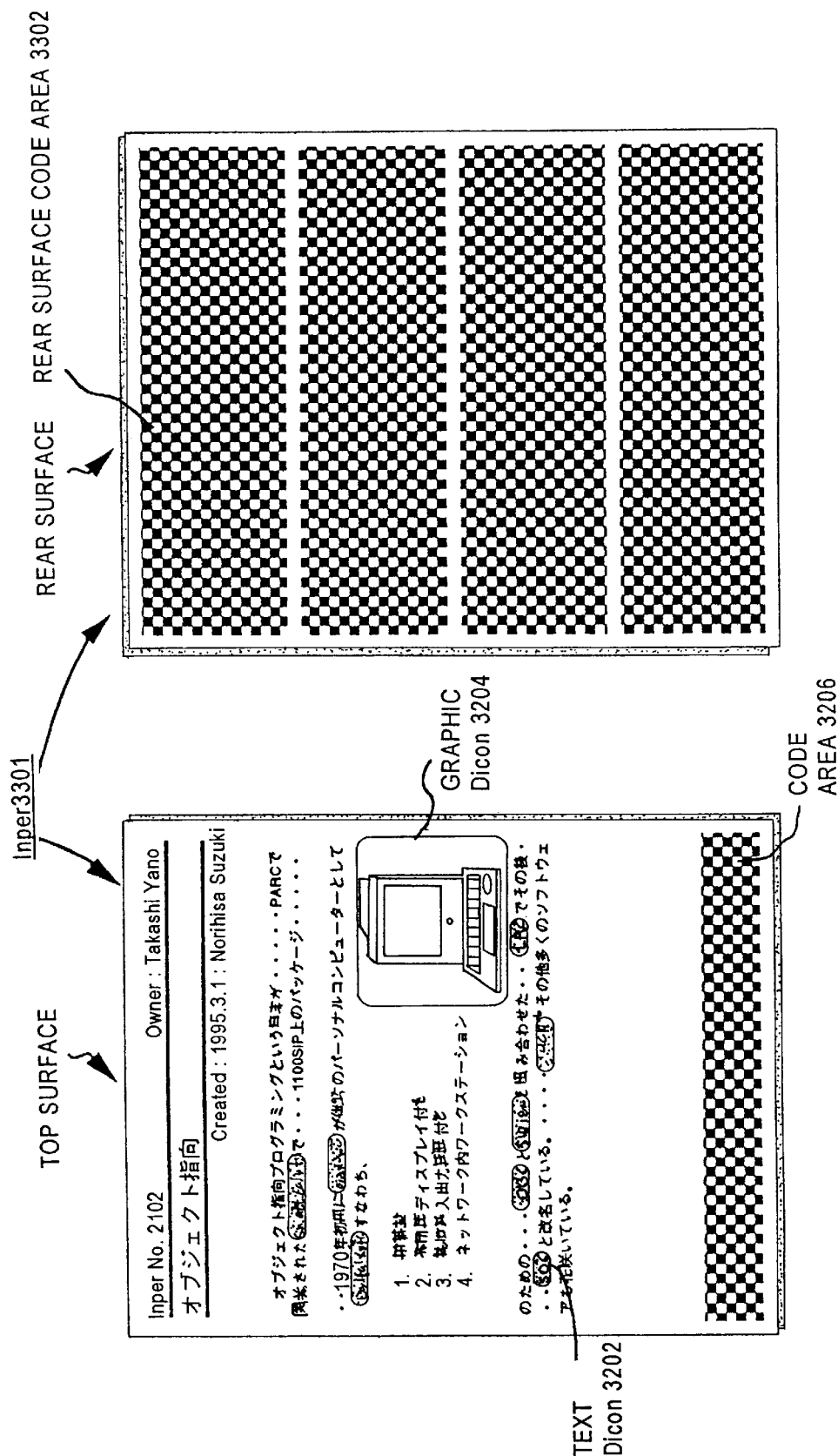
FIG.43 — Inper IN WHICH RELATED DATA IS WRITTEN IN REAR SURFACE CODE AREA

NAME OF CORRESPONDING Dicon

Inper No. 2322　　Owner : Takashi Yano

Smalltalk-80

Created : 1994.6.5 ; Norihisa

・・・Prolog

Suzuki

FIG.54A

Inper 3201

Inper No. 2102　　Owner : Takashi Yano

オブジェクト指向

Created : 1995.3.1 ; Norihisa

SELECTED Dicon 3202

Suzuki

オブジェクト指向プログラミングという用語が (ARC)
で・・・開発された (Smalltalk-80) で・・・1995(P)・・(言語抽象) が
パッケージ・・・1970年初頭に・・のための・・(言語) でその
のパーソナルコンピューターとして・・・
用・・(Skittle) を組み合わせた。・・・
月・・(S◯◯) と改名されている。・・・・その他多くの
ソフトウェアも採用している。

CODE AREA 3206

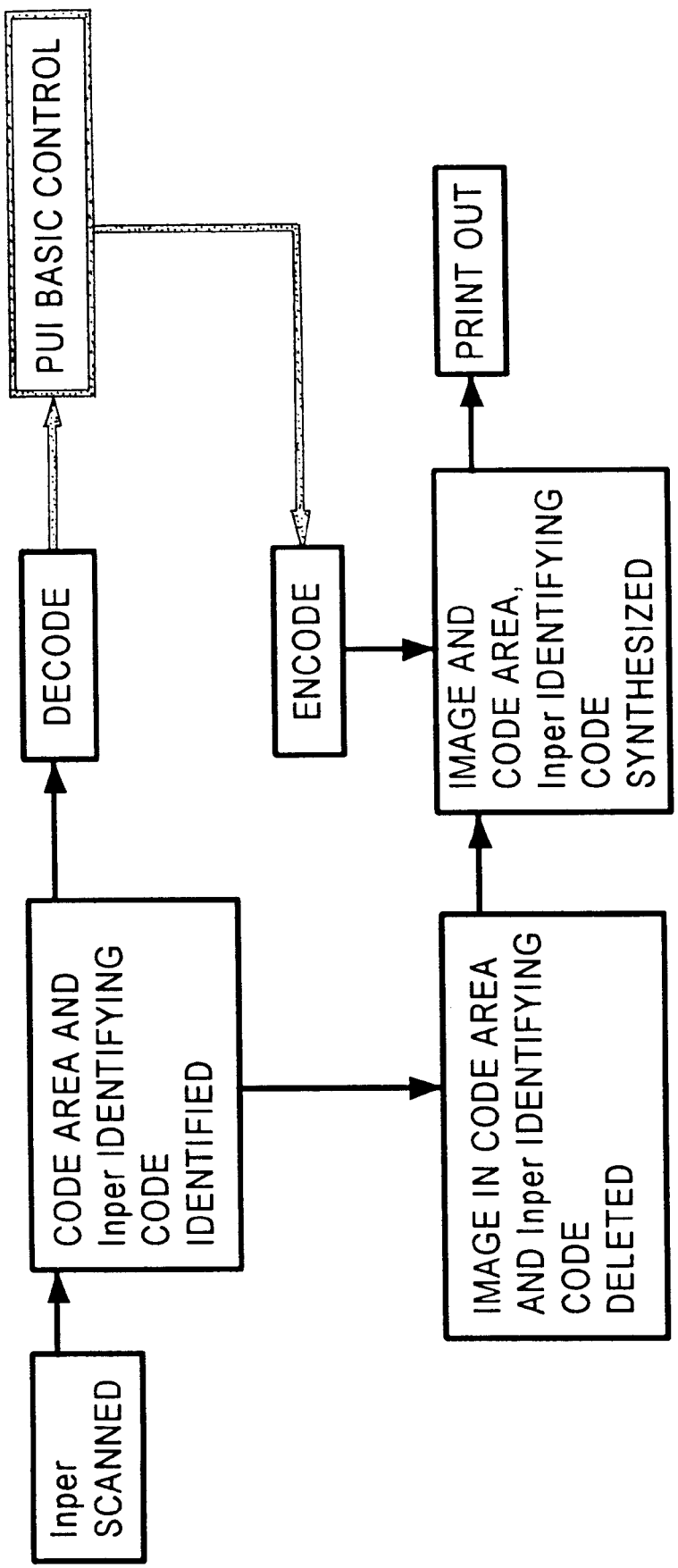

SYSTEM AND METHOD OF MANAGING DOCUMENT DATA WITH LINKING DATA RECORDED ON PAPER MEDIA

FIELD OF THE INVENTION

The present invention relates to a document data administrating system and a method of administrating document data, and more particularly to a document data administrating system and a method of administrating document data in which improvement of human-computer-interaction (HCI) can be achieved with a sheet of paper (medium paper), as a medium, on which a document is recorded.

Also the present invention relates to a document data administrating system and a method of administrating document data, and more particularly to a document data administrating system and a method of administrating document data in which document data to be initially informed and additional document data (related data) related to the document data described above are recorded on an identical sheet of paper (medium paper), so that related document data can be searched from the document data to be initially informed.

BACKGROUND OF THE INVENTION

Generally, data is always recorded in a document recorded on paper (described a paper document hereinafter) so that people can visually and easily understand it. Accordingly, a paper document itself has a role as a recording medium for recording data thereon and also has a role as a displaying means for displaying data, whereby excellent characteristics are provided in ease in reading, convenience in portability, ease in handling, applicable circumstances, and continuity with actual work.

On the other hand, in recent years, electronization of documents has been promoted by improving the computer-related technology and man-machine interface as well as by upgrading the network environment, whereby distribution of a paperless system has been accelerated in offices.

Concretely, various types of documents are prepared (electronized) on a screen of a personal computer work station, and the electronized document can be edited, copied, transferred, shared in common, filed, proofread, and searched or the like in the computer (in a digital world or virtual reality). Especially with development of the network, an electronized document can be distributed (transferred) to a personal address as is without outputting it by a printer or the like, so that the paperless system in an office is achieving further progress.

Also, electronized documents can automatically and systematically be managed with a document data administrating system constructed in a computer, so that there are such advantages such as that classifying documents to be stored and searching documents to be referred to can easily be carried out, and furthermore that a total volume of documents can be reduced due to increasing of documents held in common, security of confidential documents due to use of a pass word or the like can be improved, and data between documents can be related to each other.

However, although there are many advantages in an electronized document, in a case where it is compared to a document outputted onto an actual sheet of paper (described as a paper document hereinafter), there are various types of restrictions relating to ease in reading, convenience in portability, ease in handling, applicable circumstances, and continuity with actual work or the like. Thus in a case where the electronized document is used in actual work, it is sometimes more efficient to use the document as a paper document after it is outputted onto a sheet of record paper by a printer or the like once. Accordingly, a paper document and an electronized document each used according to an object of work will coexist in an office environment in the future.

However, with the conventional technology described above, there have been some problems as described below because there are no continuity and no relation of data as digital data between the digital world such as a computer or the like and the paper document.

Firstly, even in a case where a document electronized is put under control by the document data administrating system constructed in the digital world, when the electronized document is outputted as a paper document, related data which the electronized document has, for instance, address data in the document data administrating system, security data such as a pass word, linking data with other documents or the like are eliminated, so that a paper document has no value except one as only an output from the document data administrating system.

Secondarily, it is impossible to directly access digital world by using a paper document as a medium, so that a user is required to access the digital world by operating a keyboard or the like, which is convenient.

It should be noted that there is a method of directly accessing the digital world with paper like a mark sheet as a medium in conventional technology, but mark sheets which are previously formed in one particular pattern are used, so that there are various types of restriction therein, and for this reason mark sheets can not be used as an ordinary type of document.

Thirdly, a hyper text document exists in the digital world as an advanced concept of an electronized document, but in a case where this hyper text document is outputted as a paper document, only a plane data (visualized two-dimensional data) is outputted, so that data which the original hyper text has is lost, which causes a loss in data and reduction of the convenience.

More specifically, a hyper text is a collection of linked (related) texts (electronized documents), and a basic concept of multi-media software allowing reference to each text hierarchically and multi-dimensionally related to each other in an arbitrary order through the linked construction. Accordingly, this hyper text includes data for forming the linked construction (namely, data as a hyper text) other than data visually provided to a user. However, when a hyper text document is once outputted as a paper document, the data as hyper text is eliminated, so that the outputted paper document does not have features of a hyper text document.

It should be noted that, in conventional technology, hyper text documents can exist only as electronized documents, so that the concept of a hyper text itself was used only in the digital world (virtual document) in which electronized documents were handled. Accordingly, there has not existed such a concept that a paper document can be handled as a hyper text document and the hyper text is realized by using the paper document in the real world (this concept is defined as a paper hyper text, and described as paper hyper text hereinafter).

With a paper document based on conventional technology, it is assumed that data is always recorded so that people can easily and visually understand it, and for this reason, a quantity of data recordable on a sheet of paper document is physically restricted according to the size of a visible character and the size of a sheet of paper, and also the number of pages (the number of sheets of paper) is increased in proportion to quantity of increased data in an entire document, whereby much more space is required for storing paper documents.

With the paper document based on conventional technology, the data recorded on paper was used as final output data which people could easily and visually understand, which means that the data was not generally used for any other purposes.

On the other hand, in the digital world, a hyper text document exists as an advanced concept of an electronized document. More specifically, the hyper text is a collection of linked (related) texts (electronized documents), and a basic concept of multimedia software in which texts hierarchically and multi-dimensionally related to each other can be referred in a given order through a linked construction. Accordingly, data for forming a linked construction (namely, data as a hyper text) is included in this hyper text document other than the data visually provided to users.

However, in conventional technology, the hyper text document exists as an electronized document, so that the concept of the hyper text itself was used only in the digital world (virtual document) in which electronized documents were handled. Accordingly, there has not existed until now such a concept as that a paper document can be handled as a hyper text document and the hyper text is realized by using the paper document in the real world (this concept is defined as a paper hyper text, and described as paper hyper text hereinafter).

SUMMARY OF THE INVENTION

It is a first object of the present invention to incorporate a paper document into a document data administrating system in a digital world, to allow direct access to the digital world using the paper document as a medium, and to further realize a hyper text using a paper document (a paper hyper text) by constructing continuity and relation of data between a digital world of a computer or the like and paper documents.

Also it is a second object of the present invention to increase a quantity of data on an entire document to be recorded and at the same time to reduce a stored space for storing paper documents without restriction due to a size of a visible character.

Also it is a third object of the present invention to provide a new method of utilizing a paper document and to improve convenience of paper documents by realizing a hyper text using paper documents (a paper hyper text).

The document data administrating system according to the present invention comprises a filing means for previously storing therein data related to particular words, texts, symbols or graphics as related data files; medium paper in which at least one piece of description data comprising any of words, texts, symbols, and graphics, linking data for linking the description data to the related data file in the filing means and selection data for selecting particular description data among the description data are recorded; a reading means for reading the selection data and the linking data from the medium paper; a searching means for searching a corresponding related data file from the filing means according to the selection data and linking data read out by the reading means; and an outputting means for outputting the related data file searched by the searching means, so that continuity and relation of data between a digital world such as a computer and paper documents can be constructed, the paper documents can be incorporated in the document data administrating system in the digital world, and also the digital world can directly be accessed with the paper as a medium, and furthermore a paper hyper text with paper documents can be realized.

The document data administrating system according to the present invention comprises a filing means for previously storing therein data related to particular words, texts, symbols or graphics as related data files; medium paper in which at least one piece of description data comprising any of the words, texts, symbols, and graphics, linking data for linking the description data with the related data file in the filing means, selection data for selecting particular description data among the description data, and document identifying data for identifying the recorded document are recorded; a reading means for reading the selection data, linking data, and document identifying data from the medium paper; a searching means for searching a corresponding related data file from the filing means according to the selection data, linking data, and document identifying data read out by the reading means; and an outputting means for outputting the related data file searched by the searching means, so that continuity and relation of data between a digital world such as a computer and paper documents can be constructed, the paper documents can be incorporated in the document data administrating system in the digital world, and also the digital world can directly be accessed with the paper as a medium, and furthermore a paper hyper text with paper documents can be realized. Also the medium paper can be specified and recognized according to the document identifying data.

The method of administrating document data according to the present invention comprises a first process for previously storing therein data related to particular words, texts, symbols, and graphics as related data files; a second process for reading selection data and linking data from medium paper in which at least one piece of description data comprising any of words, texts, symbols, and graphics, linking data for linking the description data to the related data file, and selection data for selecting particular description data from the description data are recorded; a third process for searching the corresponding related data file from the stored related data files according to the read-out selection data and linking data; and a fourth process for outputting the searched related data file, so that continuity and relation of data between a digital world such as a computer and paper documents can be constructed, the paper documents can be incorporated in the document data administrating system in the digital world, and also the digital world can directly be accessed with the paper as a medium, and furthermore a paper hyper text with paper documents can be realized.

The method of administrating document data according to the present invention comprises a first process for previously storing therein data related to particular words, texts, symbols, and graphics as related data files; a second process for reading selection data, linking data, and document identifying data from medium paper in which at least one piece of description data comprising any of words, texts, symbols, and graphics, linking data for linking the description data to the related data file, selection data for selecting particular description data from the description data, and document identifying data for identifying the recorded document are recorded; a third process for searching the corresponding related data file from the stored related data files according to the read-out selection data, linking data, and document identifying data; and a fourth process for outputting the searched related data file, so that continuity and relation of data between a digital world such as a computer and paper documents can be constructed, the paper documents can be incorporated in the document data administrating system in the digital world, and also the digital world can directly be accessed with the paper as a medium, and furthermore a paper hyper text with paper documents can be realized. Also the medium paper can be specified and recognized according to the document identifying data.

The document data administrating system according to the present invention comprises medium paper in which at least one piece of related data comprising data related to particular words, texts, symbols, and graphics, at least one piece of description data comprising any of words, texts, symbols, and graphics, linking data for linking the description data to the related data, and selection data for selecting particular description data among the description data are recorded; a reading means for reading out the selection data, linking data, and related data from the medium paper; a searching means for searching the corresponding related data from the related data according to the selection data and linking data each read out by the reading means; and an outputting means for outputting the corresponding related data searched by the searching means, so that a hyper text (a paper hyper text) with paper documents can be realized, which makes it possible to provide a new method of utilizing a paper document, and also to improve the convenience of the paper document. Also a quantity of data for an entire document to be recorded can be increased and also a space for storing paper documents can be reduced without being restricted to a size of a visible character. Furthermore, related data is written on the medium paper, so that such a large-scaled system configuration as to which related data is searched by linking another recording medium for taking it out is not required, and for this reason, the system can be constructed with simple configuration.

The document data administrating system according to the present invention comprises medium paper in which at least one piece of related data comprising data related to particular words, texts, symbols, and graphics, at least one piece of description data comprising any of words, texts, symbols, and graphics, linking data for linking the description data to the related data; and selection data for selecting particular description data among the description data are recorded; a reading means for reading the selection data, linking data, and related data from the medium paper; a searching means for searching the corresponding related data from the related data according to the selection data and linking data read out by the reading means; and an outputting means for outputting the corresponding related data searched by the searching means, and the related data is recorded on the rear surface of the medium paper, so that a hyper text (a paper hyper text) with paper documents can be realized, which makes it possible to provide a new method of utilizing a paper document, and also to improve the convenience of the paper document. Also a quantity of data for an entire document to be recorded can be increased and also a space for storing paper documents can be reduced without being restricted to a size of a visible character. And also related data is written on the medium paper, so that such a large-scaled system configuration as to which related data is searched by correlating another recording medium for taking it out is not required, and for this reason, the system can be constructed with simple configuration. Furthermore, the related data is recorded on the rear surface of the medium paper, so that a document is recorded on the top surface of the medium paper and the related data is recorded in the space of the rear surface thereof, which makes it possible to substantially increase a quantity of data for related data.

The document data administrating system according to the present invention comprises medium paper in which at least one piece of related data comprising data related to particular words, texts, symbols, and graphics, at least one piece of description data comprising any of words, texts, symbols, and graphics, linking data for linking the description data to the related data, and selection data for selecting particular description data among the description data are recorded; a read ing means for reading the selection data, linking data, and related data from the me dium paper; a searching means for searching the corresponding related data from the related data according to the selection data and linking data re ad out by the reading means; and an outputting means for outputting the corresponding related data se arched by the searching means and the image on the medium paper read out by the reading means, so that a relation in correspondence of the outputted related data to the medium paper is made clear, and the convenience thereof can be improved. Especially, a data source (medium paper) of the outputted related data can clearly be identified even in a case where a certain period of time has elapsed after related data and an image on the medium paper are out putted by the outputting means.

The document data administrating system according to the present invention comprises medium paper in which at least one piece of related data comprising data related to particular words, texts, symbols, and graphics, at least one piece of description data comprising any of words, texts, symbols, and graphics, linking data for linking the description data to the related data, and selection data for selecting particular description data among the description data are recorded; a medium paper identifying means for identifying whether a sheet of paper which is an object to be read out is the medium paper or not; a reading means for reading the selection data, linking data, and related data from the medium paper in a case where it is identified that the paper is the medium paper by the medium paper identifying means; a searching means for searching the corresponding related data from the related data according to the selection data and linking data each read out by the reading means; and an outputting means for outputting the corresponding related data searched by the searching means, so that a hyper text (a paper hyper text) with paper documents can be realized, which makes it possible to provide a new method of utilizing a paper document, and also to improve the convenience of the paper document. Also a quantity of data for an entire document to be recorded can be increased and also a space for storing paper documents can be reduced without being restricted to a size of a visible character. Related data is also written on the medium paper, so that such a large-scaled system configuration as to which related data is searched by linking another recording medium for taking it out is not required, and for this reason, the system can be constructed with simple configuration. Furthermore, it is identified whether the paper is medium paper or not by the medium paper identifying means, so that related data can accurately be taken out from the medium paper without the malfunction even in a case where medium paper and ordinary documents are mixed in one set of documents.

The method of administrating document data according to the present invention comprises a first process for reading the selection data, linking data, and related data from the medium paper in which at least one piece of related data comprising data related to particular words, texts, symbols, and graphics, at least one piece of description data comprising any of words, texts, symbols, and graphics, linking data for linking the description data to the related data, and selection data for selecting particular description data among the description data are recorded; a second process for searching corresponding related data from the related data according to the read-out selection data and linking data; and a third process for outputting the searched corresponding related data, so that a hyper text (a paper hyper text) with paper documents can be realized, which makes it possible to provide a new method of utilizing a paper document, and also to improve the convenience of the paper document. Also a quantity of data for an entire document to be recorded can be increased and also a space for storing paper documents can be reduced without being restricted to a size of a visible character. Furthermore, related data is written on the medium paper, so that such a large-scaled system configuration as to which related data is searched by linking another recording medium for taking it out is not required, and for this reason, the system can be constructed with simple configuration.

The method of administrating document data according to the present invention comprises a first process for reading the selection data, linking data, and related data from the medium paper in which at least one piece of related data comprising data related to particular words, texts, symbols, and graphics, at least one piece of description data comprising any of words, texts, symbols, and graphics, linking data for linking the description data to the related data, and selection data for selecting particular description data among the description data are recorded; a second process for searching a corresponding related data from the related data according to the read-out selection data and linking data; and a third process for outputting the searched corresponding related data, and the related data is recorded on the rear surface of the medium paper, so that a hyper text (a paper hyper text) with paper documents can be realized, which makes it possible to provide a new method of utilizing a paper document, and also to improve the convenience of the paper document. Also a quantity of data for an entire document to be recorded can be increased and also a space for storing paper documents can be reduced without being restricted to a size of a visible character. Related data is also written on the medium paper, so that such a large-scaled system configuration as to which related data is searched by linking another recording medium for taking it out is not required, and for this reason, the system can be constructed with simple configuration. Furthermore, related data is recorded on the rear surface of the medium paper, so that a document is recorded on the top surface of the medium paper, and the related data is recorded in the space of the rear surface thereof, which makes it possible to substantially increase a quantity of data for related data.

The method of administrating document data according to the present invention comprises a first process for reading the selection data, linking data, and related data from the medium paper in which at least one piece of related data comprising data related to particular words, texts, symbols, and graphics, at least one piece of description data comprising any of words, texts, symbols, and graphics, linking data for correlating the description data to the related data, and selection data for selecting particular description data among the description data are recorded; a second process for searching corresponding related data from the related data according to the read-out selection data and linking data; and a third process for outputting the searched corresponding related data and an image on the medium paper read out in the first process, so that a relation of correspondence of the outputted related data to the medium paper is made clear, and the convenience thereof can be improved. Especially, a data source (medium paper) of the outputted related data can clearly be identified even in a case where a certain period of time has elapsed after related data and an image on the medium paper are outputted in the third process.

The method of administrating document data according to the present invention comprises a first process for identifying whether a sheet of paper which is an object to be read is specified medium paper or not; a second process for reading the selection data, linking data, and related data from the medium paper in which, in a case where it is identified that the paper is medium paper in the first process, at least one piece of related data comprising data related to particular words, texts, symbols, and graphics, at least one piece of description data comprising any of words, texts, symbols, and graphics, linking data for linking the description data to the related data, and selection data for selecting particular description data among the description data are recorded; a third process for searching a corresponding related data from the related data according to the read-out selection data and linking data; and a fourth process for outputting the searched corresponding related data, so that a hyper text (a paper hyper text) with paper documents can be realized, which makes it possible to provide a new method of utilizing a paper document, and also to improve the convenience of the paper document. Also a quantity of data for an entire document to be recorded can be increased and also a space for storing paper documents can be reduced without being restricted to a size of a visible character. Related data is also written on the medium paper, so that such a large-scaled system configuration as to which related data is searched by linking another recording medium for taking it out is not required, and for this reason, the system can be constructed with simple configuration. Furthermore, it is identified whether the paper is medium paper or not in the first process, so that related data can accurately be taken out from the medium paper without the malfunction even in a case where medium paper and ordinary documents are mixed in one set of documents.

Other objects and features of this invention will become understood from the following description with reference to the accompanying drawings.

BRIEF DESCRIPTION OF THE DRAWINGS

FIG. 5 is an explanatory view showing an example of a relation in data contents in the related data files each corresponding to indicated contents of the Dicon;

FIGS. 7A and 7B are an explanatory view showing an example of marking for selection data;

FIG. 9 is an explanatory view showing an example in which l inking data (a linking data table) comprises description position data and address data;

FIGS. 10A and 10B are an explanatory view showing an example in which linking data (a linking data table) comprises description position data and description recognizing data;

FIG. 26 is an explanatory view showing an example in which a Dicon and Dicon ID each selected according to document identifying data and a name of the Inper of the read Inper as well as to selection data are outputted onto a recorded paper as attached data;

FIG. 34 is a block diagram showing the document data administrating system according to the present invention;

FIGS. 38A, 38B, and 38C are an explanatory view showing an example of marking for selection data;

FIG. 39 is an explanatory view showing description position data which is a portion of linking data;

FIG. 40 is an explanatory view showing an example in which linking data (a linking data table) comprises description position data and address data;

FIGS. 41A and 41B are an explanatory view showing an example in which linking data (a linking data table) comprises description position data and description recognizing data;

FIG. 43 is an explanatory view showing configuration of Inper (Medium paper) in Embodiment 2;

Figure 51:
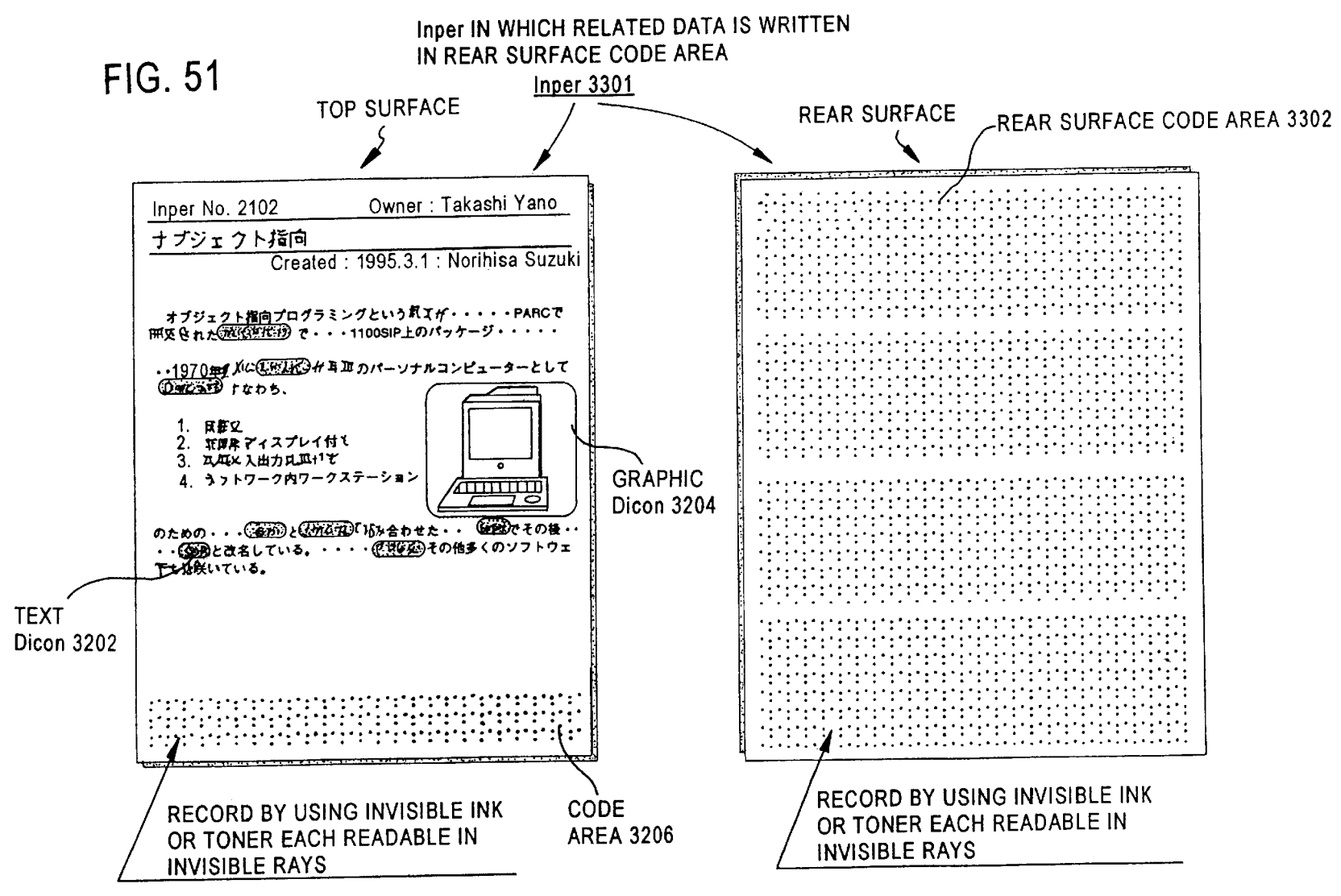

FIG. 51 is an explanatory view showing an example of Inper (Medium paper) using invisible ink or toner readable with invisible lights;

FIGS. 54A and 54B are an explanatory view showing an example of an output of the related data according to Embodiments 1 to 7;

FIG. 62 is an explanatory view showing an example of the sequence for preparing Inper not used yet from the Inper which has used once.

DESCRIPTION OF THE PREFERRED EMBODIMENTS

Figure 1:
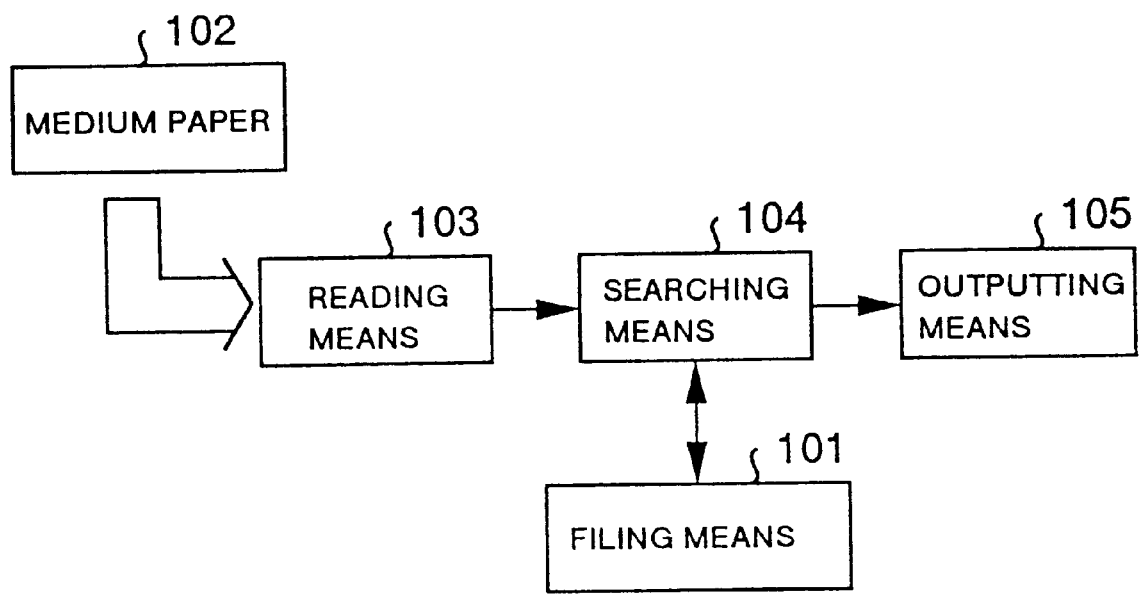
FIG. 1 is a block diagram showing a document data administrating system according to the present invention.

A detailed description is made hereinafter for a document data administrating system and a method of administrating document data according to the present invention in the order as follows with reference to the related drawings:

1. Outline of the present invention
2. Proposal on a concept of PUI
3. Configuration of Inper (Medium paper)
4. Roles of Dicons (Description data)
5. Concrete example of selection data
6. Configuration of linking data
7. Relation between a related data file and Inper and a link between Inpers
8. First example of a configuration of hardware to a sixth example thereof
9. Example of practical operations 1. Outline of the present invention FIG. 1 shows a block diagram of the document data administrating system according to the present invention, and the system comprises a filing means 101 for previously storing therein data related to particular words, texts, symbols or graphics as related data files, medium paper 102 in which at least one piece of description data comprising any of words, texts, symbols, and graphics, linking data for linking the description data to the related data file in the filing means 101, and selection data for selecting a particular description data among the description data are recorded; a reading means 103 for reading the selection data and linking data from the medium paper; a searching means 104 for searching a corresponding related data file from the filing means according to the selection data and linking data read out by the reading means 103; and an outputting means 105 for outputting the related data file searched by the searching means 104.

It should be noted that the related data files stored in the filing means 101 are data related to particular words, texts, symbols, or graphics, and these particular words, texts, symbols, or graphics in this step are ones which can be used as description data for the medium paper 102. In other words, any words, texts, symbols, or graphics which can be used as description data for the medium paper 102 are stored in the filing means 101 as related data files.

Description data (words, texts, symbols, or graphics) on the medium paper 102 are recorded each at a given position thereon, the description data recorded at the given position and the related data file in the filing means 101 are linked by using linking data, and furthermore, a particular description data is selected among description data stored in the given positions by using the selection data.

In other words, the linking data comprises description position data for description data on the medium paper 102 respectively, and address data for corresponding the description position data to the related data file, or comprises description position data for description data on the medium paper 102 respectively and description recognizing data for recognizing description data described on the position of the description position data, and by specifying the description position data described above the corresponding related data file can be searched.

Accordingly, when a particular description data is selected according to the selection data, the related data file corresponding thereto can be searched from the description position data for the corresponding description data.

Description is made for the basic operations (processes of the method for administrating document data according to the present invention) in the configuration described above.

At first, in a first process, data related to particular words, texts, symbols or graphics are previously stored in the filing means 101 as related data files.

Then, in a second process, the data on medium paper 102 is read out by the reading means 103. Concretely, selection data and linking data are read out from the medium paper 102 in which at least one piece of description data comprising any of words, texts, symbols, and graphics; linking data for linking the description data to the related data file in the filing means 101; and selection data for selecting a particular description data from the description data are recorded.

In a third process, the searching means 104 searches the corresponding related data file among the related data files stored in the filing means 101 according to the selection data and the linking data read out by the reading means 103. Namely, the searching means 104 specifies description position data for the corresponding description data from the position data on the medium paper 102 according to the read out selection a data, and searches the corresponding related data file from the read out linking data (description position data and address data, or description position data and description recognizing data).

Finally, in a fourth process, the outputting means 105 outputs the related data file searched by the searching means 104 onto a recorded paper or display screen or the like. In this step, either a method in which the searching means 104 reads the corresponding related data file from the filing means 101 and transfers it to the outputting means 105 to output or a method in which the outputting means 105 reads out the corresponding related data file from the filing means 101 to output based on an instruction from the searching means 104 may be employed for an output of the related data file, and there is no restriction over the method in the present invention.

As described above, a related data file stored in the filing means 101 can be searched from the description data recorded at given positions on the medium paper 102 and can be outputted, so that continuity and relation of data between the digital world such as a computer or the like (a related data file in the filing means 101) and a paper document (medium paper 102) can be constructed, which makes it possible to incorporate the medium paper 102 into the document data administrating system in the digital world.

Also, the system can directly access the digital world with the medium paper 102 as a medium without using a display unit, a mouse, or a keyboard or the like, and furthermore, a hyper text (a paper hyper text) using a paper document (medium paper 102) can be realized.

It should be noted that a paper hyper text is defined as a concept herein in which a paper document is handled as a document for the hyper text, and the hyper text can be realized in the real world with the paper document. Also in a case where a paper hyper text is realized with medium paper 102, the related data file desirably includes at least one piece of description data comprising any of words, texts, symbols, and graphics, as well as linking data for linking the description data to other related data file in the filing means 101 as data related to particular words, texts, symbols, and graphics.

Also, in the configuration described above, the present system may have a configuration in which the medium paper 102 has document identifying data for identifying the document recorded on the medium paper 102 in addition to description data, linking data and selection data, and selection data, linking data and document identifying data are read out from medium paper 102 by the reading means 103, and the corresponding related data file is searched from the filing means 101 according to the selecting data, linking data, and document identifying data by the searching means 104. In this case, to realize a paper hyper text with the medium paper 102, it is desirable that the related data file includes, as data related to a particular word, text, symbol, and graphic, at least one piece of description data comprising any of a word, a text, a symbol, and a graphic; linking data for linking the description data to another related file in the filing means 101; and document identifying data for identifying the document recorded in the related data file.

2. A proposal of a concept on PUI

The document data administrating system and method of administrating document data according to the present invention can construct continuity and relation of data between the digital world such as a computer or the like (a related data file in the filing means 101) and a paper document (medium paper 102), which makes it possible to incorporate the medium paper 102 into the document data administrating system in the digital world, and also to directly access the digital world with the medium paper 102 as a medium, and furthermore to realize a paper hyper text using the medium paper 102.

For this reason, the document data administrating system and method of administrating document data according to the present invention are proposed herein as PUI (Paper User Interaction) as a system and a method for realizing interaction (data transfer, an interactive interface) between a user (person) and a computer with Paper (medium paper 102).

Also in the PUI, the medium paper 102 is defined as Inper (Interact paper), and description data recorded in the Inper is defined as a Dicon (Document icon).

Furthermore, as described above, a paper document is handled as a document for a hyper text, and a concept of realizing a hyper text with a paper document in the real world is defined as a paper hyper text. Accordingly, Inper in the PUI indicates a document itself for a hyper text in the concept of a paper hyper text, and a Dicon in the Inper indicates a switch printed on the paper (equivalent to a button or an icon in an ordinary hyper text).

3. Configuration of Inper (Medium paper)

Detailed description is further made for Inper (Medium paper 102) in the PUI. Inper is paper on which a Dicon that is at least one piece of description data comprising any of words, texts, symbols, and graphics; linking data for correlating the Dicon to a related data file in the filing means 101; selection data for selecting a particular Dicon in Dicons; and document identifying data (Inper ID) for identifying the recorded document are recorded. However, description data, linking data, and document identifying data are previously recorded in Inper, but selection data is recorded on the Inper with a user writing (marking) it as required.

Figure 2:
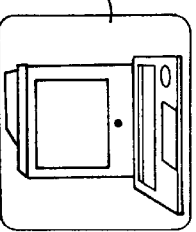
FIG. 2 is an explanatory view showing an Inper (Medium paper) in a document system.
Figure 3:
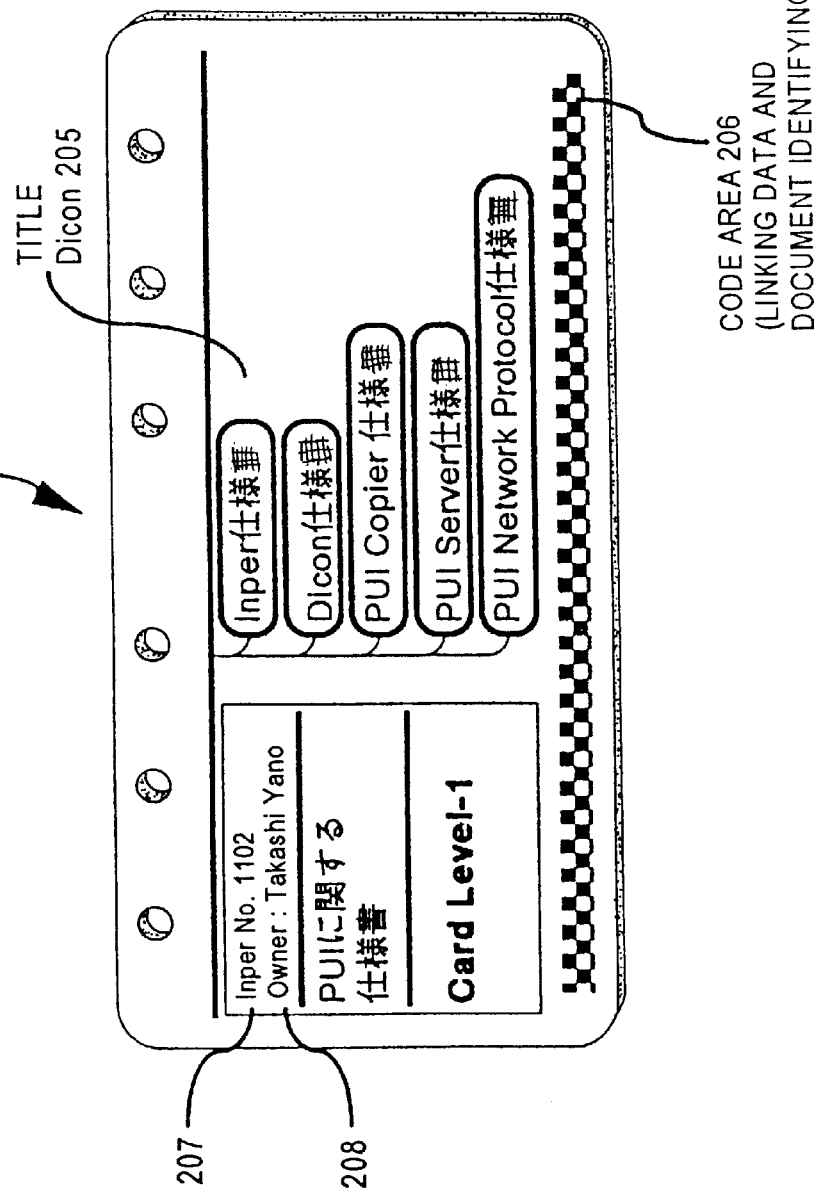
FIG. 3 is an explanatory view showing an Inper (Medium paper) having a list directory format.

FIG. 2 and FIG. 3 show a concrete example of Inper, FIG. 2 shows Inper 201 in a document form in which Dicons are arranged in the document as construction elements for an ordinary document, and FIG. 3 shows Inper 301 in the form of a list-directory in which a Dicon is used as a title.

As shown in FIG. 2, in the Inper 201 in a document form, words and a text are recorded as a text Dicon 202, an icon (symbol) indicating a document is recorded as a symbol Dicon 203, a computer pattern is recorded as a graphic Dicon 204, and words and a short text are recorded as a title Dicon 205. Also linking data and document identifying data are recorded in a code area 206 in an optically readable form like two-dimensional bar code. It should be noted that the reference numeral 207 indicates Inper ID shown with characters so that a user can identify contents of the document identifying data, and the reference numeral 208 indicates Owner ID shown with characters so that the user can identify an owner of the Inper 201.

As described above, the Inper 201 in a document form is identical to an ordinary document outputted onto recorded paper. Accordingly, it is needless to say that Inper 201 can be used as an ordinary document.

Also, as shown in FIG. 3, words and a text are recorded on Inper 301 in the form of a list-directory as a title Dicon 205. And also linking data and document identifying data are recorded in a code area 206 in an optically readable form like a two-dimensional bar code. It should be noted that the reference numeral 207 indicates an Inper ID shown with characters so that a user can check contents of the document identifying data, and the reference numeral 208 indicates an Owner ID shown with characters so that the user can check an owner of the Inper 301.

Detailed description is made later for the Inper 301, but Inper 301 in the form of a list-directory as described above can be used as an index card in which required minimum data (herein, a title Dicon) is described, and further can be used as a card for accessing a related data file in the filing means 101 corresponding to the title Dicon.

For this reason, it is clear from the Inpers 201, 301 that Inper (Medium paper 102 according to the present invention) can be defined as a special paper document which is readable both by a human being (a user) and a computer (a digital world).

4. Roles of Dicons (description data)

Detailed description is made herein for roles of Dicons each recorded in the Inpers 201 and 301.

Figure 4:
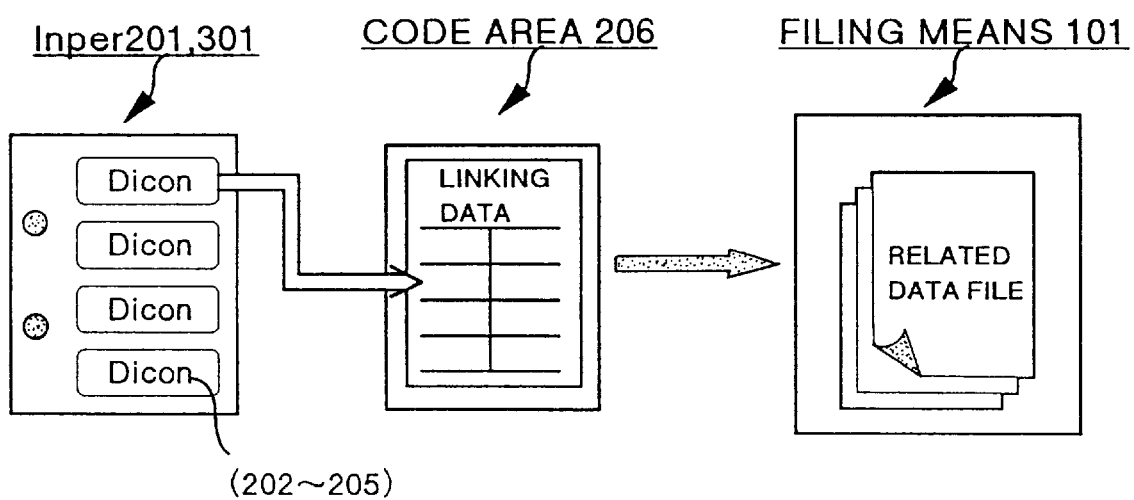
FIG. 4 is an explanatory view showing a relation in linkage between a Dicon (Document Icon) and a related data file in a filing means.

As shown in FIG. 4, Dicons (202 to 205) recorded in Inpers 201, and 301 are linked (coupled) to the related data file in the filing means 101 through the linking data in the code area 206. Accordingly, when a desired Dicon is selected among the plurality of Dicons recorded on the Inpers 201 and 301, the related data file linked to the selected Dicon can be specified.

Namely, Dicons have a roles as visual data recorded on the Inpers 201 and 301, and also play a role of switches each for selecting the related data file. In other words, conceptionally, Dicons are defined as ones playing roles as switches like buttons or icons on the hyper text.

Next description is made for types of Dicon. The Dicon comprises, as shown in FIG. 2, four types of a text Dicon 202, a symbol Dicon 203, a graphic Dicon 204, and a title Dicon 205, and each of the Dicons is defined as follows.

A text Dicon:

A Dicon written in forms of words and short texts each used in a text in a form of hyper text.

A symbol Dicon:

A Dicon in a form of an icon added to the end of a long text, or added to the entire contents of Inper.

A graphic Dicon:

A Dicon in a form of rough illustrations and photographs each linking to detailed illustrations, photographs, and drawings (related data files).

A title Dicon:

A Dicon in which titles of related data linking to corresponding Dicon are written in forms of contents and a list.

Next description is made for a relation between indicated contents of these Dicons and data contents of the corresponding related data files with reference to FIG. 5. In these Dicons, as shown in the figure, a data form of a text Dicon and a title Dicon is a form of a text, and a data form of a symbol Dicon and a graphic Dicon is a form of a graphic/image.

The contents of data in the related data file can be correlated to a document in a case where indicated contents of each of these Dicons is a title, to a document in a case where the contents thereof is a reference, to an entire text in a case of abstract, to a personal report in a case of a person's name, to a full color in a case of monochrome, to a gray scale in a case of dither, to an original size in a case of a reduced layout, and to a document or the like in a case of a symbol mark.

However, the above description is only for a standard example, and the present invention is not limited thereto, and for instance, in a case where the indicated contents of Dicon is a title, the contents of data in the related data files may comprises two data of documents and graphics in full color.

In an outputting means, for outputting the contents of data in the related data files, having a display unit and a voice synthesizing device, in a case where the indicated contents of Dicon is a person's name or a symbol mark, moving pictures and voices are stored as the data contents in the corresponding related data files, and the stored pictures and voices may be outputted by using the display unit and voice synthesizing device.

Figure 6:
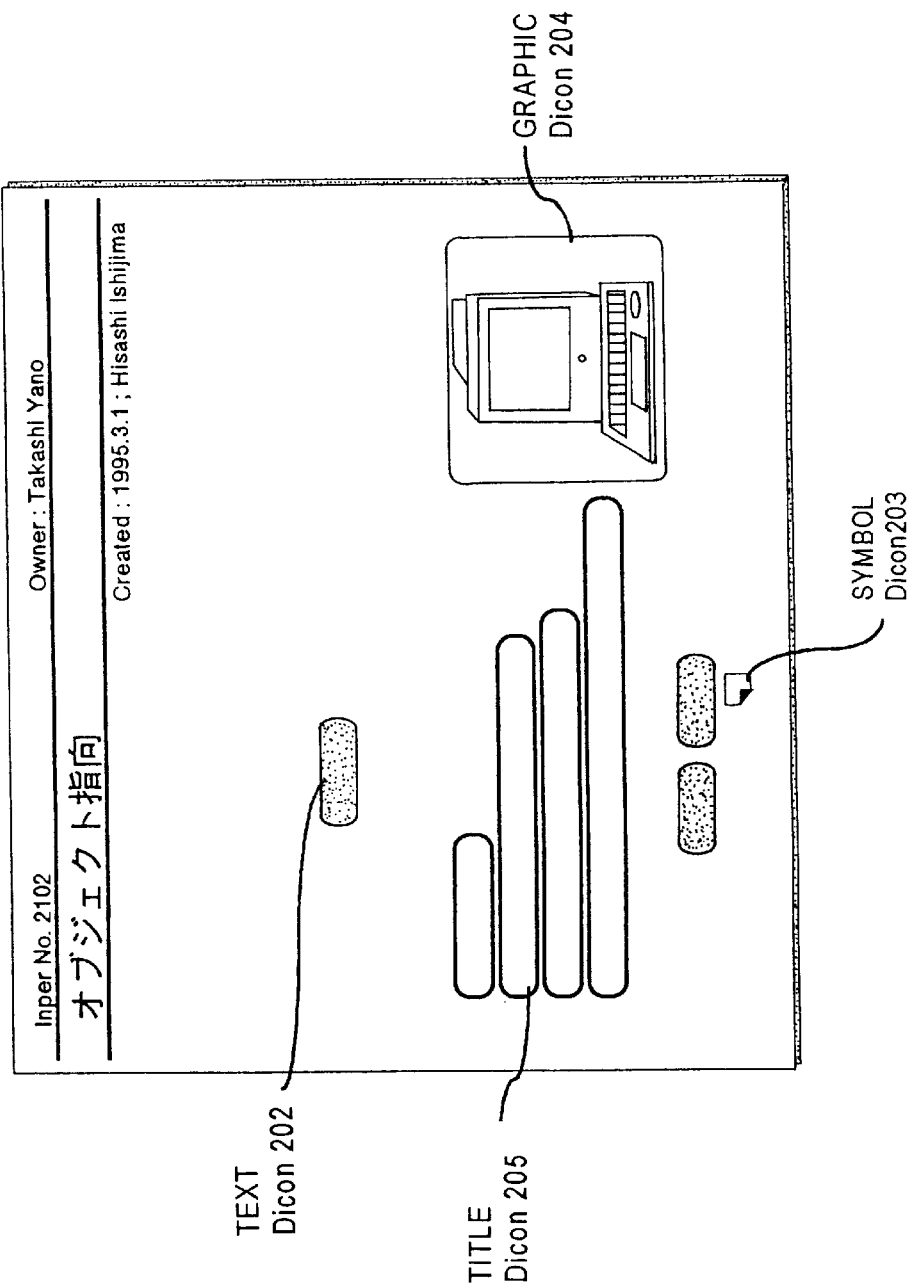
FIG. 6 is an explanatory view showing a method of describing a Dicon.

FIG. 6 is an explanatory view showing a method of indicating Dicons. It is required to visually identify Dicons from data other than Dicons so that a user can easily and surely recognize Dicons on Inper. Accordingly, in the present invention, Dicons can be distinguished therefrom by decorating them as described later.

Applicable to decoration in a text Dicon 202, as shown in the figure, are a method of coloring the background, a method of changing fonts (e.g. a Ming-style type to a Gothic type or the like), a method of changing styles of type (e.g. a Italic type, a bold-face, addition of an underline or the like), a method of changing colors of characters (e.g. black to blue), and a method of enclosing a Dicon with a flame.

As shown in the figure, a method of enclosing a Dicon with a frame and a method of coloring the background are applicable to the decoration in the title Dicon 205 as well as in the graphic Dicon 204.

Decoration is not required for a symbol Dicon 203 because the Dicon itself is clearly recognized as a Dicon. However it is needless to say that decoration may be executed thereon.

On the other hand, if decoration is executed to Dicons in a case where many Dicons are arranged on an Inper, text in the Inper becomes complicated, which makes it difficult to distinguish one Dicon from another. In this case, a Dicon on the Inper can not be recognized, so that a user sometimes selects words or the like other than Dicons on selection of Dicons. For this reason, when words or something else other than the Dicons are selected, it is required that a massage or the like on the matter described above is outputted through the outputting means 105.

5. Concrete example of selection data

Selection data is data for selecting a particular Dicon among the Dicons written on the Inper. For instance, a written (marked) mark can be used as selection data. Any types of writing tool may be used for writing additional information (marking) so long as a mark can be optically read by the reading means 103, and generally a marker such as a felt-pen or the like is used.

In this step, if color of a marker is previously specified and a color scanner is used as a reading means 103, a high recognition rate can be obtained.

FIG. 7A and FIG. 7B show examples each of additional writing (marking) of selection data, and the marking shown in FIG. 7A is suitable for a case of Inper 201 in a document form. Also, the marking shown in FIG. 7B is suitable for a case of Inper 301 in a list-directory form.

The marking as shown in FIG. 7A may be executed to Dicon in a case where Dicon is a text Dicon or a graphic Dicon according to the types of Dicon, and in a case of a title Dicon, and a symbol Dicon, the marking shown in FIG. 7B may be executed thereto.

6. Configuration of linking data

Linking data is data written in a code area 206 as two-dimensional bar code as described above and for linking Dicon and the related data file in the filing means 101.

Also linking data comprises, for instance, description position data of each of the Dicons on Inper, and address data for having the description position data correspond to the related data files, or comprises description position data of each of the Dicons on Inper and description recognizing data for recognizing description data written at positions on the description position data respectively.

Figure 8:
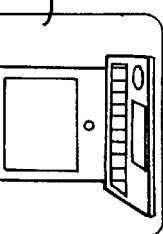
FIG. 8 is an explanatory view showing description position data which is a portion of linking data.

Herein, description is made for description position data which is a portion of linking data with reference to FIG. 8. description position data is data for specifying a position of each of Dicons on Inper respectively, and may comprise, for instance, as shown in the figure, data comprising positions and areas of Dicons each on a map, and a Dicon number attached to each of Dicons in the order of its appearance on the map with the map corresponding to coordinates of the Inper.

FIG. 9 shows an example in which this description position data and address data constitute linking data (a table of liking data). As clearly understood from the table of linking data, when the description position data is specified, an address of the corresponding related data file is specified. Namely, when a Dicon is selected with the selection data as shown in FIG. 7, a position of the coordinates on the map shown in FIG. 8 is specified from the position of coordinates of the selection data, and related data files corresponding to the Dicon can be searched according to the description position data (a Dicon Number) for the specified position of coordinates. For this reason, Dicon and the related data files can be linked with the linking data.

FIG. 10A shows an example in which description position data and description recognizing data constitute linking data (a table of linking data). Herein, description recognizing data is data for recognizing Dicons each described at a position in each of description position data, and this Dicon ID can be used by previously attaching Dicon ID to each of Dicons. As clearly understood from the table of linking data, when the description position data is specified, description position data (Dicon ID) corresponding thereto is specified. Namely, when a Dicon is selected with the selection data as shown in FIG. 7, a position of the coordinates on the map shown in FIG. 8 is specified from the position of coordinates of the selection data, and the corresponding Dicon ID can be specified according to the description position data (a Dicon Number) for the specified position of coordinates.

In this case, by providing a table of address conversion inside of searching means 104 (FIG. 1) shown in FIG. 10B, corresponding related data files can be searched from Dicon ID. In other words, Dicon and the related data files can be linked with linking data.

As clearly understood from the tables of linking data shown in FIG. 9 and FIGS. 10A and 10B, in the linking data (a table of linking data) in FIG. 9, description position data (in short, a Dicon) and address data (in short, a related data file) are linked at one to one, and the table of linking data itself plays the role of a table of address conversion, so that the table is suitable for a case where a related data file is prepared after a Dicon is prepared on the Inper. However, in this case, it is difficult to change the addresses of related data files after Inper is prepared, so that it is desirable that linking data is employed for a small-scale system.

On the other hand, in the linking data (linking data table) shown in FIGS. 10A and 10B, description position data (in short, a Dicon) and description recognizing data (Dicon ID) are only linked one to one, and the description recognizing data and related data file are linked with the address conversion table provided inside of the searching means 104, so that, for instance, in a case where description recognizing data is defined as general (common) data in an entire system, a Dicon and the related data file can be linked only by setting an address conversion table in the side of the searching means 104. Accordingly high extendibility and administrating capability of the system can be achieved, and for this reason linking data is suitable for constructing a large-scale system.

Also, for instance, in a case where description position data is defined as a specific data in each of Inpers, a Dicon and the related data file can be linked by setting a table of address conversion for each of Inpers in the searching means 104.

Furthermore, as shown in FIG. 8, a quantity of data for linking data in a code area 206 can be reduced by specifying an area in which a Dicon can be set on Inper as required. Especially, it is effective in a case where Dicons on Inper are arranged in one side.

It should be noted that, in the linking data described above (FIG. 9 and FIG. 10), a case where a Dicon finally corresponds to the related data file at one to one (1:1) is shown, but the present invention is not especially limited thereto, and it is needless to say that, for instance, a correspondence relation between Dicons and the related data files includes a relation of 1 to many (1:n) or of many to 1 (n:1).

7. Relation between a related data file and Inper and a link between Inpers

Next description is made for a relation between a related data file and Inper and a link between Inpers. A related data file is data related to the Dicon written on Inper, and is stored in the filing means 101 after Inper is prepared or before Inper is prepared.

Figure 11A:
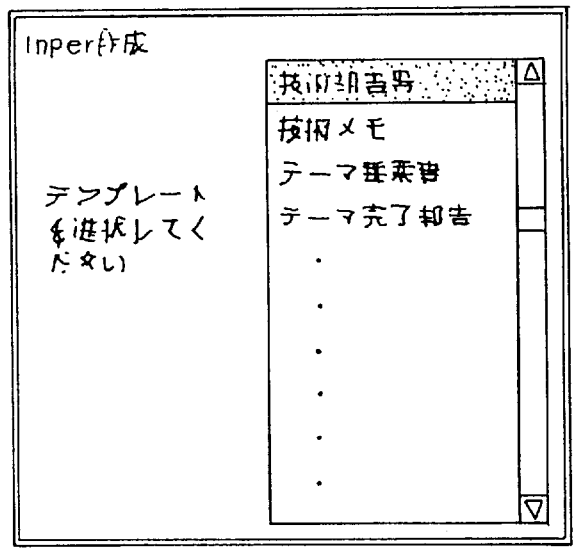
FIGS. 11A and 11B are an explanatory view showing a method of preparing the Inper and the related data files.
Figure 11B:
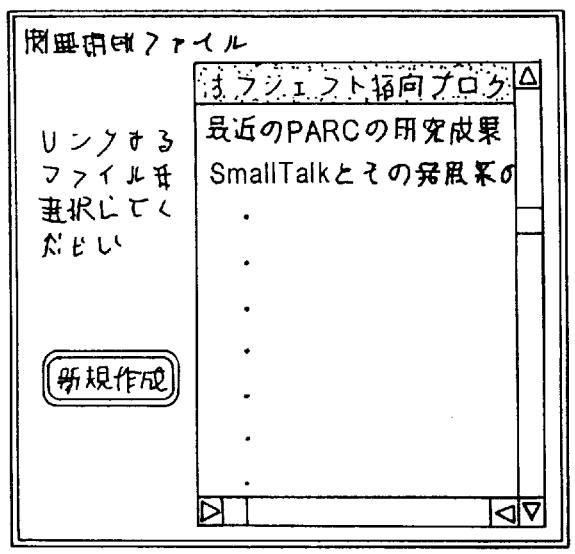

More specifically, for preparing Inper and the related data file, as shown in FIGS. 11A and 11B, an application program specially used for preparation of Inper is used on a personal computer. It should be noted that description herein is made general for simplicity.

At first, as shown in FIG. 11A, an Inper preparation dialog is opened on the personal computer for selecting templates (a sheet with a header).

Next, items such as a title and a name of a person who prepared the title are written onto the header section (upper space) of the templates, and a document is prepared in the templates with the same method as that of DTP.

Then, words, short texts, illustrations, and photographs or the like which a user wants for Dicons are selected, and, as shown in FIG. 11B, a related data file dialog is opened.

In a case where the selected Dicons are linked to related data files previously registered in the filing means 101, the filing means 101 is searched according to the selected Dicons (namely, words, short texts, illustrations, and photographs or the like), and when appropriate ones are found on the related data file dialog, the ones are selected. On the other hand, in a case where a related data file corresponding to the selected Dicon is prepared anew, a new preparation button thereon is selected, a new preparation dialog (the same as an Inper preparation dialog) is opened, a sheet with a header (the same as the Inper preparation dialog) is selected, and the related data file is prepared in the same method as that of preparing Inper.

Then, when the related data file dialog is closed, the selected Dicon and the related data file corresponding thereto (related data file selected from the filing means 101 or a newly prepared related data file) are linked.

Finally, when the Inper preparation dialog is closed, data for the code area 206 (linking data and document identifying data) are automatically generated, and new electronized Inper is registered. Desired Inper is prepared by outputting this electronized new Inper by the outputting means 105.

It should be noted that, selection of Dicon and the related data file and new preparation of the related data file can be executed at a given point of time during preparation of the new Inper in an electronized state and after the preparation, and also addition and modification of Dicon can be executed.

As described above, and as clearly understood from the fact that a newly prepared dialog for the related data file is the same as the Inper preparation dialog, a related data file itself can be prepared as Inper in an electronized state. Namely, when the related data file is prepared, Dicon is set in a document of the related data file, so that the Dicon and other related data file are linked, and linking data and document identifying data are recorded in the related data file, whereby the related data file itself is prepared in an electronized state. It is obvious that the related data file prepared as described above is outputted by the outputting means 105 for preparation of Inper.

With preparation of the related data file as Inper as described above, a relation of links between the Dicon in the Inper and the related data file can further be extended. Description is made herein for a link between Inpers with reference to FIG. 12A to FIG. 12C and FIG. 13.

Figure 12A:
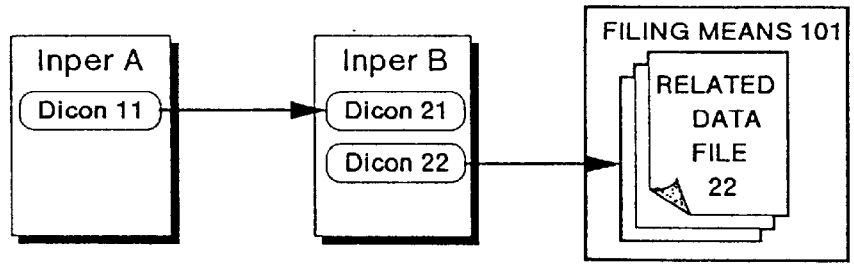
FIGS. 12A, 12B and 12C are an explanatory view showing a link between Inpers.

FIG. 12A shows an example of a layered link in which a Dicon is linked to another Inper, and a Dicon in the Inper is also hierarchically linked to another Inper or the related data file.

Figure 12B:
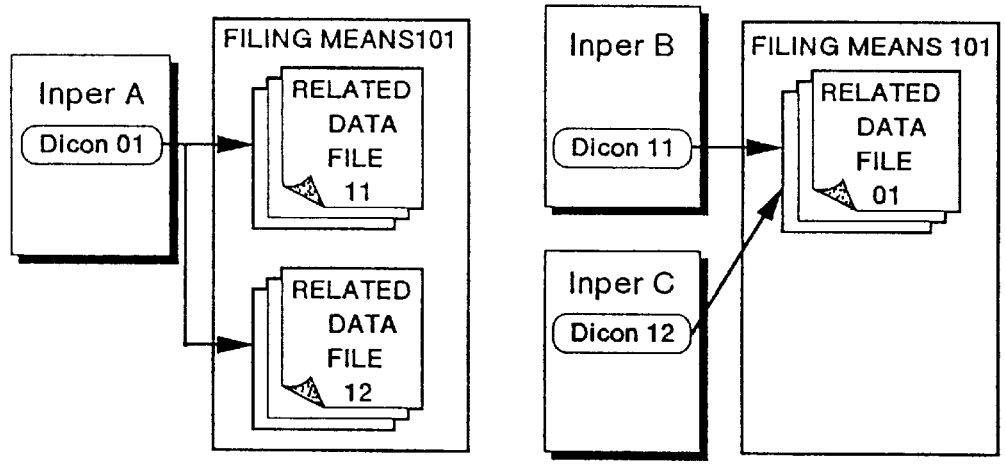

FIG. 12B shows an example of a multi-dimensional link in which a Dicon is linked to a plurality of Inpers or related data files, and the plurality of Dicons are also multi-dimensionally linked to an Inper or the related data file.

Figure 12C:
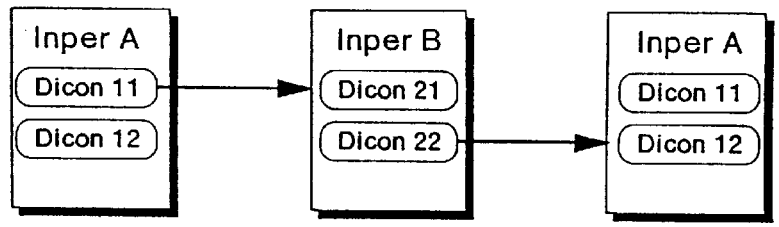

FIG. 12C shows an example of an interacted link in which a Dicon in Inper A is linked to Inper B, and a Dicon in the Inper B is also linked to the Inper A.

As described above, a link between Inpers can be extended to a layered link, a multi-dimensional link, and an interacted link, so that the relation of data between Inper and the related data file can be enhanced, which makes it possible to improve the convenience in use.

Figure 13:
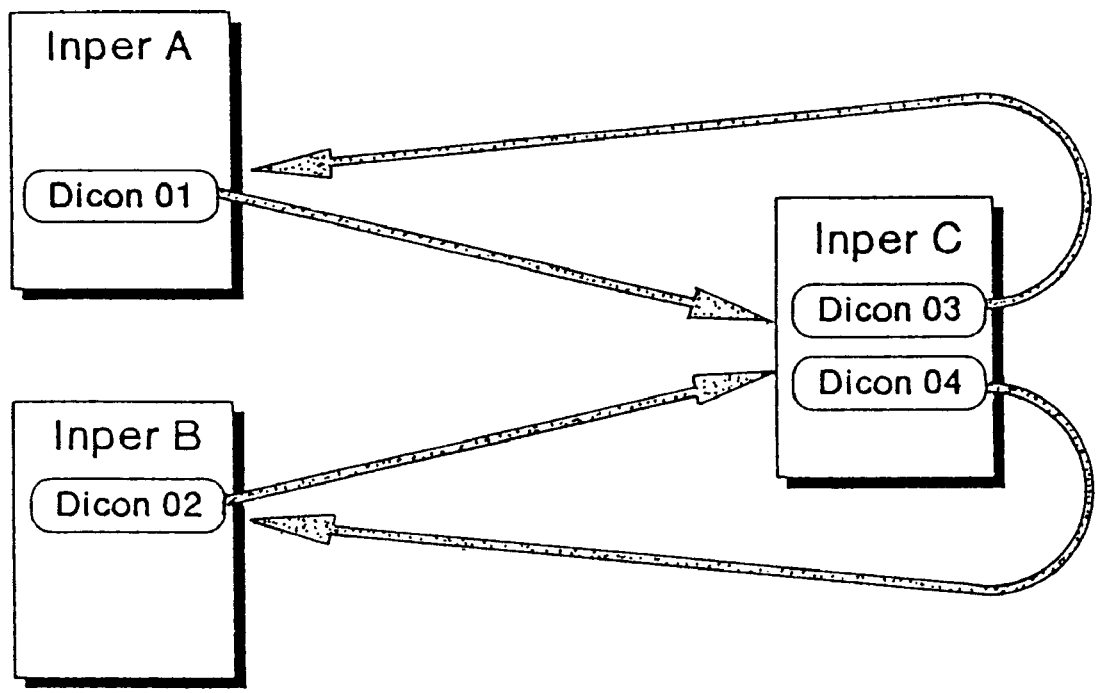
FIG. 13 is an explanatory view showing an example of a combination of a multi-dimensional link with an interactive link.
Figure 14:
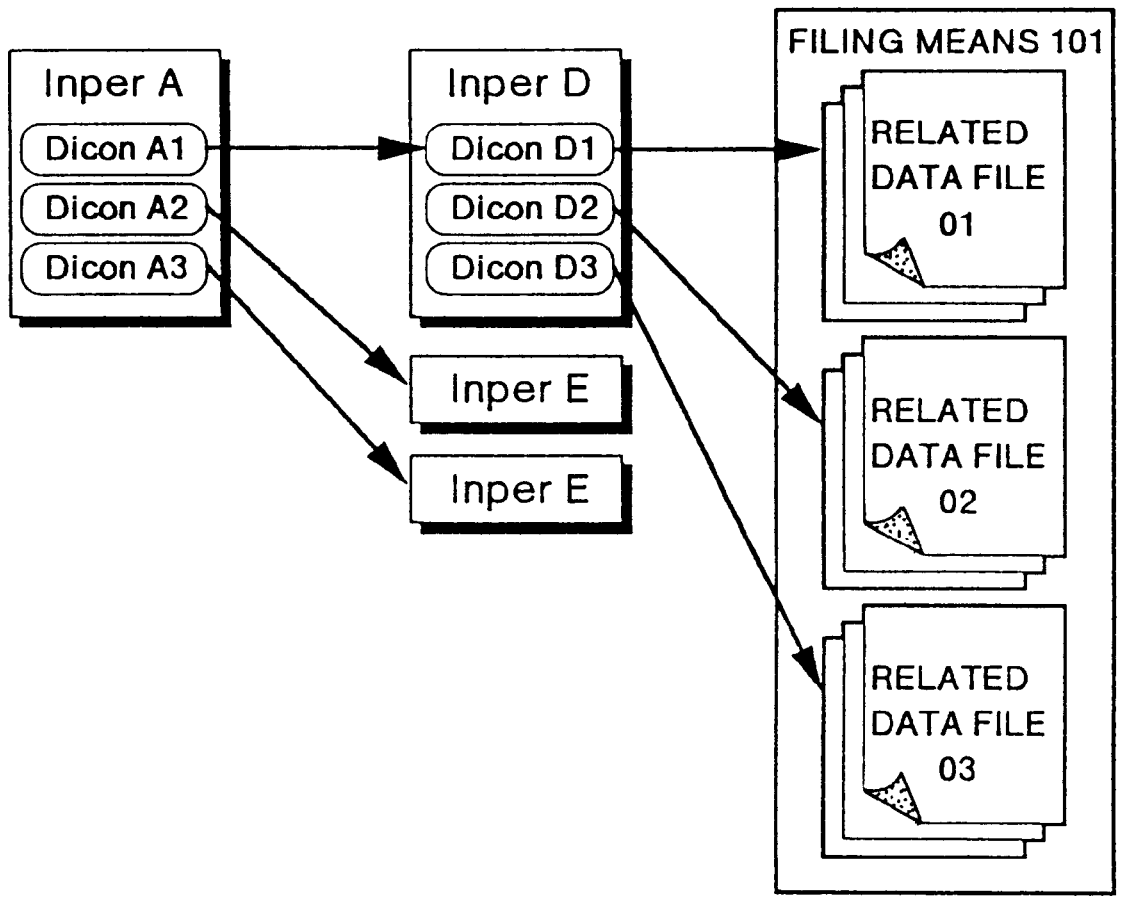
FIG. 14 is an explanatory view showing a hierarchical link.
Figure 15:
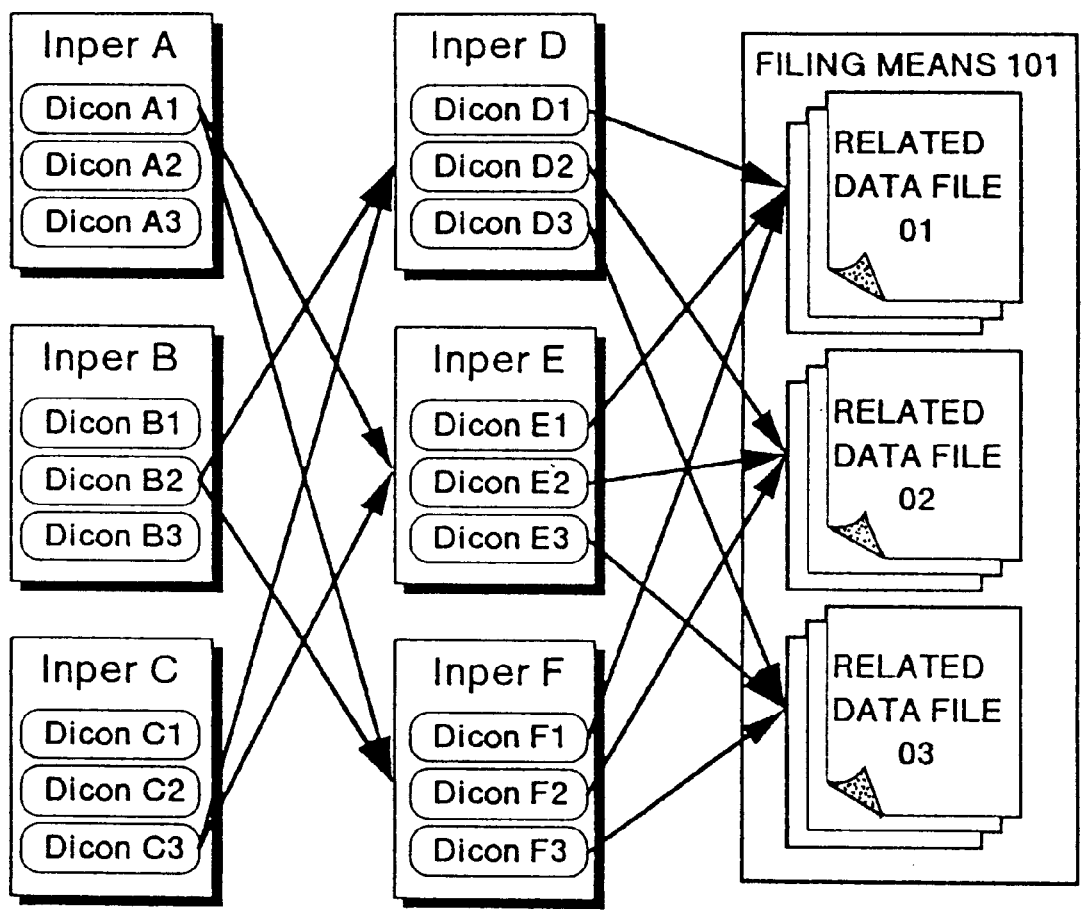
FIG. 15 is an explanatory view showing an example of a combination of a hierarchical link with a multi-dimensional link.
Figure 16:
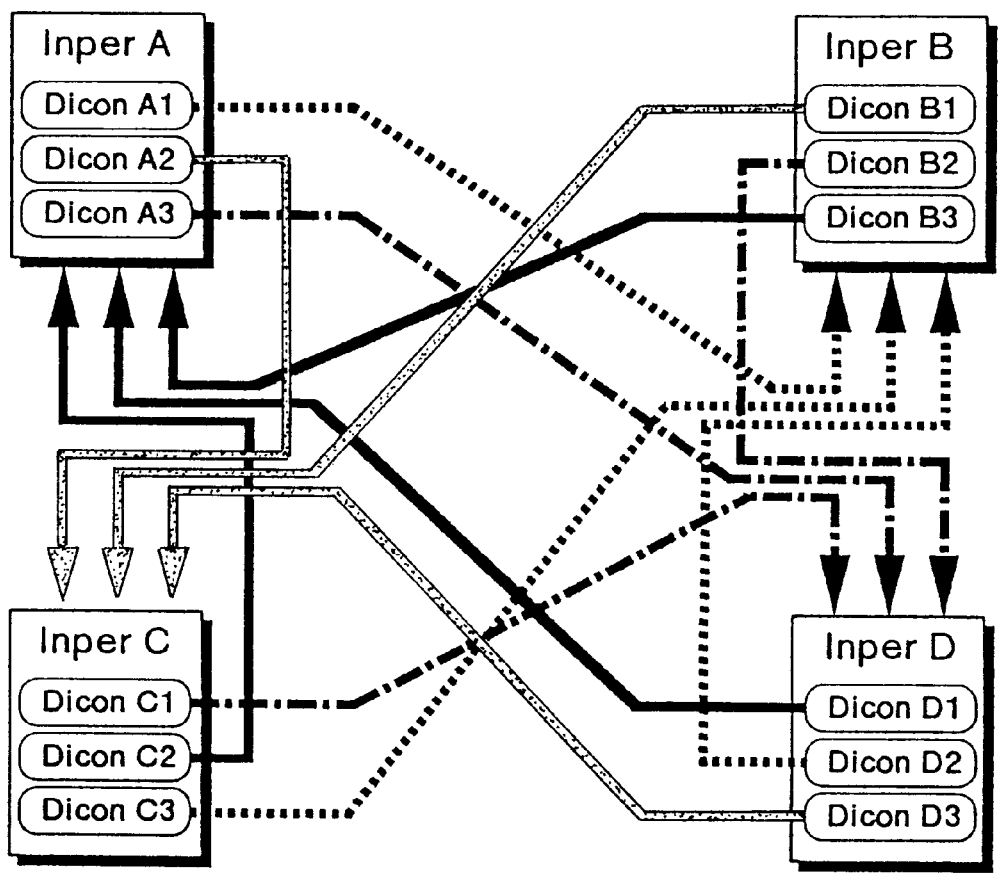
FIG. 16 is an explanatory view showing an example of a combination of a hierarchical link and a multi-dimensional link with an interactive link.

Also, as shown in FIG. 13, it is possible to combine a multi-dimensional link with an interacted link. Furthermore each form of the layered link, multi-dimensional link, and interacted link is not particularly limited, and it is also possible to extend a relation of links as required such as the layered link as shown in FIG. 14, the combination of the layered link and multi-dimensional link as shown in FIG. 15, and the combination of the layered link, multi-dimensional link, and interacted link as shown in FIG. 16.

8. First example of configuration of hardware to a sixth example thereof

Next description is made for more specific configuration of hardware of the filing means 101, reading means 103, searching means 104 and outputting means 105 each constituting the present invention in the order of (the first example of configuration of the hardware), (the second example of configuration of the hardware), (the third example of configuration of the hardware), (the fourth example of configuration of the hardware), (the fifth example of configuration of the hardware), and (the sixth example of configuration of the hardware).

(First example of hardware configuration)

Figure 17:
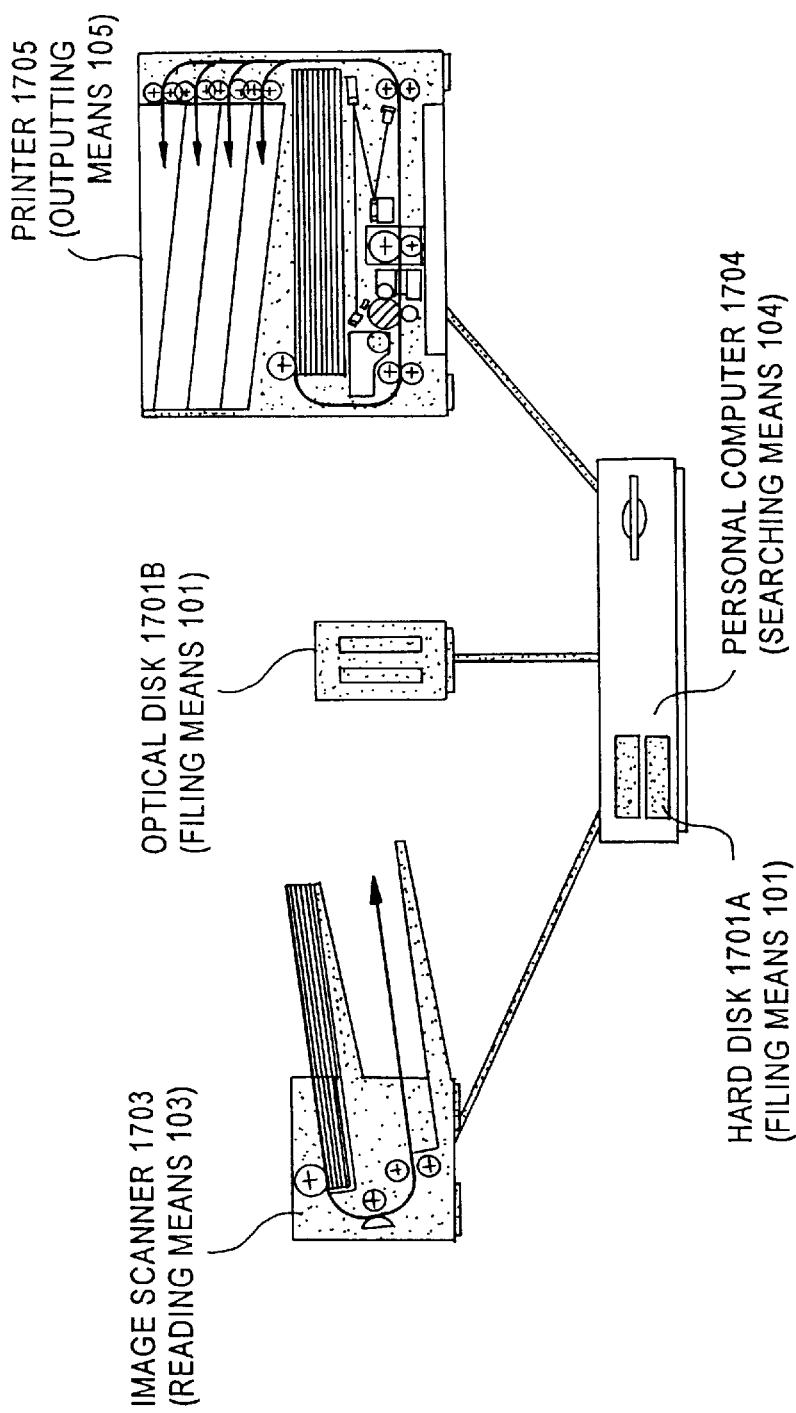
FIG. 17 is an explanatory view showing an example of a first configuration of hardware in PUI (Paper User Interaction) according to the present invention.

FIG. 17 shows a view of the first example of configuration of hardware in PUI according to the present invention, and the hardware comprises a hard disk 1701A or an optical disk 1701B each of which is a filing means 101; an image scanner 1703 which is a reading means 103; a personal computer 1704 which is a searching means 104; and a printer 1705, such as a laser printer and an ink jet printer or the like, which is an outputting means 105.

Herein, both of, or either of the hard disk 1701A or optical disk 1701B is used as a filing means 101 according to the purpose. Also, the image scanner 1703 may have only the resolution so as to enable reading of selection data, linking data, and document identifying data, and, for instance, a range of the resolution from 300 dpi to 400 dpi is sufficient although requirement of resolution is different according to systems of two-dimensional bar code in a code area 206. Also, for a personal computer 1704 used as a searching means 104, a keyboard and a display are not required as a rule.

As described above, with the first example of hardware configuration, the existing device is used for each of the means, which makes it possible to construct the low-cost system. Also, a personal computer is used therefor, so that software is easily installed therein. Furthermore, recognition of data for Inper read out by the scanner, searching of the related data file, and administration of Inper and the related data files are executed with software, which makes it possible to easily change or update the system.

(Second example of hardware configuration)

Figure 18:
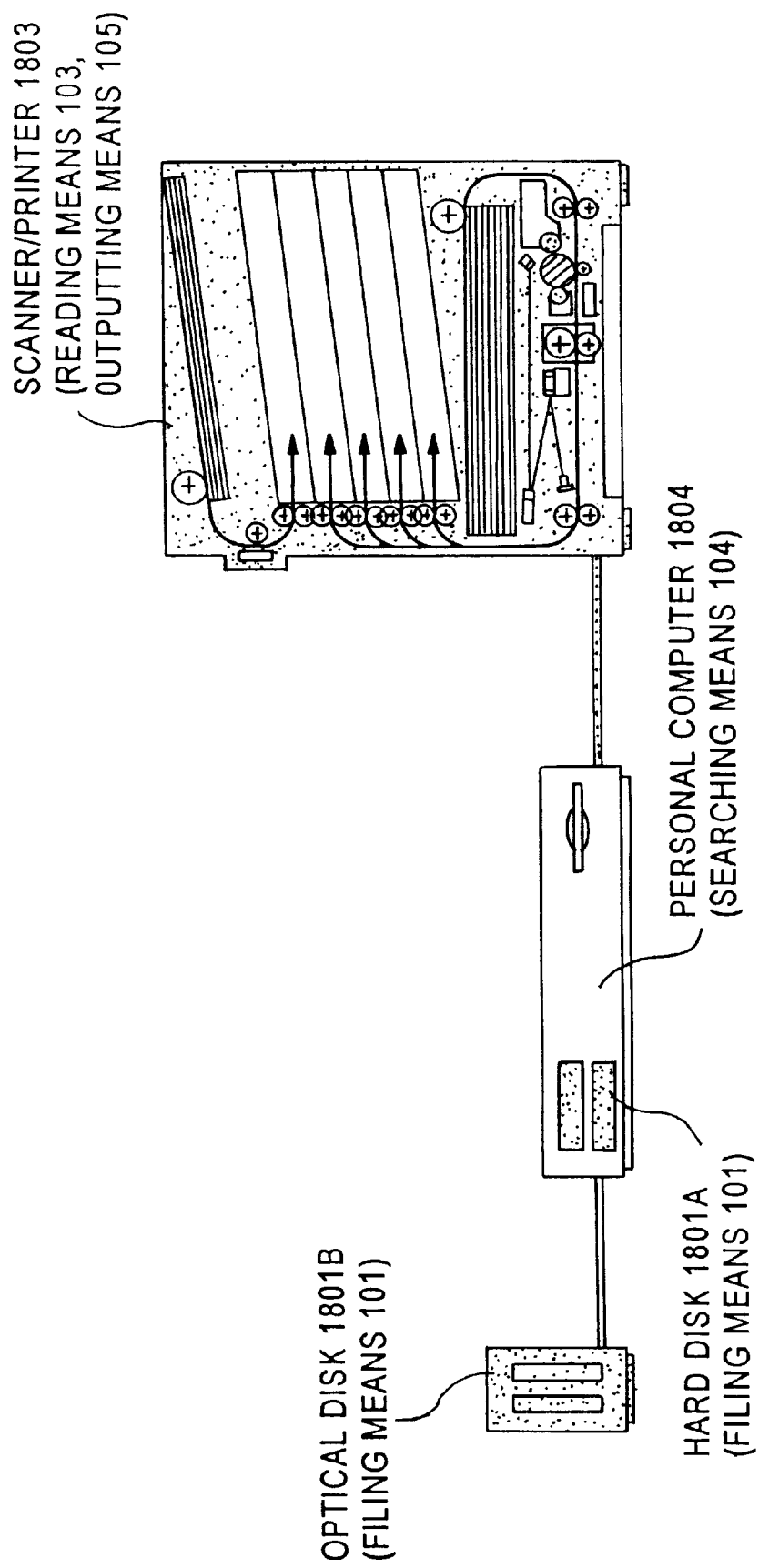
FIG. 18 is an explanatory view showing an example of a second configuration of hardware in the PUI (Paper User Interaction) according to the present invention.

FIG. 18 shows a view of the second example of hardware configuration in the PUI according to the present invention, and the hardware comprises a hard disk 1801A or an optical disk 1801B each of which is a filing means 101; a scanner/printer 1803 which is a reading means 103 and an outputting means 105; and a personal computer 1804 which is a searching means 104.

As described above, it is possible to construct the system by using the scanner/printer 1803 in which the reading means 103 and the outputting means 105 are integrated.

As described above, with the second example of hardware configuration, in addition to the same effects as those obtained in the first example thereof, the reading means 103 and the outputting means 105 are realized with one unit of scanner/printer, so that operations of a scanner and those of a printer are concurrently carried out, which makes it possible to further improve the operability.

(Third example of hardware configuration)

Figure 19:
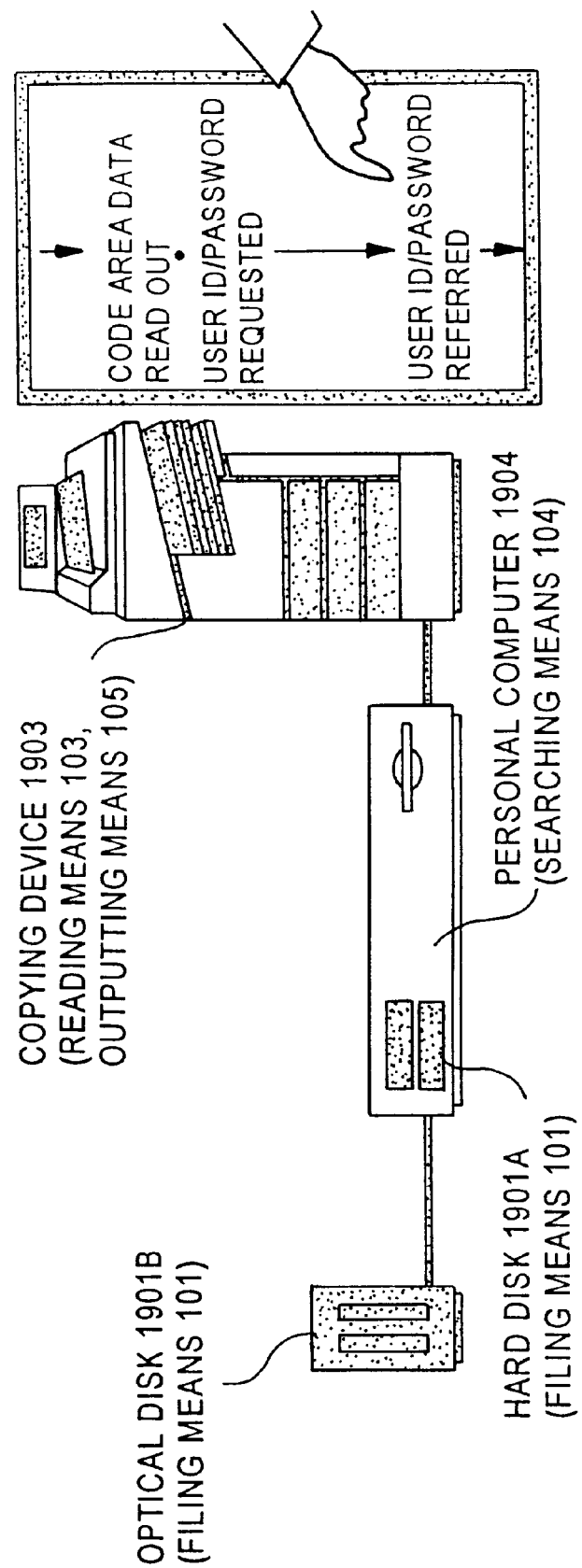
FIG. 19 is an explanatory view showing an example of a third configuration of hardware in the PUI according to the present invention.

FIG. 19 shows a view of the third example of hardware configuration in the PUI according to the present invention, and the hardware comprises a hard disk 1901A or an optical disk 1901B each of which is a filing means 101; a copying device 1903 which is a reading means 103 and an outputting means 105; and a personal computer 1904 which is a searching means 104.

As described above, it is possible to construct the system by using the copying device 1903 in which the reading means 103 and the outputting means 105 are integrated. In this case, an operating section (a display and a keyboard), although it is a small-scaled, is provided in the copying device 1903, and by using this operating section, setting of conditions of printing out, and also administration of security with a user ID and a password can be executed.

As described above, with the third example of hardware configuration, in addition to the same effects as those obtained in the first example thereof, the copying device is used as a reading means 103 and a outputting means 105, so that a related data file can be outputted by using various types of paper handling function which a copying machine generally has, such as double-sided printing, printing in a changed size, printing with a binding margin, and stapling.

(Fourth example of hardware configuration)

Figure 20:
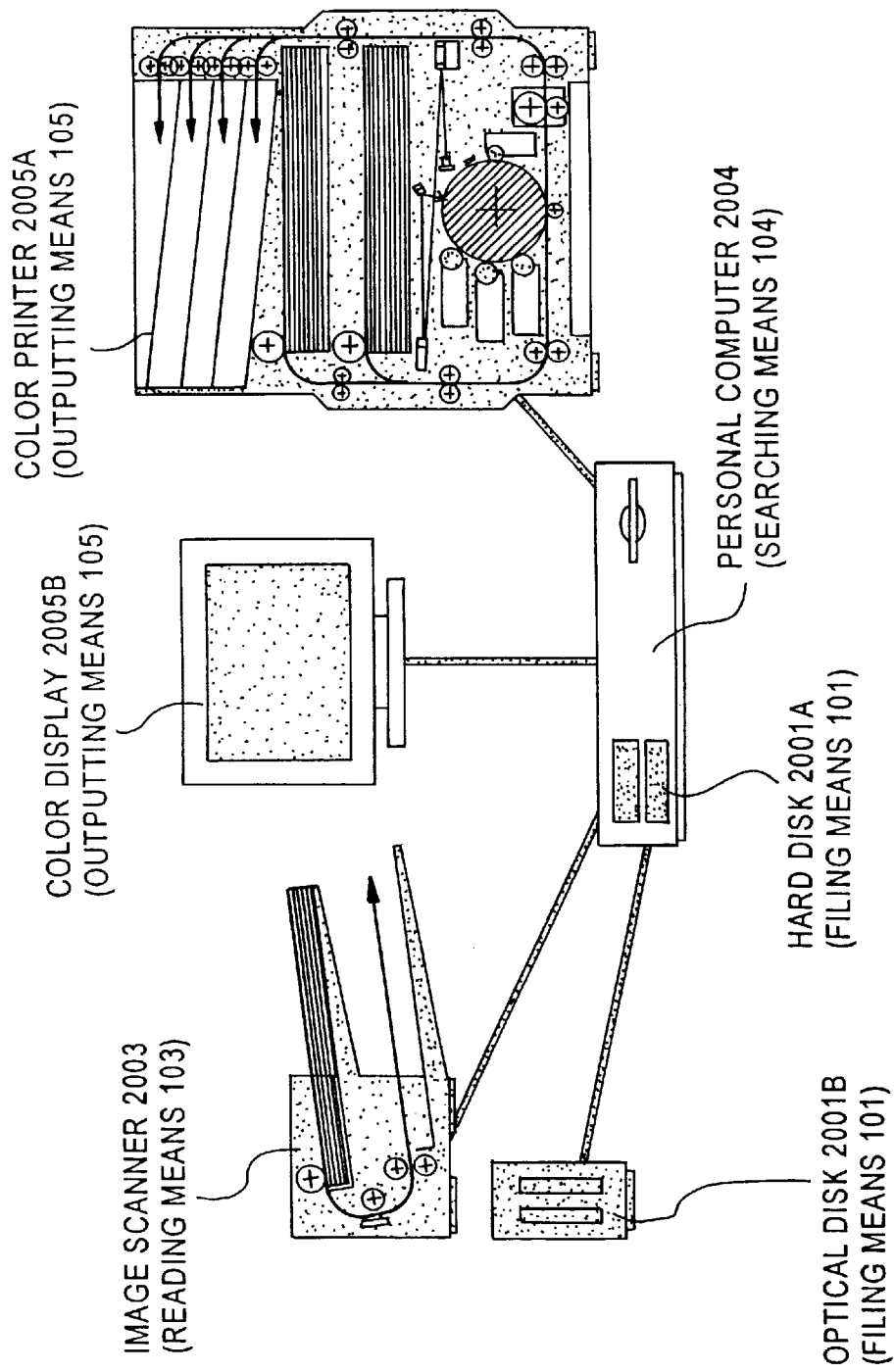
FIG. 20 is an explanatory view showing an example of a fourth configuration of hardware in the PUI according to the present invention.

FIG. 20 shows a view of the fourth example of hardware configuration in the PUI according to the present invention, and the hardware comprises a hard disk 2001A or an optical disk 2001B each of which is a filing means 101; an image scanner 2003 which is a reading means 103; a personal computer 2004 which is a searching means 104; and a color printer 2005A and/or a color display unit 2005B which is an outputting means 105.

Herein, in a case where a color printer 2005A is used as an outputting means 105, a related data file can be outputted in color, so that photographs and illustrations or the like can be outputted in color images, and for this reason, the convenience in use can be improved.

Also, in a case where a color display unit 2005B is used as an outputting means 105, a related data file can be outputted in color, so that color images can be seen with low costs. In other words, a low-cost color image document data administrating system can be constructed.

As described above, with the fourth example of hardware configuration, in addition to the same effects as those obtained in the first example thereof, the color display unit and color printer can be combined with each other and used, so that at first, the contents of data for a related data file can be checked and outputted by the color printer, which makes it possible to reduce output of unnecessary data. Also, the costs required for an output by a color printer is higher as compared to those required in a black-and-white printer and a longer period of time is also required therefor, so that the system can contribute to reduction both in the cost and time. Furthermore, by using a color display unit, moving pictures can be outputted thereon as the contents of data for a related date file.

(Fifth example of hardware configuration)

Figure 21:
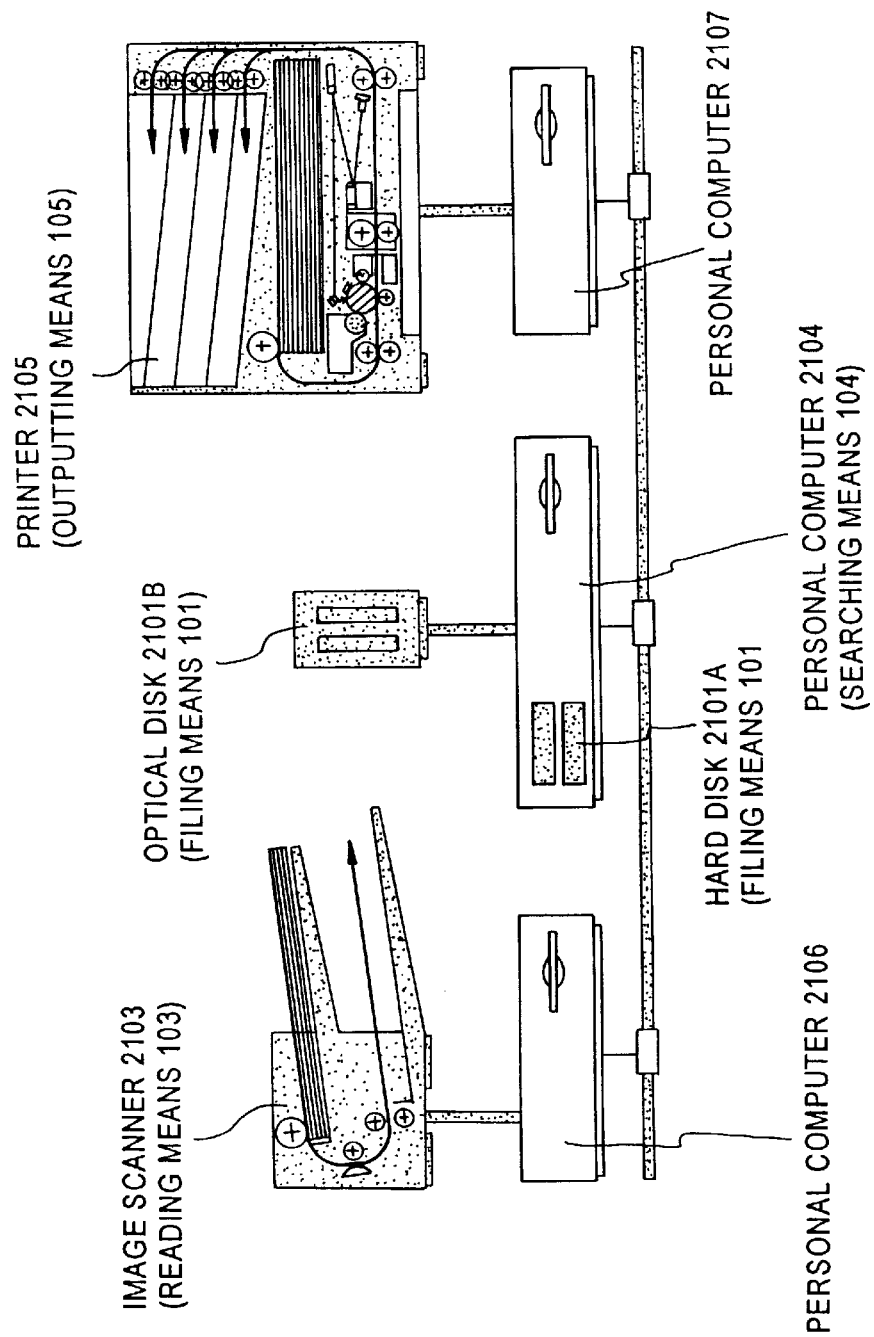
FIG. 21 is an explanatory view showing an example of a fifth configuration of hardware in the PUI according to the present invention.

FIG. 21 shows a view of the fifth example of hardware configuration in the PUI according to the present invention, and the hardware comprises a hard disk 2101A or an optical disk 2101B each of which is a filing means 101; an image scanner 2103 which is a reading means 103; a personal computer 2104 which is a searching means 104; a printer 2105 which is an outputting means 105; a personal computer 2106 for connecting the image scanner 2103 to a network; and a personal computer 2107 for connecting the printer 2105 to the network.

In other words, the system can be constructed as a system in which the plurality of means are connected to each other through the network.

As described above, with the fifth example of hardware configuration, in addition to the same effects as those obtained in the first example thereof, the plurality of means are connected to each other, so that the number of each type of devices and arrangement thereof can freely be set according to the necessity.

(Sixth example of hardware configuration)

Figure 22:
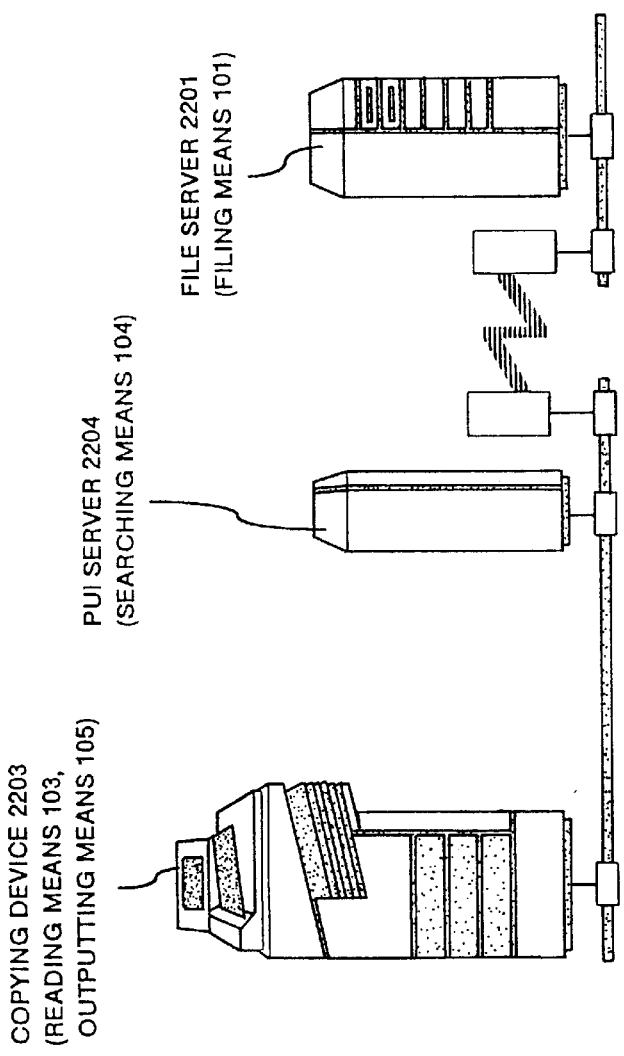
FIG. 22 is an explanatory view showing an example of a sixth configuration of hardware in the PUI according to the present invention.

FIG. 22 shows a view of the sixth example of hardware configuration in the PUI according to the present invention, and the hardware comprises a file server 2201 which is a filing means 101; a copying device 2203 which is a reading means 103 and an outputting means 105; and a special-purpose server (PUI server) 2204 which is a searching means 104, and the means are connected to each other through the network.

As described above, with the sixth example of hardware configuration, in addition to the same effects as those obtained in the fifth example thereof, the filing means 101 and the searching means 104 are separated each as an independent device respectively like the filing server and the PUI server, so that the number and the arrangement thereof can freely be decided according to the necessity. For instance, a unit of PUI server is provided in each of the sections of a company, a unit of filing server is provided in each branch office, and furthermore, a unit of filing server for the entire company is provided therein. By arranging the devices in a layered type as described above, the devices can discretely be arranged according to the quality of data for a related data file. In this step, the PUI server can access all of the filing servers connected to each other through the network.

Also, by having the PUI server had a function of administrating security data such as user ID and a password, the system can be constructed so that all services of PUI can be received from anywhere in the network if the Inper is prepared according to the rule.

9. Example of practical operations

Figure 23:
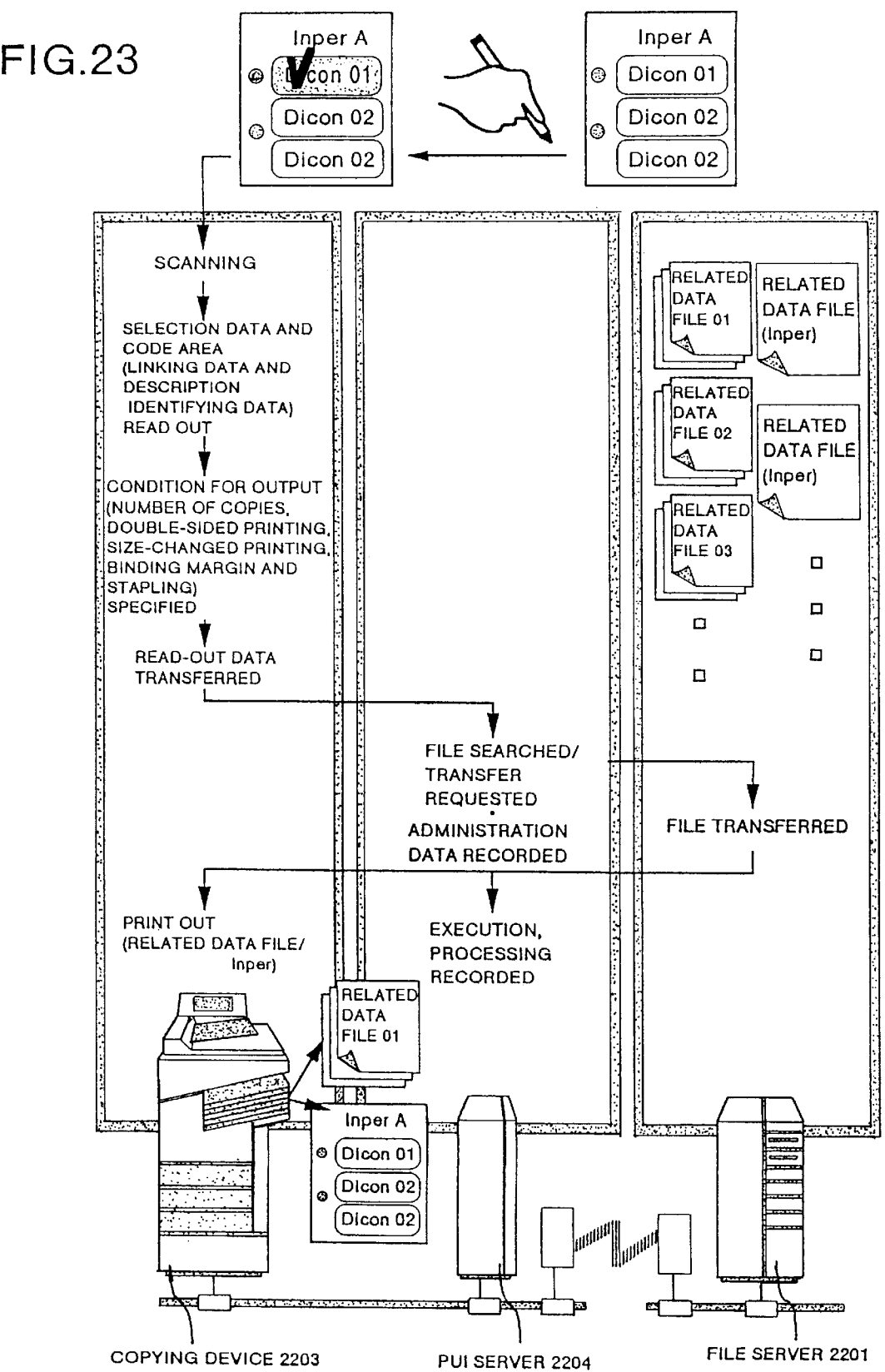
FIG. 23 is an explanatory view showing an example of concrete operations.

Description is made for an example of practical operations of PUI (the document data administrating system and the method of administrating document data) according to the present invention. FIG. 23 is the same example as the sixth example of hardware configuration shown in FIG. 22, and shows an example in which a plurality of means are connected to each other through a network.

At first a user additionally writes (marking) marks on Dicons of desired data on Inper, so that selection data are added thereto.

Next, the Inper is scanned by the copying device 2203 (reading means 103), and the linking data and the document identifying data each recorded in the code area 206 of the Inper and also the marked selection data are read out.

Then, the user inputs conditions for output (a number of copied sheets, a double-sided printing, printing with an image size changed, forming of a binding margin, and stapling or the like) for specification by using an operation panel on the copying device 2203.

The copying device 2203 transfers the read out selection data and linking data to the special-purpose server (PUI server) 2204. And also at the same time, the copying device transfers document identifying data (Inper ID) for identifying the Inper to the special-purpose server 2204.

The dedicated server (PUI server) 2204 specifies data for an address of a related data file or data for Dicon recognizing data (Dicon ID) corresponding to the selected Dicon according to the received selection data and linking data, the related data file in the filing server 2201 is searched through the network according to the specified address of the related data file or the description recognizing data (Dicon ID), and the corresponding related data file is transferred to the copying device (outputting means 105) 2203. Also, the corresponding related data file (namely, Inper the same as the Inper read out by the copying device 2203 operated by the user) is transferred to the copying device 2203 according to the received document identifying data (Inper ID).

The copying device 2203 prints out the received related data file onto a recording paper according to the specified conditions for an output. With this feature, the related data file corresponding to the selected Dicon and the Inper (Inper in a state before marked) identical to the used Inper are printed out. On the other hand, the PUI server 2204 records administration data such as processing of the access and execution.

In the PUI according to the present invention as described above, a desired related data file can automatically be outputted only by selecting a Dicon on the Inper, adding selection data to the desired Dicon by marking it, and having the copying device 2203 read it.

It should be noted that, although not described in relation to the example of operations, the marked and used Inper may automatically be recovered by adding a function of recovering Inper to the copying device 2203.

FIG. 24 to FIG. 27 each show examples of output of a related data file.

Figure 24:
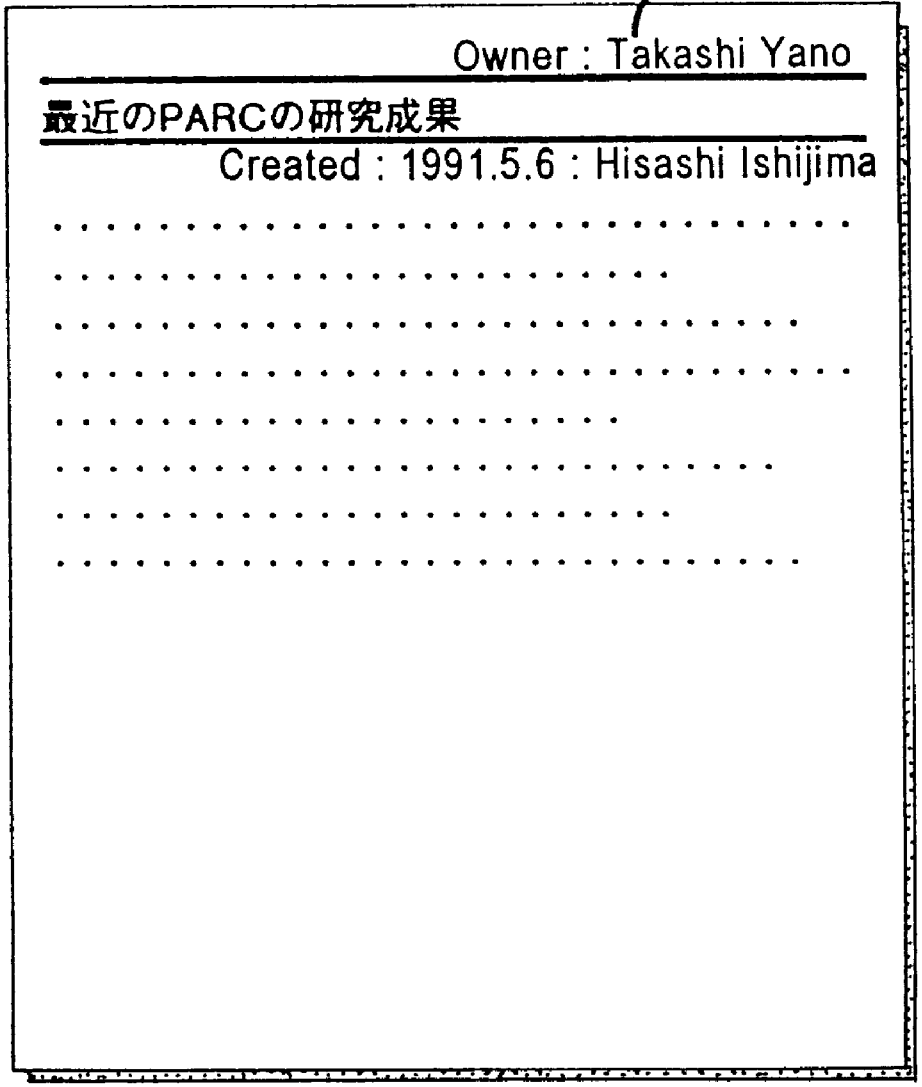
FIG. 24 is an explanatory view showing an example of an output in a case where the related data file is a document.
Figure 25:
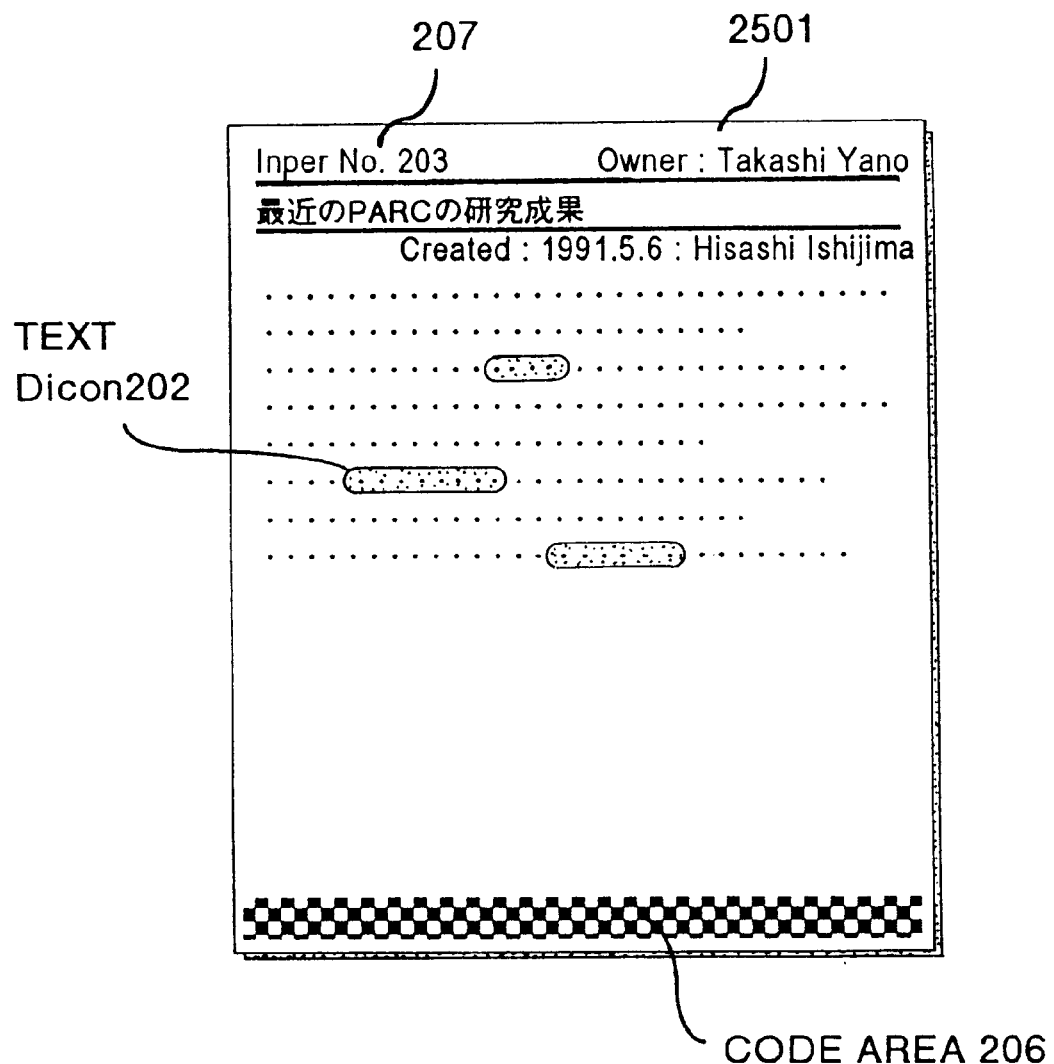
FIG. 25 is an explanatory view showing an example of an output in a case where the related data file is Inper (Medium paper)

FIG. 24 shows an example of an output in a case where a related data file is a document, and FIG. 25 shows an example of an output in a case where the related data file is Inper. The contents of data (document) for the related data file corresponding to the selected Dicon is outputted on the recording paper 2401 shown in FIG. 24. The contents of data (document) for the related data file corresponding to the selected Dicon is outputted on the recording paper 2501 shown in FIG. 25, but in this case, the related data file is Inper, so that a Dicon (a text Dicon 202 herein) and a code area 206 exist in the outputted document. Inper ID 207 for identifying Inper is also outputted on the document therewith.

To make it easy to find by which Dicon on which Inper recorded paper on which the contents of a related data file is outputted is selected and outputted, for instance, the document identifying data of the Inper and the name thereof, and the Dicon and Dicon ID selected by the selection data may concurrently be outputted as attached data thereto. With this feature, it can easily be identified to the related data file in which Dicon in which Inper the outputted recorded paper corresponds. Also, when outputted recording papers are arranged, convenience in use for a user can be improved.

Figure 27:
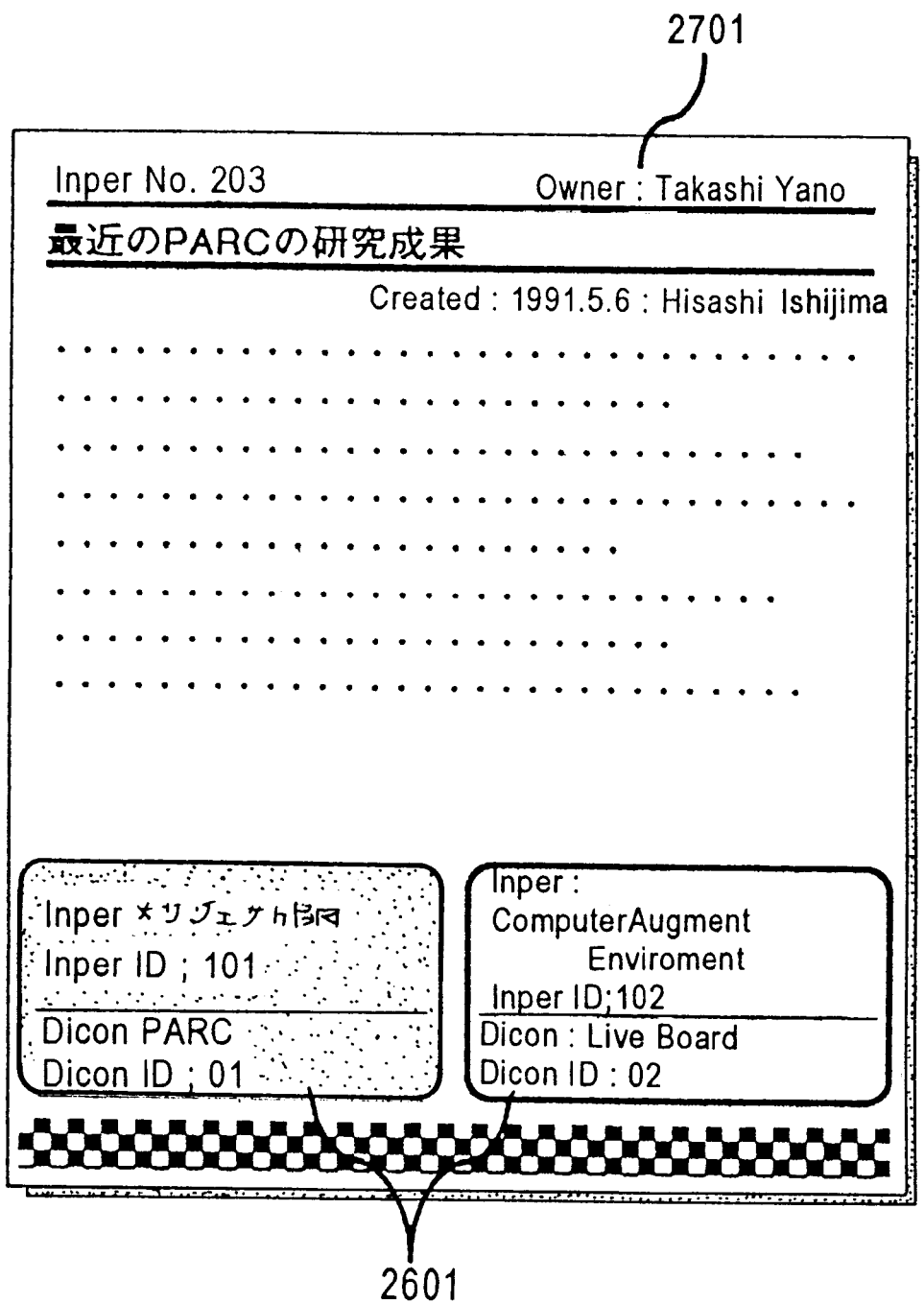
FIG. 27 is an explanatory view showing an example in which a Dicon and Dicon ID each selected according to document identifying data and a name of the Inper of the read Inper as well as to selection data are outputted onto a recorded paper as attached data.

FIG. 26 and FIG. 27 each show examples of outputs of the read-out document identifying data of the Inper and the name thereof, and the Dicon and Dicon ID selected by the selection data on the recording paper as an attached data 2601, and in FIG. 26, the attached data 2601 and the recording paper 2401 on which the related data file is outputted are outputted each to a different recording paper respectively. This attached data 2601 may be outputted as an attached sheet of paper (a recording paper) each time when a related data file is outputted, and may be outputted as an attached sheet of paper (a recording paper) for attached data 2601 for a series of related data files collected therein.

In FIG. 27, attached data 2601 is synthesized with data for a related data file, and is outputted as a sheet of recording paper 2701.

Although further detailed description is not made herein, as an example of data outputted by PUI according to the present invention, for instance, the filing means 101 automatically prepares and stores therein the document identifying data for Inper and the name thereof each read out by the reading means 103 as well as the Dicon and Dicon ID each selected by the selection data as a history related data file when transferring a corresponding related data file, and also adds a Dicon linked to the history related data file (Dicon named as History) to the related data file to be transferred for transfer.

The reading means 103 reads this history Dicon to which a user adds a mark, whereby data, for the history related data file storing therein the document identifying data of Inper and the name thereof as well as the Dicon and Dicon ID each selected by the selection data, may also be outputted.

Figure 28:
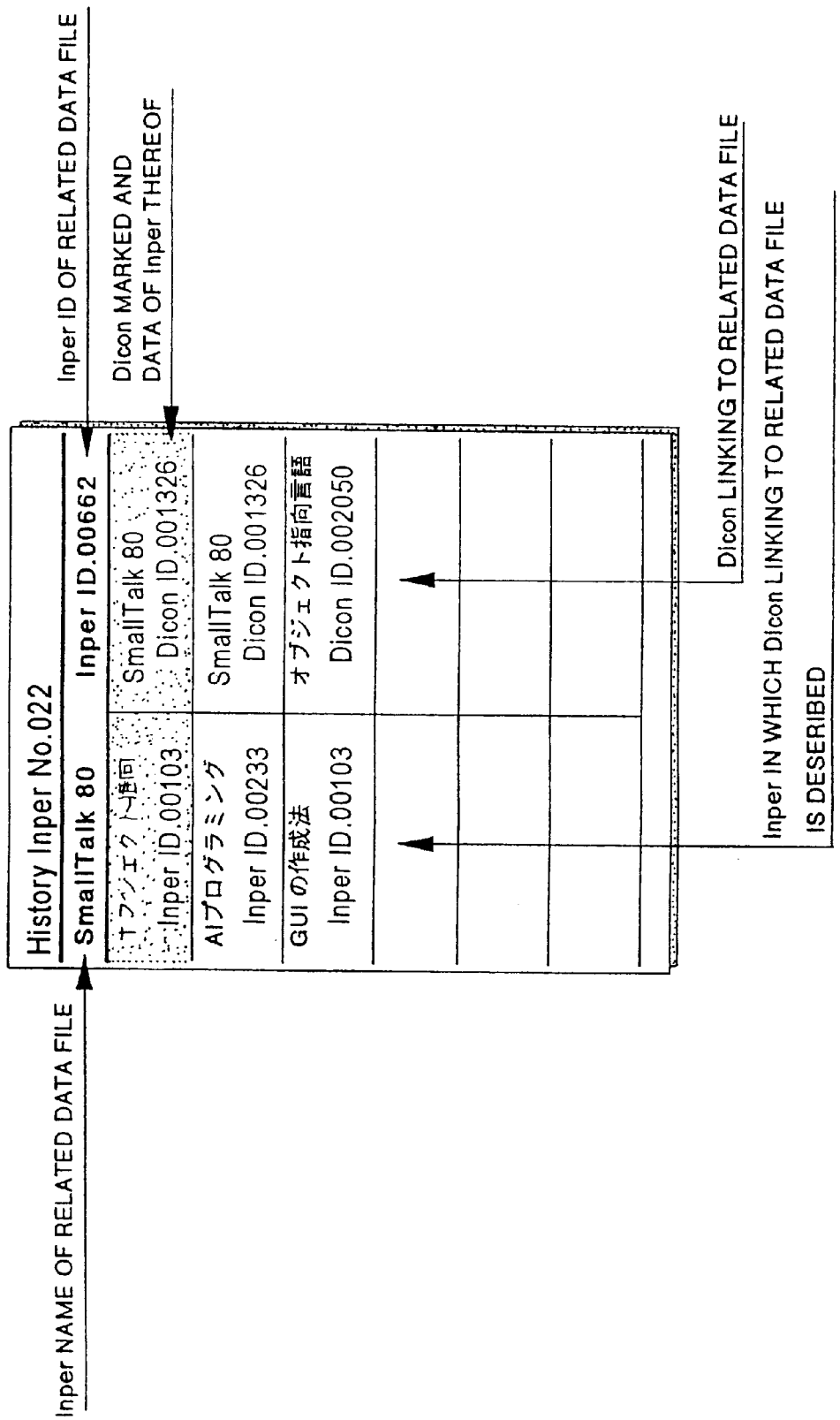
FIG. 28 is an explanatory view showing an example of an output of a history-related data file collected for each Inper.

It should be noted that some of Histories are generally collected and compiled into a history related data file. There are some methods of collecting them, such as a method of collecting them for each of users, and a method of collecting them for each of Inpers each having a Dicon linking to the outputted related data file. FIG. 28 shows an example of an output of a history related data file collected for each of Inpers. Inper which a user does not see is written therein. Also, a Dicon different from that to which a user writes a mark is also written therein. By referring to this data, the user can trace back with the configuration of the link between the related data file and Inper, and furthermore, the user can search and refer to other related data files and Inpers.

Next detailed description is made for other document data administrating system and the method of administrating document data according to the present invention with the reference to the related drawings in the order of [General configuration of the present invention], [Embodiment 1], [Embodiment 2], [Embodiment 3], [Embodiment 4], [Embodiment 5], [Embodiment 6], [Embodiment 7], [Modified examples in Embodiments 1 to 7], [Examples each of an output of related data according to Embodiments 1 to 7], and [Effects of the embodiments].

[General configuration of the present invention]

At first, description is made for general configuration of the present invention with reference to FIG. 29 to FIG. 34.

Figure 29:
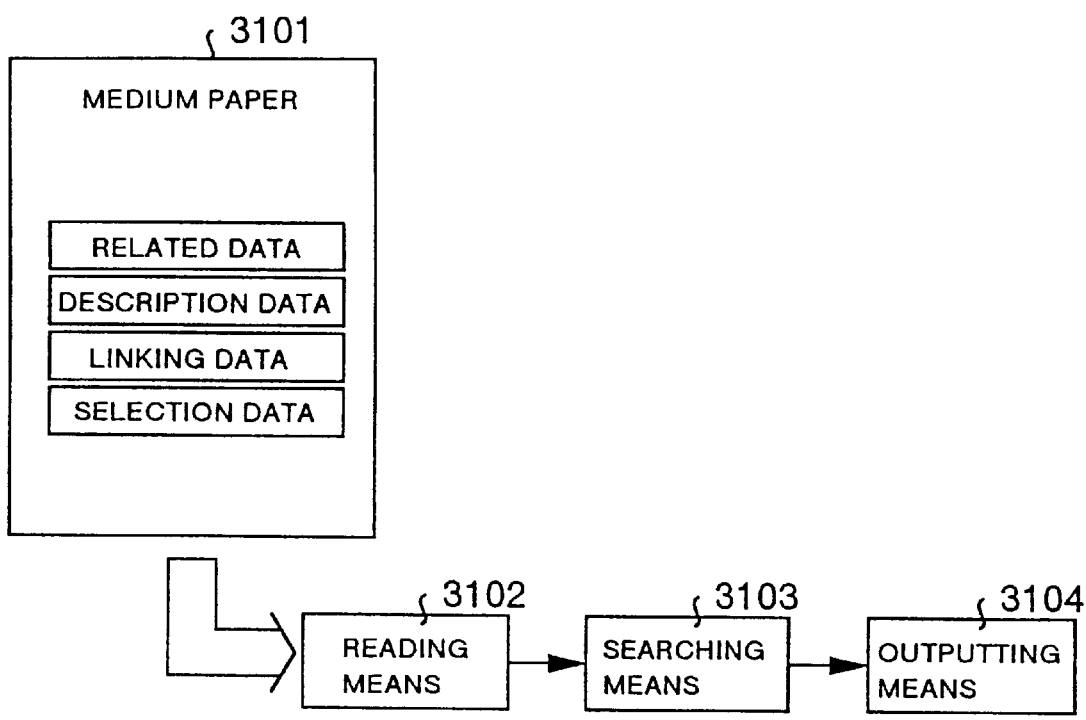
FIG. 29 is a block diagram showing the document data administrating system according to the present invention.

FIG. 29 shows a block diagram of the document data administrating system according to the present invention, and the system comprises medium paper 3101 in which at least one piece of related data comprising data related to particular words, texts, symbols, or graphics; at least one piece of description data comprising any of words, texts, symbols, and graphics; linking data for linking the description data to the related data; and selection data for selecting a particular description data among the description data are recorded; a reading means 3102 for reading the selection data, linking data, and related data from the medium paper 3101; a searching means 3103 for searching corresponding related data from the related data according to the selection data and linking data read out by the reading means 3102; and an outputting means 3104 for outputting the corresponding related data searched by the searching means 3103.

Figure 30:
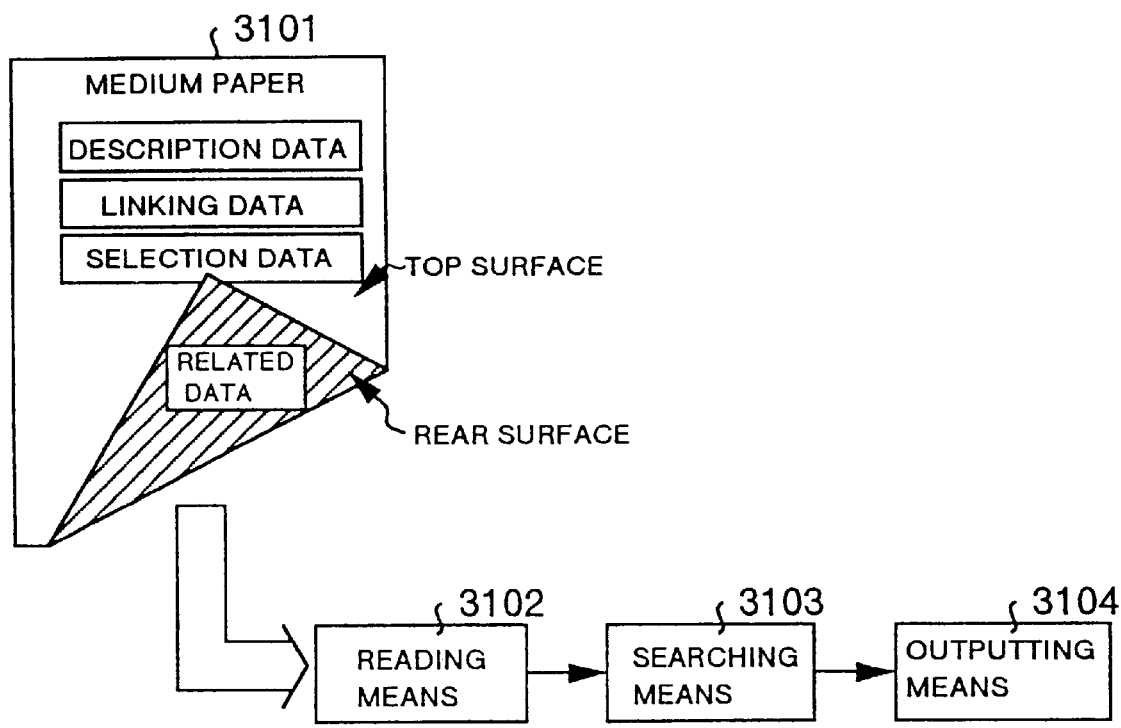
FIG. 30 is a block diagram showing the document data administrating system according to the present invention.

FIG. 30 shows a block diagram of the document data administrating system according to the present invention. Although this diagram is basically the same as that shown in FIG. 29, the related data is recorded on the rear surface of medium paper 3101.

Figure 31:
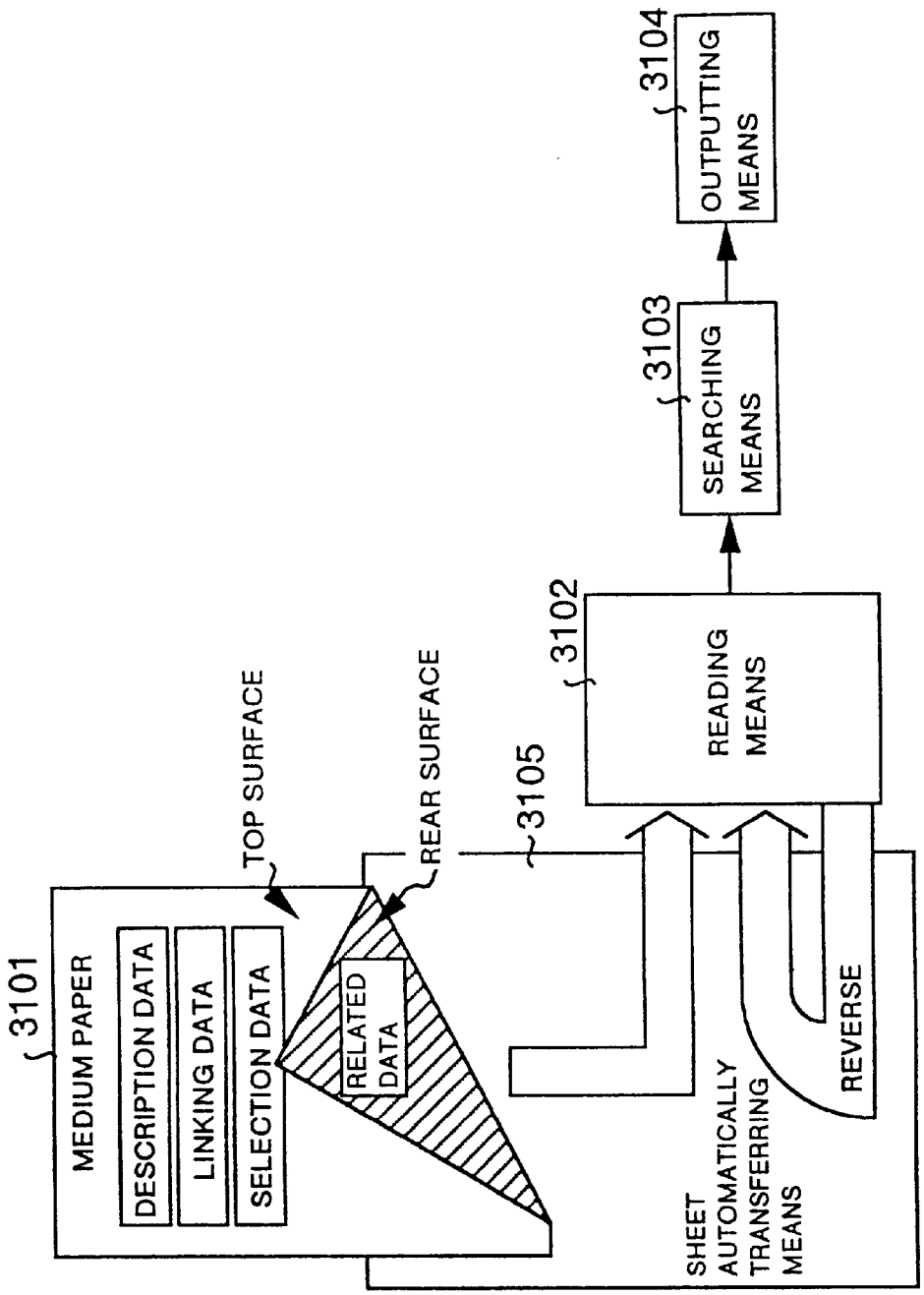
FIG. 31 is a block diagram showing the document data administrating system according to the present invention.

FIG. 31 shows a block diagram of the document data administrating system according to the present invention. Although this diagram is basically the same as that shown in FIG. 29, the system comprises a sheet automatically transferring means 3105 for transferring the medium paper 3101 to the reading means 3102, reversing the medium paper 3101 after the reading means 3102 reads out one side of the medium paper 3101, and transferring again the paper to the reading means 3102.

Figure 32:
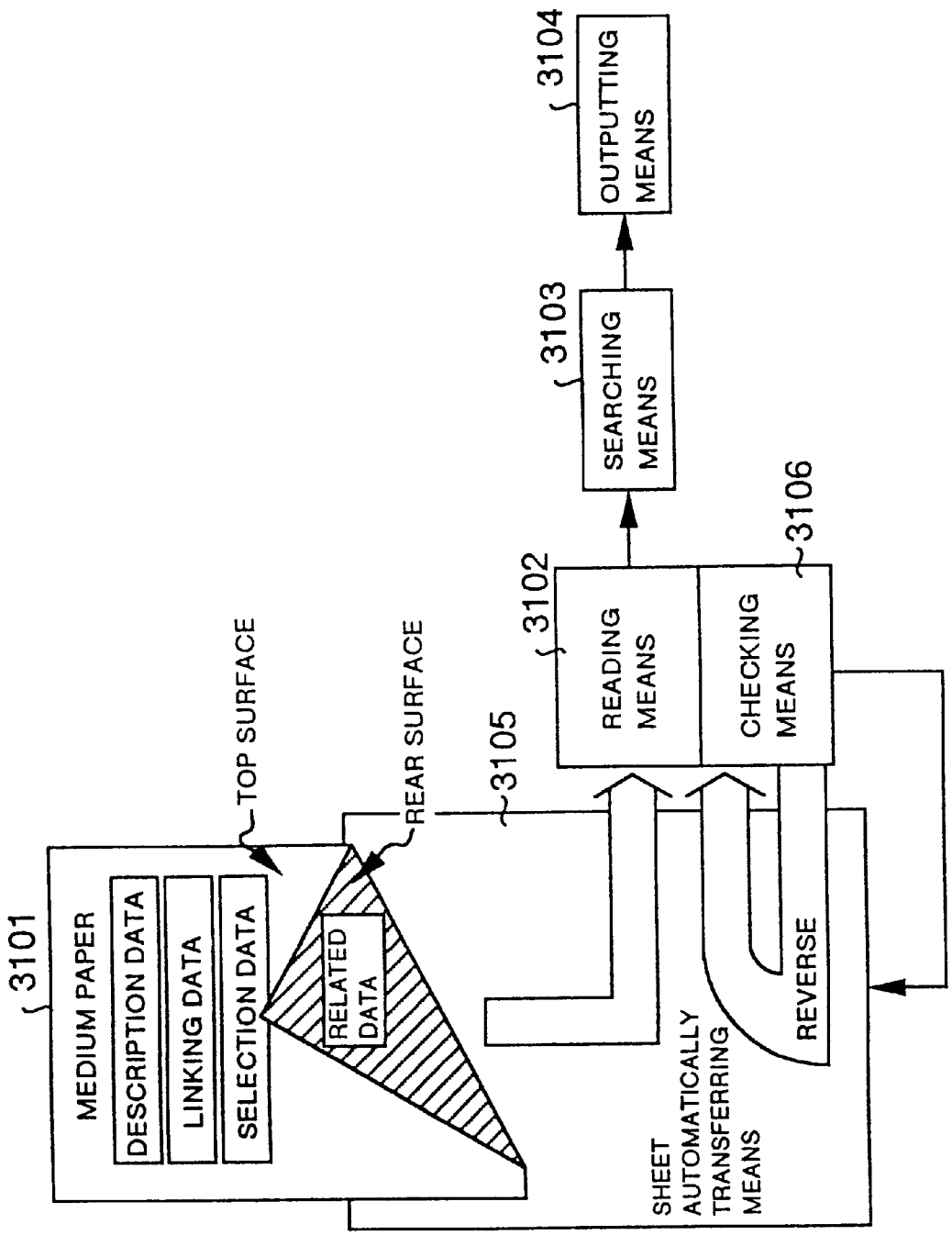
FIG. 32 is a block diagram showing the document data administrating system according to the present invention.

FIG. 32 shows a block diagram of the document data administrating system according to the present invention. Although this diagram is basically the same as that shown in FIG. 29, the system comprises a sheet automatically transferring means 3105 for transferring medium paper 3101 to the reading means 3102, reversing the medium paper 3101 after the reading means 3102 reads out one side of the medium paper 3101, and transferring again the paper to the reading means 3102; and a checking means 3106 for checking whether related data is recorded on the rear surface of the medium paper 3101 or not, and the sheet automatically transferring means 3105 carries out the medium paper as it is after the reading means reads out one side of the medium paper 3101 in a case where it is determined that related data is not recorded thereon by the checking means 3106, and reverses the medium paper 3101 after the reading means 3102 reads out one side thereof in a case where it is determined that related data is recorded thereon by the checking means 3106, and transfers again the medium paper to the reading means 3102. It should be noted that the checking means 3106 and the reading means 3102 may constitute the identical device, or each of which may comprise a different device respectively.

Figure 33:
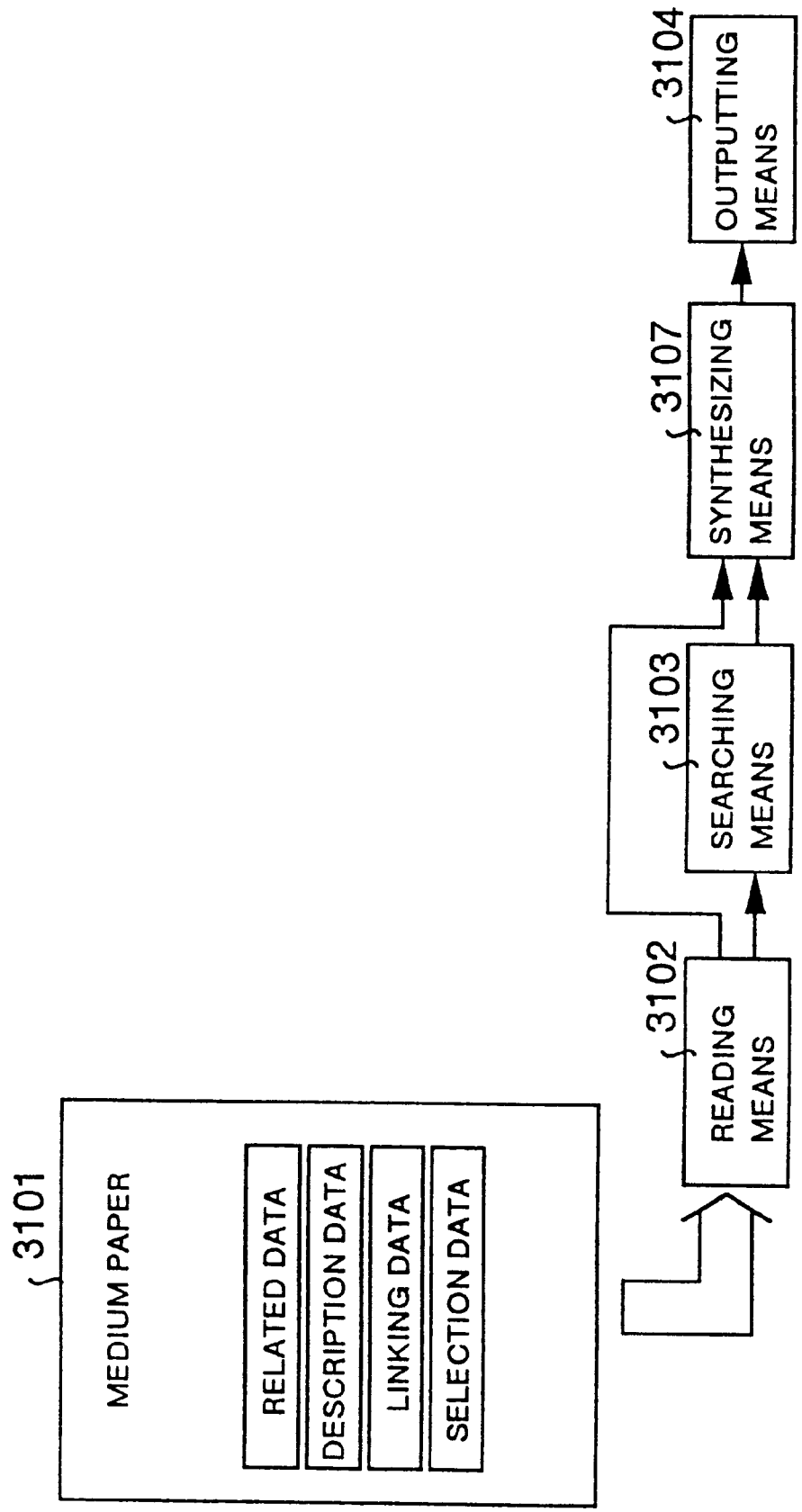
FIG. 33 is a block diagram showing the document data administrating system according to the present invention.

FIG. 33 shows a block diagram of the document data administrating system according to the present invention, and this diagram is basically the same as that shown in FIG. 29, but the system comprises a synthesizing means 3107 for receiving corresponding related data searched by the searching means 3103 and an image on the medium paper 3101 read out by the reading means 3102, and synthesizing the corresponding related data to the image on the medium paper 3101, and the outputting means 3104 outputs the image synthesized by the synthesizing means 3107. In this step, the synthesizing means 3107 synthesizes the corresponding related data near the selection data in the image on the medium paper 3101, synthesizes the corresponding related data in the image on the medium paper 3101 as a footnote, or synthesizes the corresponding related data immediately after the selected description data is positioned in the image on the medium paper 3101.

FIG. 34 shows a block diagram of the document data administrating system according to the present invention, and this diagram is basically the same as that shown in FIG. 29, but the system comprises a medium paper identifying means 3108 for identifying whether paper as an object to be read is medium paper 3101 or not, and the reading means 3102 reads selection data, linking data, and related data from the medium paper 3101 in a case where it is identified as medium paper by the medium paper identifying means 3108. It should be noted that the medium paper identifying means 3108 and the reading means 3102 may comprise the identical device, or each of which may comprise a different device respectively.

It should be noted that the related data is data related to particular words, texts, symbols, or graphics, and the particular words, texts, symbols, or graphics in this step are ones each of which can be used as description data for the medium paper 3101. In other words, data related to words, texts, symbols, or graphics each of which can be used as description data for the medium paper 3101 is recorded as the related data. Also, by treating the related data with the one-dimensional bar code or two-dimensional bar code, the searching means 3103 may convert the data recorded with the one-dimensional bar code or two-dimensional bar code to image data and output it to the outputting means 3104.

Description data on the medium paper 3101 (data comprising any of words, texts, symbols, or graphics) are recorded at given positions on the medium paper 3101, and the description data recorded at the given positions and the related data are linked with linking data, and furthermore, particular description data is selected with the selection data among the description data stored at the give positions.

In other words, linking data comprises description position data for each of description data on the medium paper 3101 respectively and address data for correlating the description position data to the related data, or comprises description position data for each of description data on the medium paper 3101 respectively and description recognizing data for recognizing the description data written at a position in the description position data, and has such configuration as to which corresponding related data can be searched by specifying the description position data.

Accordingly, when particular description data is selected with the selection data, the related data corresponding thereto can be searched from the description position data for the corresponding description data.

As described above, the related data recorded on the medium paper 3101 can be searched from the description data recorded at the given position thereon and outputted.

Also, it is possible to realize a hyper text (a paper hyper text) with the medium paper 3101 without using a display unit, a mouse, and a keyboard or the like. It should be noted that a paper hyper text is defined as a concept herein in which a paper document is handled as a document for the hyper text, and the hyper text can be realized with the paper document. Also in a case where a paper hyper text is realized with medium paper 3101, the related data desirably includes at least one piece of description data comprising any of words, texts, symbols, and graphics as data related to particular words, texts, symbols, and graphics, as well as linking data for linking the description data to other related data.

In the document data administrating system and the method of administrating document data according to the present invention, a paper hyper text with the medium paper 3101 described above can be realized.

Next description is made hereinafter for the document data administrating system and method of administrating document data according to the present invention as PUI (Paper User Interaction) as a system and a method for realizing interaction between a user (person) and a computer (data transfer, an interactive interface) with Paper (medium paper 3101).

Also in the PUI, the medium paper 3101 is defined as Inper (Interact Paper), and description data recorded in the Inper is defined as a Dicon (Document icon).

Furthermore, as described above, a paper document is handled as a document for a hyper text, and a concept on realizing a hyper text with a paper document is defined as a paper hyper text. Accordingly, Inper in the PUI indicates a document itself for a hyper text in the concept on the paper hyper text, and a Dicon in the Inper indicates a switch printed on the paper (equivalent to a button or an icon in an ordinary hyper text).

[Embodiment 1]

Detailed description is made hereinafter for the PUI (the document data administrating system and the method of administrating document data) in the order as follows.

1. Configuration of Inper (medium paper 3101)
2. Hardware configuration in Embodiment 1
3. Roles of Dicons (description data)
4. Concrete example of selection data
5. Configuration of related data
6. Related data which Inper has to obtain
7. Other administration data in a code area
8. General operations in Embodiment 1

1. Configuration of Inper (Medium paper 3101)

Figure 35A:
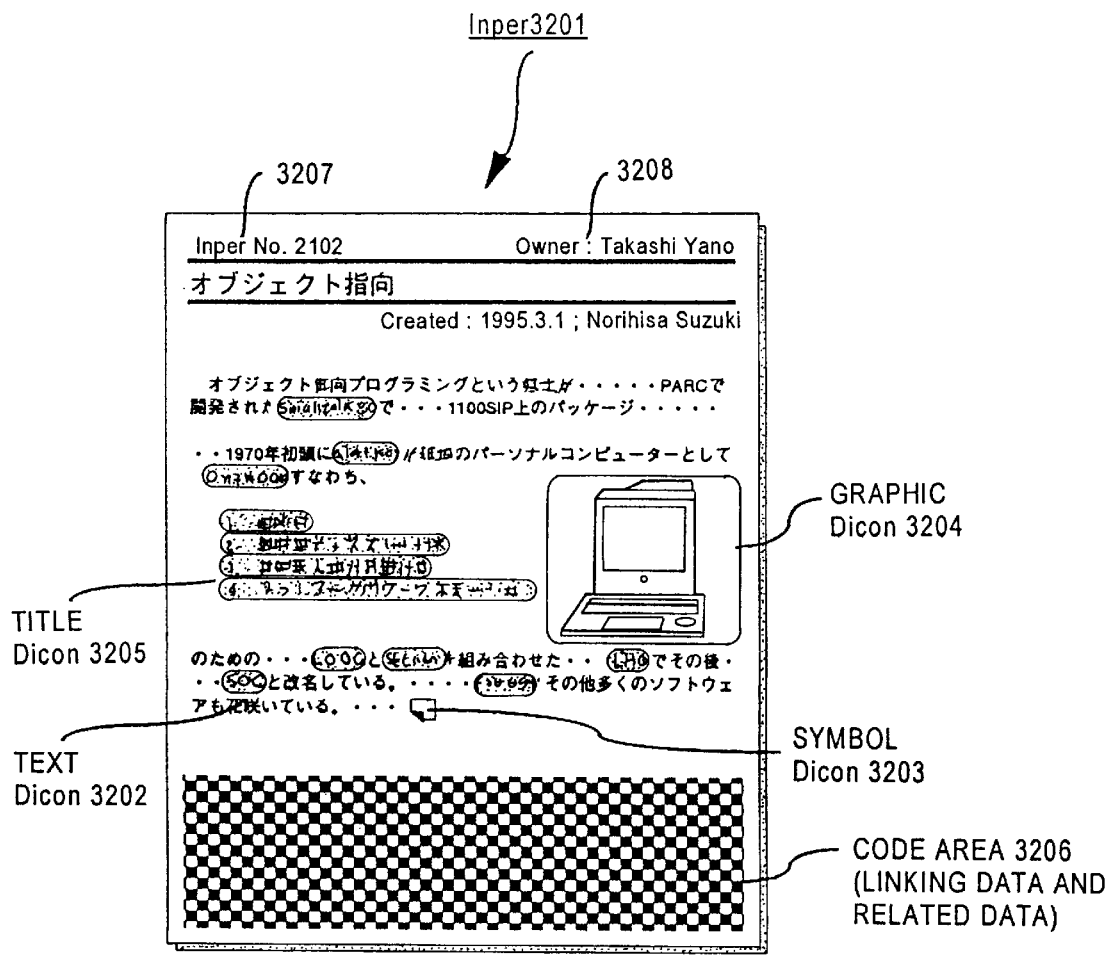
FIGS. 35A and 35B are an explanatory view showing configuration of Inper (Medium paper) of the PUI according to Embodiment 1.
Figure 35B:
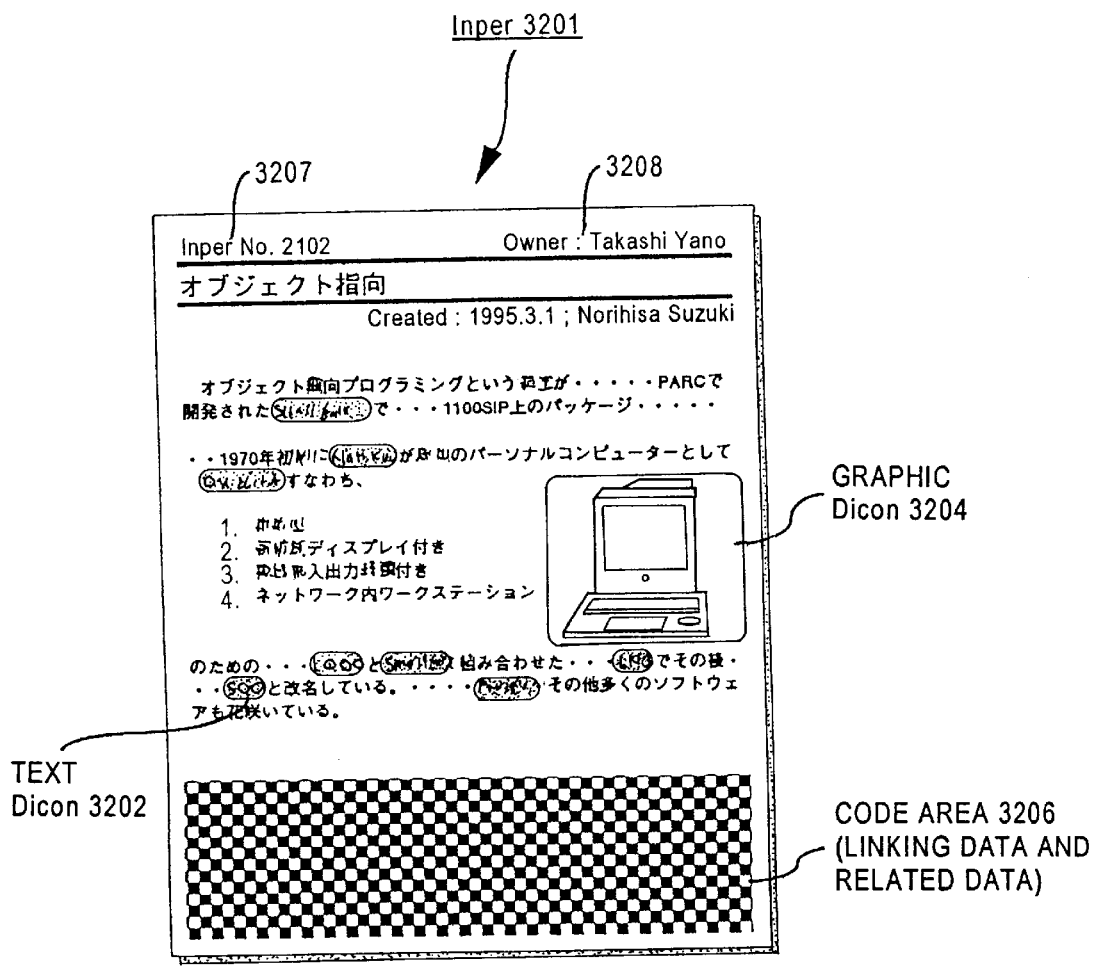

FIG. 35A and FIG. 35B show configuration of Inper (medium paper 3101) for PUI according to Embodiment 1. It should be noted that Inper is paper on which at least one piece of related data comprising data related to particular words, texts, symbols, and graphics, a Dicon that is at least one piece of description data comprising any of words, texts, symbols, and graphics, linking data for correlating the Dicon to the related data, and selection data for selecting a particular Dicon among Dicons are recorded. However, related data, description data, and linking data are previously recorded in Inper, but selection data is recorded on the Inper with a user writing (marking) it thereon as required.

As shown in FIG. 35A, in the Inper 3201 which is medium paper 3101, words and texts are recorded as a text Dicon 3202, an icon (symbol) indicating a document is recorded as a symbol Dicon 3203, a computer pattern is recorded as a graphic Dicon 3204, and words and a short text are recorded as a title Dicon 3205. Also related data and linking data are recorded in a code area 3206 in an optically readable form like two-dimensional bar code. It should be noted that the reference numeral 3207 indicates Inper ID with which a user identifies the Inper 3201, and the reference numeral 3208 indicates Owner ID shown with characters so that the user can identify an owner of the Inper 3201.

It should be noted that all Dicons (3202 to 3205) which are the description data are not necessarily recorded in a sheet of Inper 3201, and at least any one of those Dicons may be written therein. For instance, as shown in FIG. 35B, Inper 3201 in which a text Dicon 3202 and a graphic Dicon 3204 are recorded as a Dicon may be acceptable.

As shown in the figure, the Inper 3201 is visually identical to an ordinary document outputted onto a recording paper. Accordingly, it is needless to say that the Inper 3201 can be used as an ordinary document.

2. Hardware configuration in Embodiment 1

Figure 36:
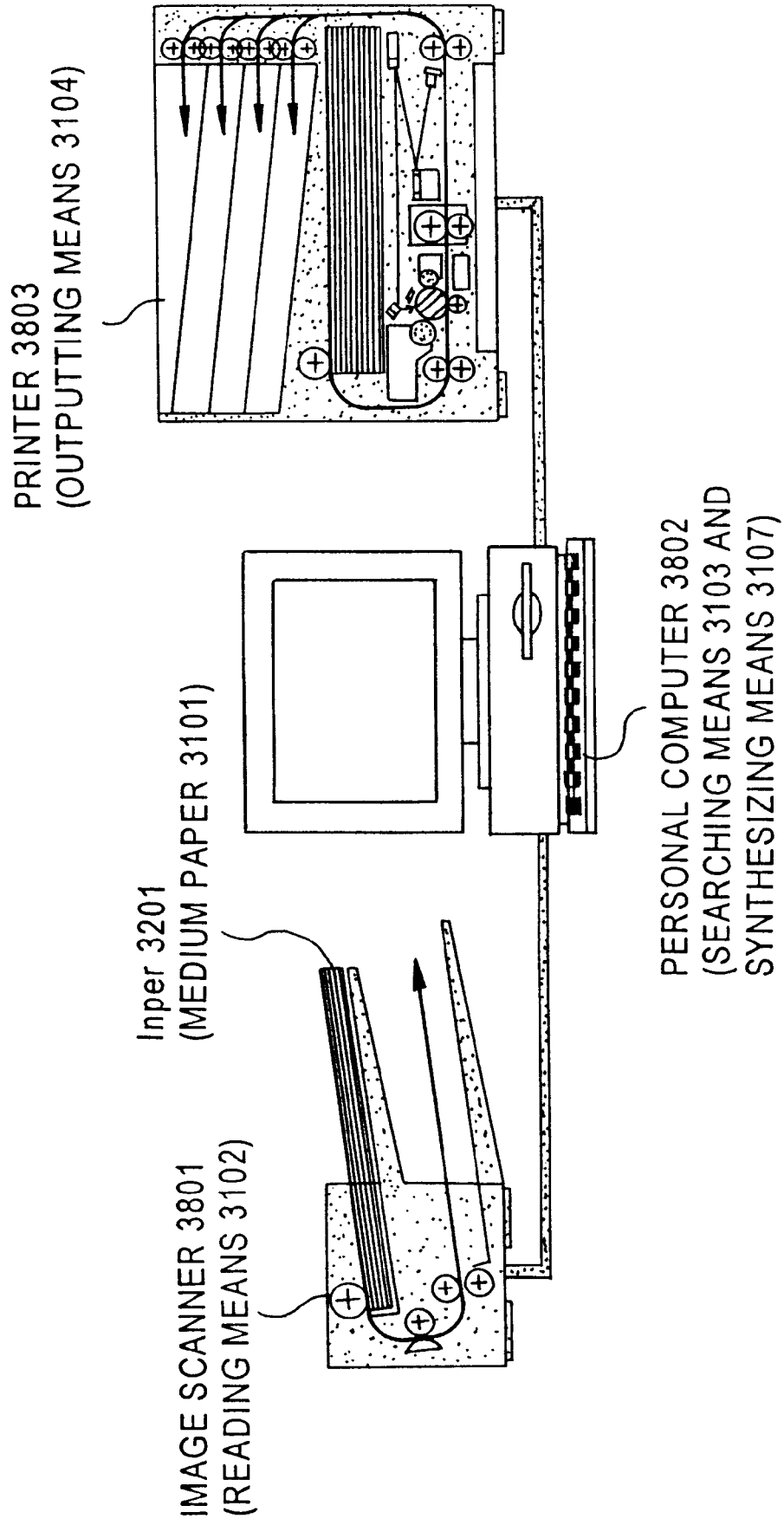
FIG. 36 is a view showing configuration of hardware of the PUI according to Embodiment 1.

FIG. 36 shows hardware configuration of PUI according to Embodiment 1. The PUI according to Embodiment 1 comprises an image scanner 3801 which is a reading means 3102; a personal computer 3802 which plays roles of a searching means 3104 and a synthesizing meas 3107; and a printer 3803 which is an outputting means 3104.

Herein, the image scanner 3801 may have only resolution so as to enable reading of selection data, linking data, and related data, and, for instance, a range of the resolution from 300 dpi to 400 dpi is sufficient although requirement of resolution is different according to systems of two-dimensional bar code in a code area 3206. Also, for a personal computer 3802 used as a searching means 3103, a keyboard and a display are not required as a rule.

With the example of hardware configuration in Embodiment 1, the existing device is used for each of the means, which makes it possible to construct the low-cost system. Also, a personal computer is used therefor, so that software is easily installed therein. Furthermore, recognition of data for Inper read out by the scanner and searching of the related data are executed with software, which makes it possible to easily change the level up or the like of the system.

3. Roles of Dicons (description data)

Detailed description is made herein for roles of Dicons each recorded in the Inper 3201.

Figure 37:
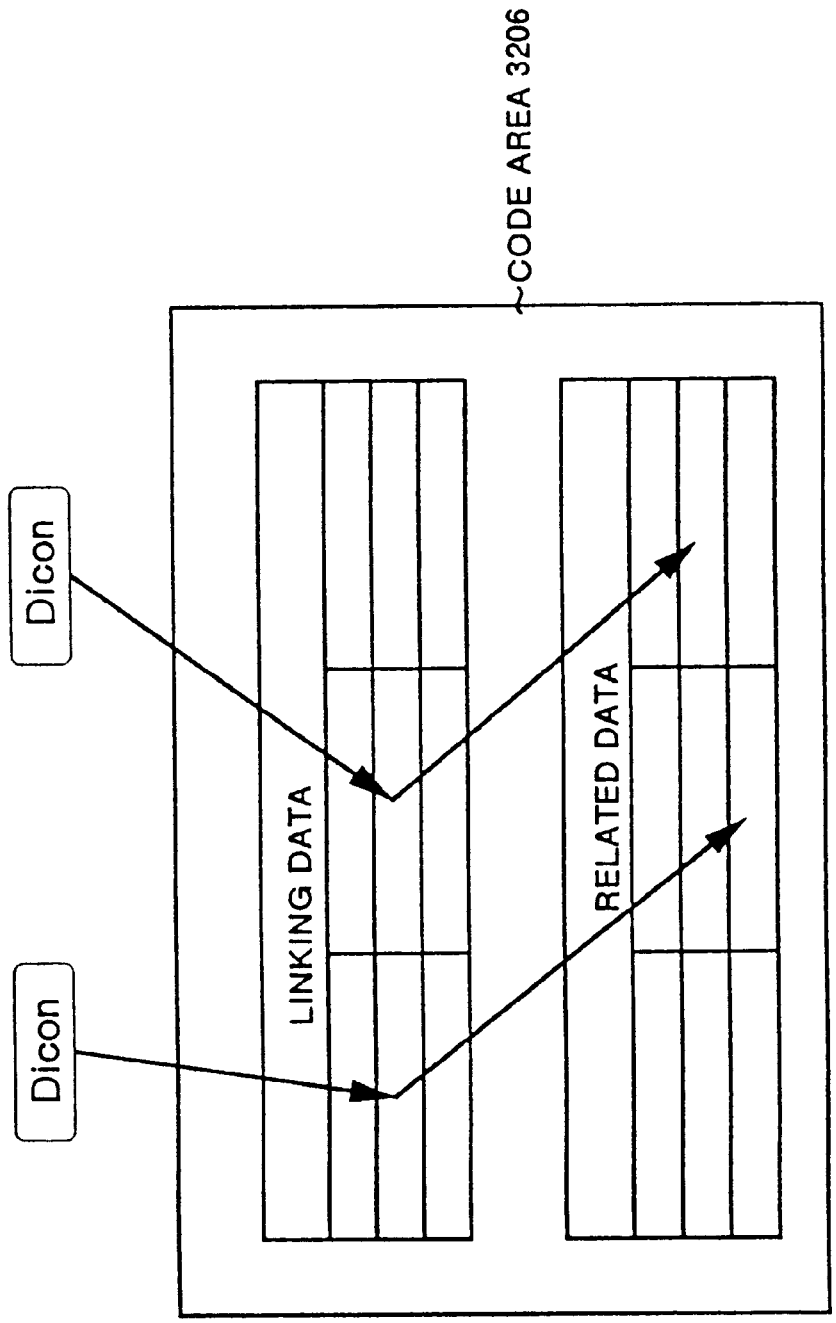
FIG. 37 is an explanatory view showing a linked relation between Dicon and the related data.

As shown in FIG. 37 and with reference to FIGS. 35A and 35 B, Dicons (3202 to 3205) recorded in the Inper 3201 are linked (connected) to the related data through the linking data in the code area 3206. Accordingly, when a desired Dicon is selected among the plurality of Dicons recorded on the Inper 3201, related data linked to the selected Dicon can be specified.

Namely, Dicons have a role as visual data recorded on the Inper 3201, and also play a role of switches each for selecting the related data. In other words, conceptionally, Dicons are defined as ones playing a role as switches like buttons or icons on the hyper text.

Next description is made for types of Dicon. The Dicon comprises, as shown in FIG. 35A, four types of a text Dicon 3202, a symbol Dicon 3203, a graphic Dicon 3204, and a title Dicon 3205, and each of the Dicons is defined as follows.

A text Dicon:

A Dicon written in forms of words and short texts each used in a text in a form of hyper text.

A symbol Dicon:

A Dicon in a form of an icon added to the end of a long text, or added to the entire contents of Inper.

A graphic Dicon:

A Dicon in a form of rough illustrations and photographs each linking to detailed illustrations, photographs, and drawings.

A title Dicon:

A Dicon in which titles of related data linking to corresponding Dicon are written in forms of contents and a list.

Next description is made for a method of indicating Dicons. It is required to visually identify Dicons from data other than the Dicons so that a user can easily and surely recognize Dicons on Inper. Accordingly, in the present invention, Dicons can be distinguished therefrom by decorating them as described later.

Applicable to decoration in a text Dicon 3202, as shown in FIG. 35A, are a method of coloring the background, a method of changing fonts (e.g. a Ming-style type to a Gothic type or the like), a method of changing styles of type (e.g. a Italic type, a bold-face, or addition of an underline or the like), a method of changing colors of characters (e.g. black to blue), and a method of enclosing a Dicon with a flame.

As shown in FIG. 35A, a method of enclosing a Dicon with a flame and a method of coloring the back ground are applicable to the decoration of the title Dicon 3205 as well as of the graphic Dicon 3204.

Decoration is not required for a symbol Dicon 203 because the Dicon itself is clearly understood as a Dicon. However, it is needless to say that decoration may be executed thereonto.

On the other hand, if decoration is executed onto Dicons in a case where quite many of Dicons are arranged on Inper, a text in the Inper becomes complicated, which makes it difficult to distinguish a Dicon from another. In this case, a Dicon on the Inper can not be recognized, so that a user sometimes selects words or the like other than Dicons on selection of Dicons. For this reason, when words or something else other than the Dicons are selected, it is required that a massage or the like on the matter described above is outputted through the outputting means 3104.

4. Concrete example of selection data

Selection data is data for selecting a particular Dicon among the Dicons written on the Inper. For instance, a written (marked) mark can be used as selection data. Any types of writing tool may be used for writing additional information (marking) so long as a mark can be optically read by the reading means 103, and generally a marker such as a felt-pen or the like is used.

In this step, if color of a marker is previously specified and a color scanner is used as an image scanner 3801(a reading means 3102), a high recognition rate can be obtained.

FIG. 38A to FIG. 38C each show examples of writing additional information (marking) for selection data. As shown in the figures, forms of selection data are not particularly restricted, and the method of enclosing a Dicon to be selected with a marker as shown in FIG. 38A, a method of painting out a Dicon to be selected with a marker as shown in FIG. 38B, and a method of marking it with a marker (a mark with V herein) as shown in FIG. 38C can be applied thereto.

5. Configuration of linking data

Linking data is data written in a code area 3206 as two-dimensional bar code as described above and for linking Dicon and the related data.

Also linking data comprises, for instance, description position data of each of the Dicons on Inper and address data for having the description position data correspond to the related data, or comprises description position data of each of the Dicons on Inper and description recognizing data for recognizing description data written at positions in the description position data, respectively.

Figure 39:
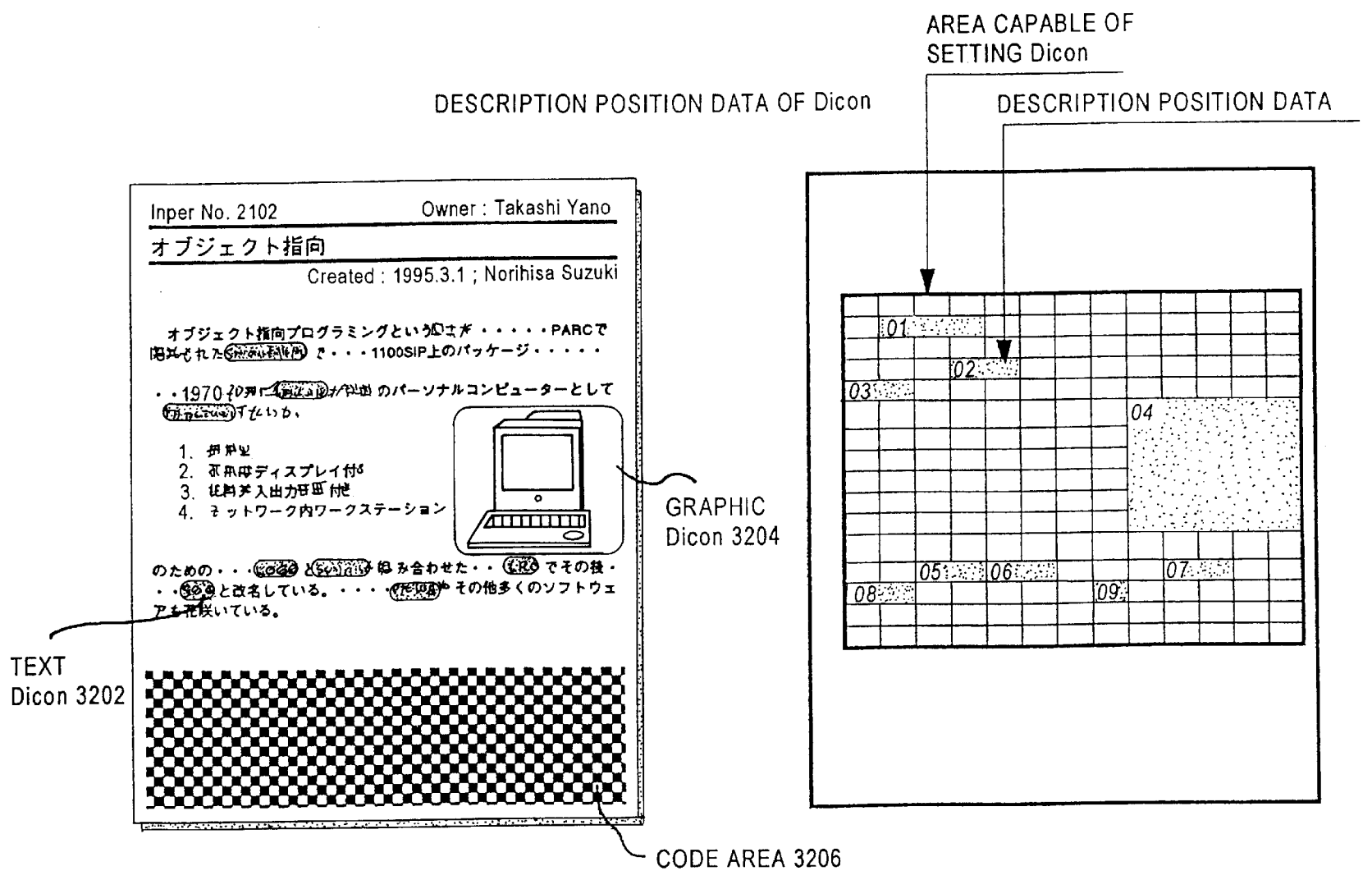

Herein, description is made for description position data which is a portion of linking data with reference to FIG. 39. description position data is data for specifying a position of each of Dicons on Inper respectively, and may comprise, for instance, as shown in the figure, data comprising positions and areas of Dicons each on a map, and a Dicon number attached to each of Dicons in the order of its appearance on the map with the map corresponding to coordinates of the Inper.

FIG. 40 shows an example in which this description position data and address data constitute linking data (a table of liking data). As clearly understood from the table of linking data, when the description position data is specified, an address of the corresponding related data is specified. Namely, when a Dicon is selected with the selection data as shown in FIG. 38, a position of the coordinates on the map shown in FIG. 39 is specified from the position of coordinates of the selection data, and related data corresponding to the Dicon can be searched according to the description position data (a Dicon Number) for the specified position of coordinates. For this reason, a Dicon and the related data can be linked with the linking data.

FIG. 41A shows an example in which description position data and description recognizing data constitute linking data (a table of linking data). Herein, description recognizing data is data for recognizing Dicons each written at a position in each of description position data, and this Dicon ID can be used by previously attaching Dicon ID to each of Dicons. As clearly understood from the table of linking data, when the description position data is specified, description recognizing data (Dicon ID) corresponding thereto is specified. Namely, when a Dicon is selected with the selection data as shown in FIG. 38, a position of the coordinates on the map shown in FIG. 39 is specified from the position of coordinates for the selection data, and the corresponding description recognizing data (Dicon ID) can be specified according to the description position data (a Dicon Number) for the specified position of coordinates.

In this case, it is required to provide a table of address conversion as shown in FIG. 41B as linking data. With this feature, corresponding related data can be searched from Dicon ID. In other words, Dicon and the related data can be linked with linking data. Also, the table of address conversion (namely, a portion of linking data) shown in FIG. 41B can be arranged in the side of personal computer 3802 by separating it from the code area 3206 (in other words, separated from Inper 3201). With this feature, the code area 3206 and personal computer 3802 can be handled as a continuous space for addresses with the table of linking data shown in FIG. 41A as well as the table of address conversion shown in FIG. 41B. Accordingly, security can be managed by arranging related data required for a large capacity and related data required for heavy security in the side of personal computer 3802.

As clearly understood from the tables of linking data shown in FIG. 40 and FIG. 41, in the linking data (a table of linking data) in FIG. 40, description position data (in short, a Dicon) and address data (in short, related data) are linked one to one, and the table of linking data itself plays a role of the table of address conversion, so that the table of related data is suitable for a case where a Dicon is prepared on the Inper and then related data is prepared.

On the other hand, in the linking data shown in FIG. 41A, the table of linking data only links description position data (in short, a Dicon) to description recognizing data (Dicon ID) at a one to one ratio, and the description recognizing data and the related data are linked with the table of address conversion, so that, for instance, description recognizing data can be defined as general (common) data in an entire system, and a Dicon and the related data can be linked, for instance, only by setting a table of address conversion.

Accordingly, for instance, paper on which only a code area comprising a table of address conversion and linking data is recorded is prepared as paper specific to related data, and linking data can concurrently be referred to from a plurality of Inpers 3201 in which only tables of linking data shown in FIG. 41A are recorded in the code area 3206, so that high extendibility and administrating capability of the system can be achieved, and for this reason linking data is suitable for constructing a large-scale system.

Furthermore, as shown in FIG. 39, a quantity of data for linking data in a code area 3206 can be reduced by specifying an area in which a Dicon can be set on Inper as required. Especially, it is effective in a case where Dicons on Inper are arranged in one side.

It should be noted that, in the linking data described above (FIG. 40 and FIG. 41A), a case where a Dicon finally corresponds to the related data at a one to one ratio (1:1) is shown, but the present invention is not especially limited thereto, and it is needless to say that, for instance, a correspondence relation between Dicons and the related data includes a relation of 1 to a plurality (1:n) or of plurality to 1 (n:1).

6. Related data which Inper has to obtain

Next description is made for related data which Inper 3201 has to obtain. A plurality of Dicons are recorded in the Inper 3201, so that not only linking data but also related data corresponding to the Dicons (in a case of n:1, at least one piece of related data) are recorded in a code area 3206.

At first, brief description is made for a capacity for related data which can be recorded in the code area 3206. Generally, one page (A4-size paper) of a text in English comprises about 3,200 characters, so that if it is converted in 8 bit code, the capacity required therefor is 3 KB with conversion in 8 bit code.

On the other hand, in a case where all the characters are arranged in an area equivalent to one page (A4-size paper), the capacity required therefor is 15 KB.

Furthermore, in a case where, assuming that the capacity of one page of a text in English is 3 KB, this capacity is compressed to a quantity of ⅕ of the original one on an average by the using data compression technology, 45 pages of a text in English can be recorded in one page (A4-size paper).

Herein, assuming that a size of the code area 3206 shown in FIG. 35 is ¼ of a page, the capacity of the code area 3206 is 3.75 (15 KB/4) KB, so that, even if 0.75 KB is allocated to linking data and other administration data, 3 KB can be used for the related data.

It is estimated that an area for related data is not more than 1 page on an average, so that more than 9 matters can be recorded therein as related data.

It should be noted that text is based on 16 bit code, but a number of characters per 1 page is about a half of the text in English, so that there is not much difference therebetween as a number of pages which can be used for related data.

Generally, various types of font and graphic are used for Inper 3201, and it is estimated that a plane text is used in many cases because related data comprises detailed description in a portion of the Inper. For this reason, the method of recording related data in a code area 3206 like that in the present invention is practical.

Figure 42A:
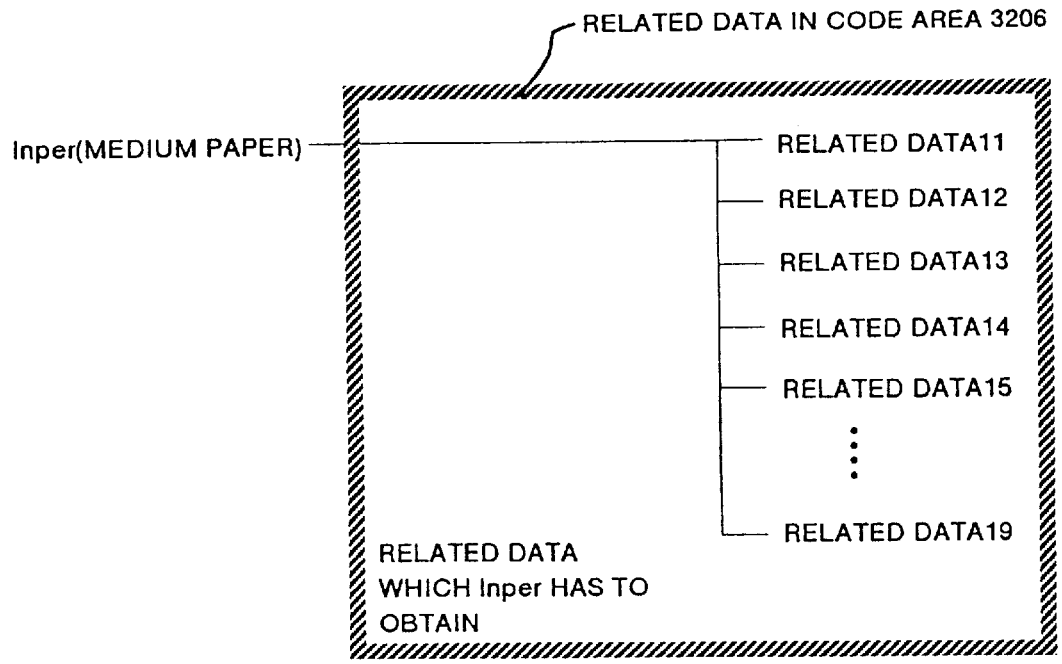
FIG. 42A and 42B are an explanatory view showing related data which an Inper must obtain.
Figure 42B:
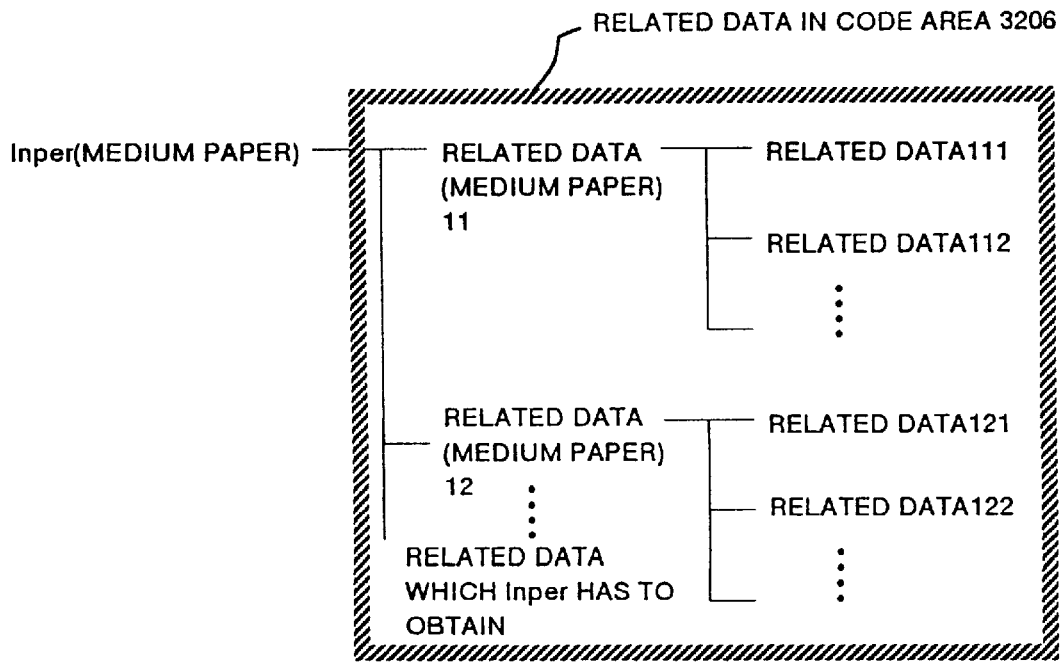

Next description is made for related data which Inper 3201 has to obtain with reference to FIG. 42A and FIG. 42B. In a case where all related data are composed of ordinary text, as shown in FIG. 42A, related data (e.g. Related data 11 to 19) corresponding to Dicons written in Inper 3201 is required as related data in the code area 3206. However, in a case where related data itself has data as the Inper (medium paper 3101) Dicons exist in the related data which is Inper, and a number of related data corresponding to those Dicons exist in the code area. Accordingly, in a case where related data itself is Inper (medium paper 3101), as shown in FIG. 42B, related data 111, 112 to 121, 122, and others each of which is a nest of the related data (medium paper) 11 and related data (medium paper) 12 are also required as related data in the code area 3206 in the Inper 3201.

For this reason, in the case described above, related data corresponding to Dicons in the related data (medium paper) is arranged inside of a personal computer 3802, and a code area (a rear surface code area 3302, and the detail will be described later) is set to the entire rear surface of Inper 3201, or Inper 3201 comprises a plurality of sheets of Inper, and Inpers after the second sheet and on are changed to double-sided code areas as paper specific to related data.

7. Other administration data in the code area

If, for instance, user ID and a password or the like are recorded as other administration data recorded in the code area 3206, it is possible to administrate security according to user ID and a password by using a display and a keyboard attached the personal computer 3802.

8. General operations in Embodiment 1

Description is made for general operations in the configuration described above. At first, in a first process, Inper 3201 is placed on an image scanner 3801, and selection data, linking data, and related data in the Inper 3201 are read out by the image scanner 3801.

In a second process, a personal computer 3802 searches, according to the read-out selection data and linking data, corresponding related data from the related data in the code area 3206, converts the contents in the corresponding related data recorded with two-dimensional bar code to image data, and transfers the converted data to a printer 3803.

In a third process, the printer 3803 outputs the corresponding related data (image data) sent from the personal computer 3802 onto a recording paper. And also, it is possible to display related data on a display screen by using a display unit in the personal computer 3802 as an outputting means 3104 in place of an output thereof to a recording paper.

It should be noted that detailed description is made, in [examples of output of related data according to Embodiments 1 to 7] which is described later, for an example of an output of related data outputted by the printer 3803.

[Embodiment 2]

In Embodiment 2, a code area is provided in the rear surface of Inper (medium paper 3101) and related data is recorded therein, and also a reversed double-sided ADF scanner, which plays a role of the reading means 3102 and the sheet automatically transferring means 3105, is employed. It should be noted that configuration therein is basically the same as that in Embodiment 1, so that description is made herein for a portion different therefrom.

FIG. 43 shows configuration of Inper 3301 which is medium paper 3101 in Embodiment 2, and a rear surface code area 3302 is provided in the rear surface of the Inper 3301 in Embodiment 2, related data is recorded in the rear surface code area 3302, and linking data and other administration data are recorded in the top surface of the code area 3206. It should be noted that, in a case where the top surface thereof has enough capacity, related data may be recorded in both the top surface of code area 3206 and the rear surface thereof 3302.

Figure 44:
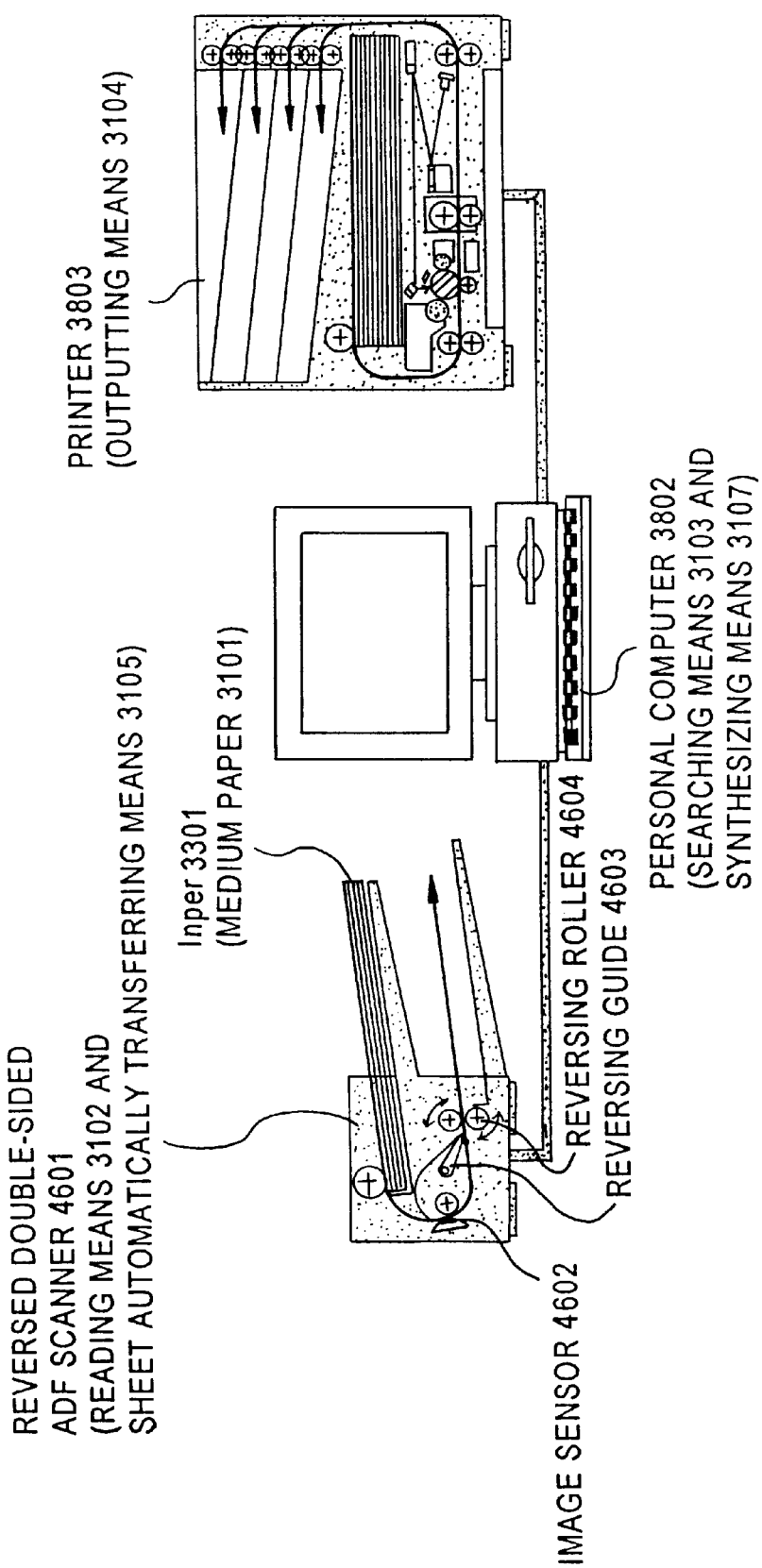
FIG. 44 is a view showing configuration of hardware of a PUI according to Embodiment 2.

FIG. 44 shows hardware configuration of PUI according to Embodiment 2. The PUI according to Embodiment 2 comprises a reversed double-sided ADF scanner 4601 which is the reading means 3102 and sheet automatically transferring means 3105; a personal computer 3802 which plays roles of the searching means 3103 and synthesizing means 3107; and a printer 3803 which is the outputting means 3104.

The reversed double-sided ADF scanner 4601 automatically transfers the Inper 3301 placed on a placement section, a surface of one side of the Inper 3301 is read out by an image sensor 4602 (equivalent to the reading means 3102), reverses the Inper 3301 with a reversing guide 4603 and reversing rollers 4604, transfers it again to a position of the image sensor 4602, and a surface of the other side thereof is read out by the image sensor 4602.

With Embodiment 2, a rear surface code area 3302 is provided in the rear surface of Inper 3301, and related data is recorded in the rear surface code area 3302, so that it is possible to record various types of related data or a large amount of related data therein as compared to Embodiment 1. Accordingly, even in a case where related data itself has configuration as medium paper, it is also possible to concurrently record related data corresponding to Dicons in the related data (medium paper), and furthermore, the convenience of PUI (the document data administrating system and method of administrating document data) with Inper 3301 can be improved.

Data on both surface of Inper 3301 can automatically be read out by the reversed double-sided ADF scanner 4601, so that high workability and operability on reading Inper 3301 can be achieved.

[Embodiment 3]

In Embodiment 3, in the same configuration therein as that in Embodiment 2 shown in FIG. 44, Inper identifying code indicating Inper is provided in Inper (medium paper), and also a role of the medium paper identifying means 3108 is given to the reversed double-sided ADF scanner 4601, so that it can be identified whether paper that is an object to be read out is Inper 3301 or not.

Figure 45:
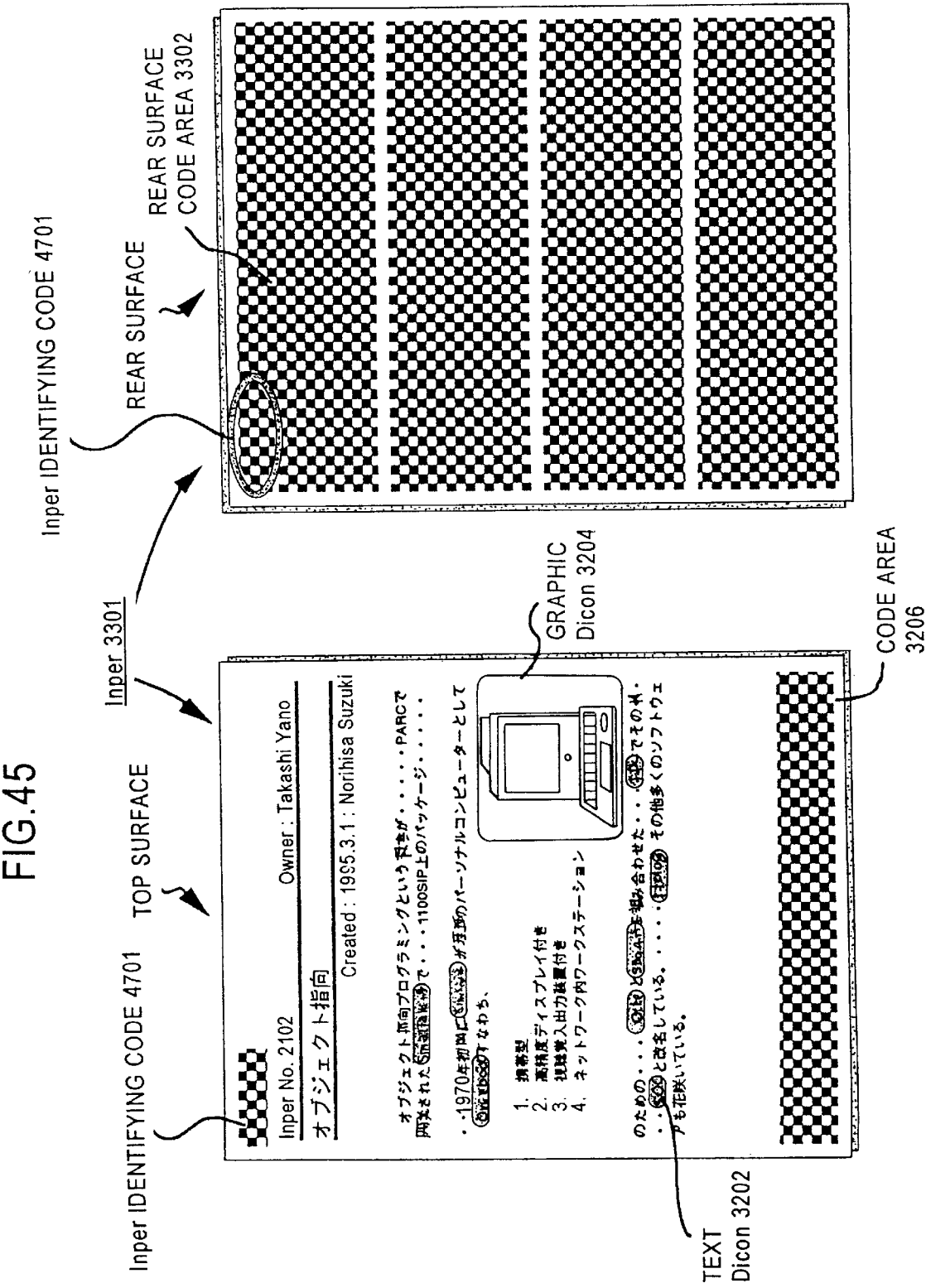
FIG. 45 is an explanatory view showing configuration of Inper (Medium paper) in Embodiment 3.

FIG. 45 shows configuration of Inper 3301 which is medium paper 3101 according to Embodiment 3. Inper 3301 according to Embodiment 3 is one having Inper identifying code 4701 indicating Inper 3301 provided in both surfaces of Inper 3301 according to Embodiment 2. It should be noted that the Inper identifying code 4701 is recorded with the two-dimensional bar code like in the code area 3206 and the rear surface code area 3302.

With Embodiment 3, the Inper identifying code 4701 provided in a header section of both surfaces of Inper 3301 is read out by the reversed double-sided ADF scanner 4601, and whether the paper is Inper 3301 or not can be identified, so that, only in a case where the paper is Inper 3301, selection data, linking data, and related data can be read out from the paper (Inper 3301) which is an object. Accordingly, processing efficiency in the entire system is improved. Also, even in a case where Inper 3301 and an ordinary document are present in the same area, it is possible to accurately take out related data from the Inper 3301 without generating of malfunction. Furthermore, the reading means 3102 (a reversed double-sided ADF scanner 4601) is not required to execute an unnecessary reverse processing.

In Embodiment 3, the medium paper identifying means 3108 and reading means 3102 comprise the identical device (image sensor 4602 in FIG. 44), it is not particularly limited thereto, and it is needless to say that both means may comprise different device from each other.

[Embodiment 4]

In the same configuration in Embodiment 4 as that in Embodiment 3, data for the top and rear surfaces of paper is added to the Inper identifying code 4701 in Inper 3301. With this feature, whether the paper that is an object to be read out is Inper 3301 or not can be identified, and also the top and rear surfaces of the paper can concurrently be identified.

The reversed double-sided ADF scanner 4601 (a medium paper identifying means 3108 and a reading means 3102) shown in FIG. 44 identifies whether the Inper 3301 is the top surface or the rear surface thereof from the data for the Inper identifying code 4701 initially read out in the Inper 3301, and in a case where it is the rear surface thereof, reverses the Inper 3301 and reads the surface thereof, and then reverses again the Inper 3301 for reading the rear surface thereof.

With Embodiment 4, whether the paper that is an object to be read out is Inper 3301 or not can be identified, and also the top and rear surfaces of the paper can concurrently be identified, so that selection data and linking data of the top surface thereof are read out, and then the related data for the rear surface thereof can efficiently be read out according to the selection data and linking data.

[Embodiment 5]

Figure 46:
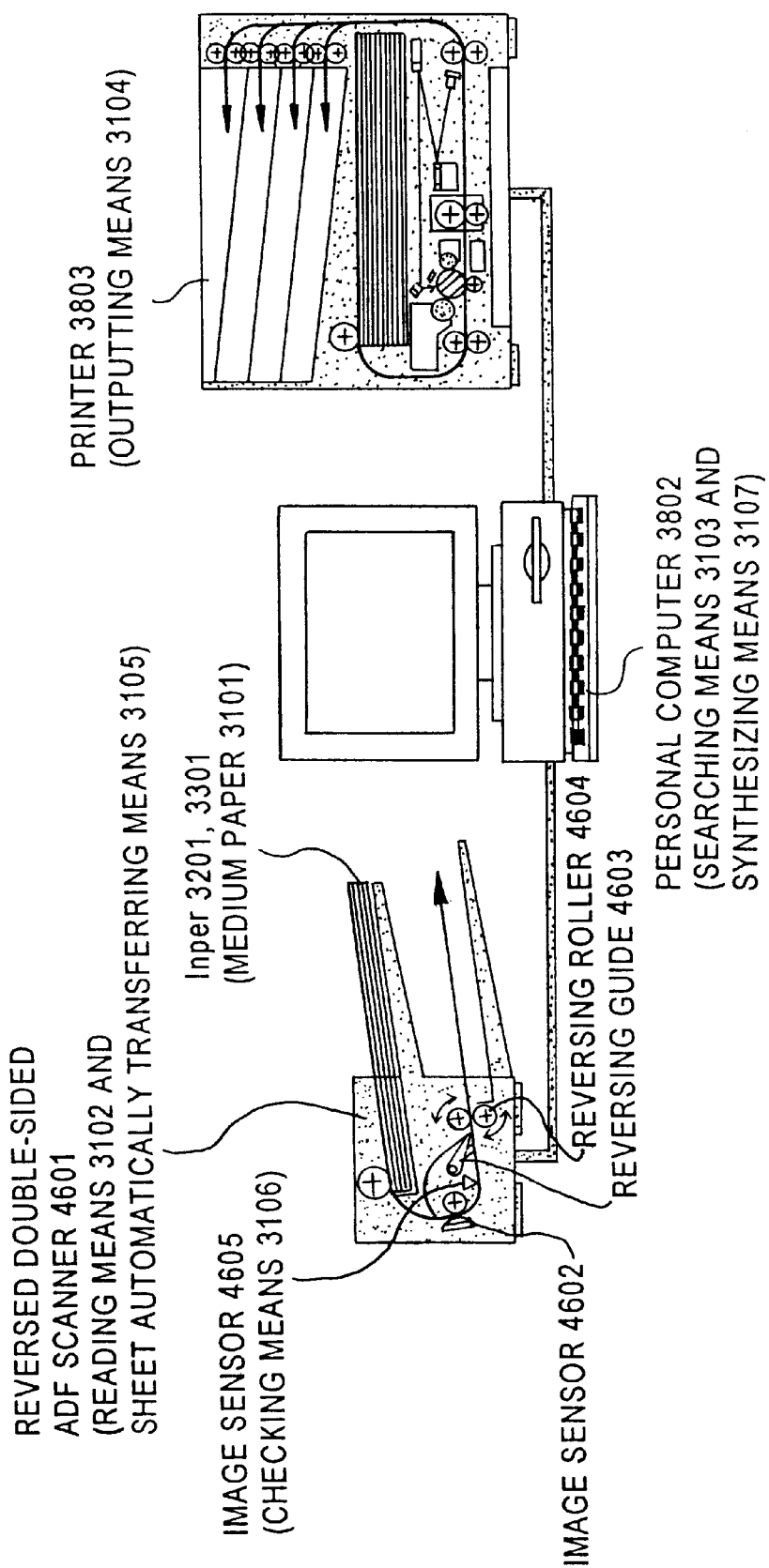
FIG. 46 is a view showing configuration of hardware of PUI according to Embodiment 5.

FIG. 46 shows hardware configuration of PUI according to Embodiment 5. The PUI according to Embodiment 5 adds thereto, in addition to the configuration in Embodiment 2 shown in FIG. 44, an image sensor 4605 which is a checking means 3106 for checking whether related data is recorded on the rear surface of the Inper or not.

In Embodiment 5, the reversed double-faced ADF scanner 4601 automatically transfers Inpers 3201, 3301 each placed on the placement section, reads one side of the surfaces (top surface) of Inper 3301 by the image sensor 4602 (corresponding to the reading means 3102), concurrently reads the other side of the surfaces (rear surface) of the Inper 3201, 3301 by the image sensor 4605 (checking means), and checks whether related data is recorded in the rear surface thereof or not. Herein, in a case where it is determined that the related surface is not recorded in the rear surface thereof, the scanner waits for completion of reading the rear surface by the image sensor 4602, and carries out the Inper 3201 (there is no related data in the rear surface, which indicates Inper 3201) as it is. On the other hand, in a case where it is determined that the related data is recorded in the rear surface, one side of the surfaces of Inper 3301 (there is related data in the rear surface, which indicates Inper 3301)

is read out by the image sensor 4602, and then the Inper 3301 is reversed by the reversing guide-4603 and reversing roles 4604 for being transferred again to the position of image sensor 4602, and the other side of surfaces is read out by the image sensor 4602.

With Embodiment 5, it is determined whether related data is present in the rear surface of Inper or not, in other words, whether the Inper is Inper 3201 or Inper 3301, which makes it possible to efficiently transfer the Inpers 3201 and 3301. Also, Inper 3201 and Inper 3301 can be used in a mixed system thereof without previously restricting types of Inper.

[Embodiment 6]

In Embodiment 6, both surfaces of Inper 3301 are concurrently read out by the reading means 3102.

Figure 47:
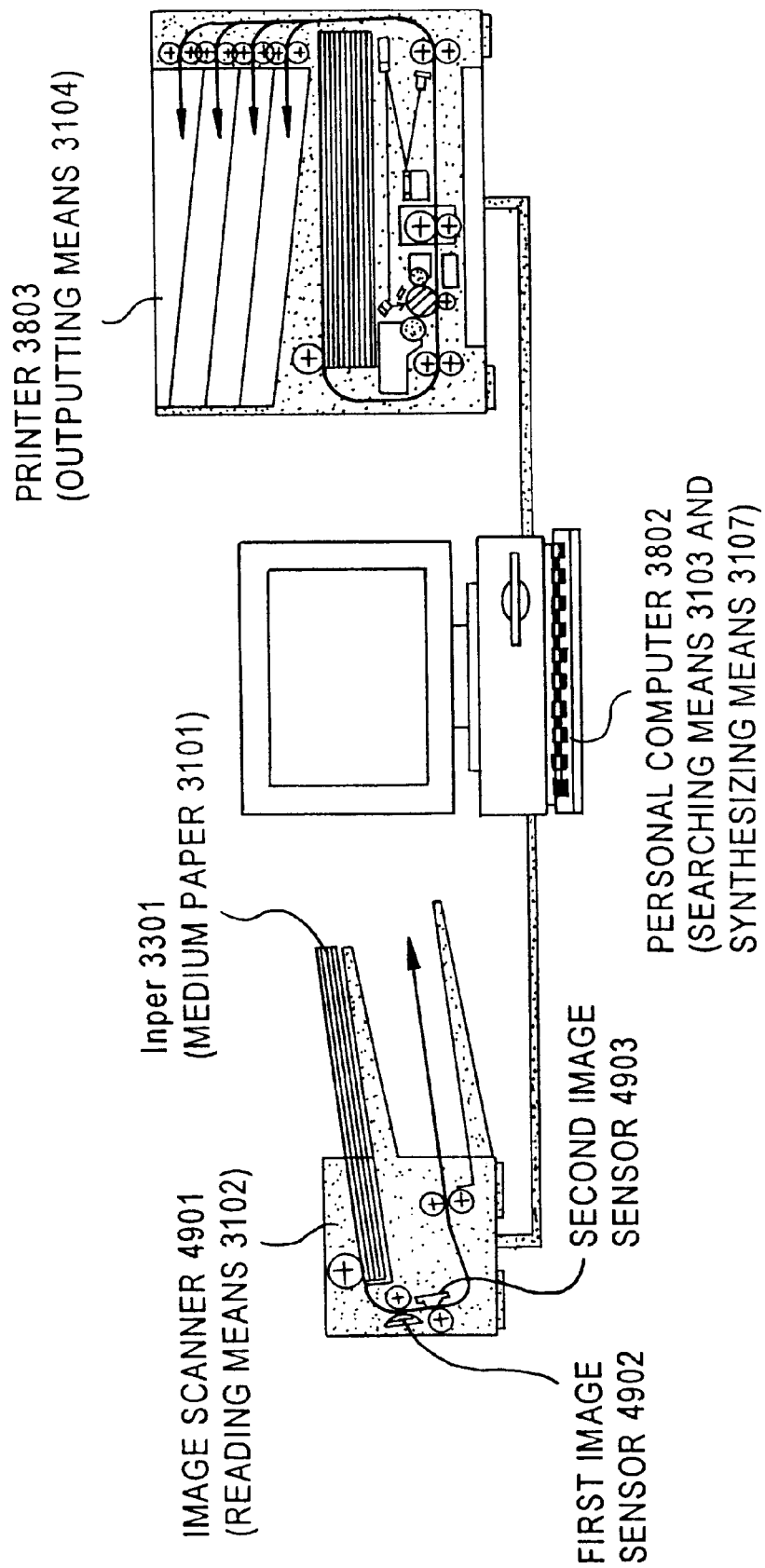
FIG. 47 is a view showing configuration of hardware of a PUI according to Embodiment 6.

FIG. 47 shows hardware configuration of PUI according to Embodiment 6. The PUI according to Embodiment 6 comprises an image scanner 4901 which is the reading means 3102, a personal computer 3802 playing roles of the searching means 3103 and synthesizing means 3107, and a printer 3803 which is the outputting means 3104.

The image scanner 4901 comprises a first image sensor 4902 as a first reading section for reading out data recorded on the top surface of Inper 3301, and a second image scanner 4903 as a second reading means for reading out data recorded on the rear surface thereof, and reads data on both surfaces of the Inper 3301 at one time of transfer without reversing the Inper 3301.

With Embodiment 6, data on both surfaces of the Inper 3301 are concurrently being read out by the image scanner 4901, so that high working efficiency can be achieved. In other words, the time required for reading Inper can be reduced.

[Embodiment 7]

Figure 48:
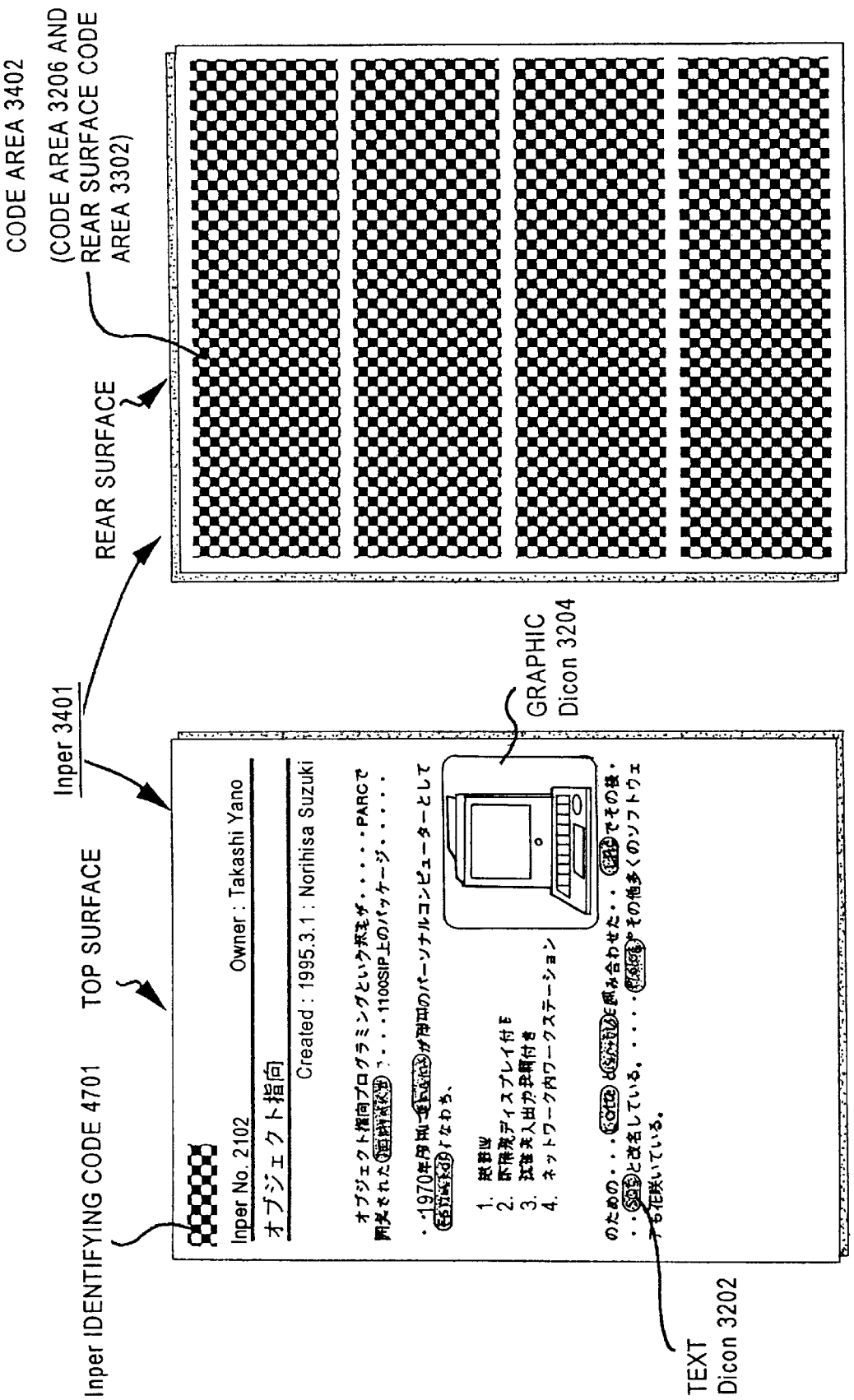
FIG. 48 is an explanatory view showing configuration of Inper (Medium paper) in Embodiment 7.

FIG. 48 shows configuration of Inper 3401 which is medium paper 3101 according to Embodiment 7. In the Inper 3401 according to Embodiment 7, all of code areas (a code area 3206 and a rear surface code area 3302) are arranged on the rear surface of the Inper 3401, which is changed to a code area 3402. Also, Inper identifying code 4701 is provided on the top surface thereof.

Figure 49:
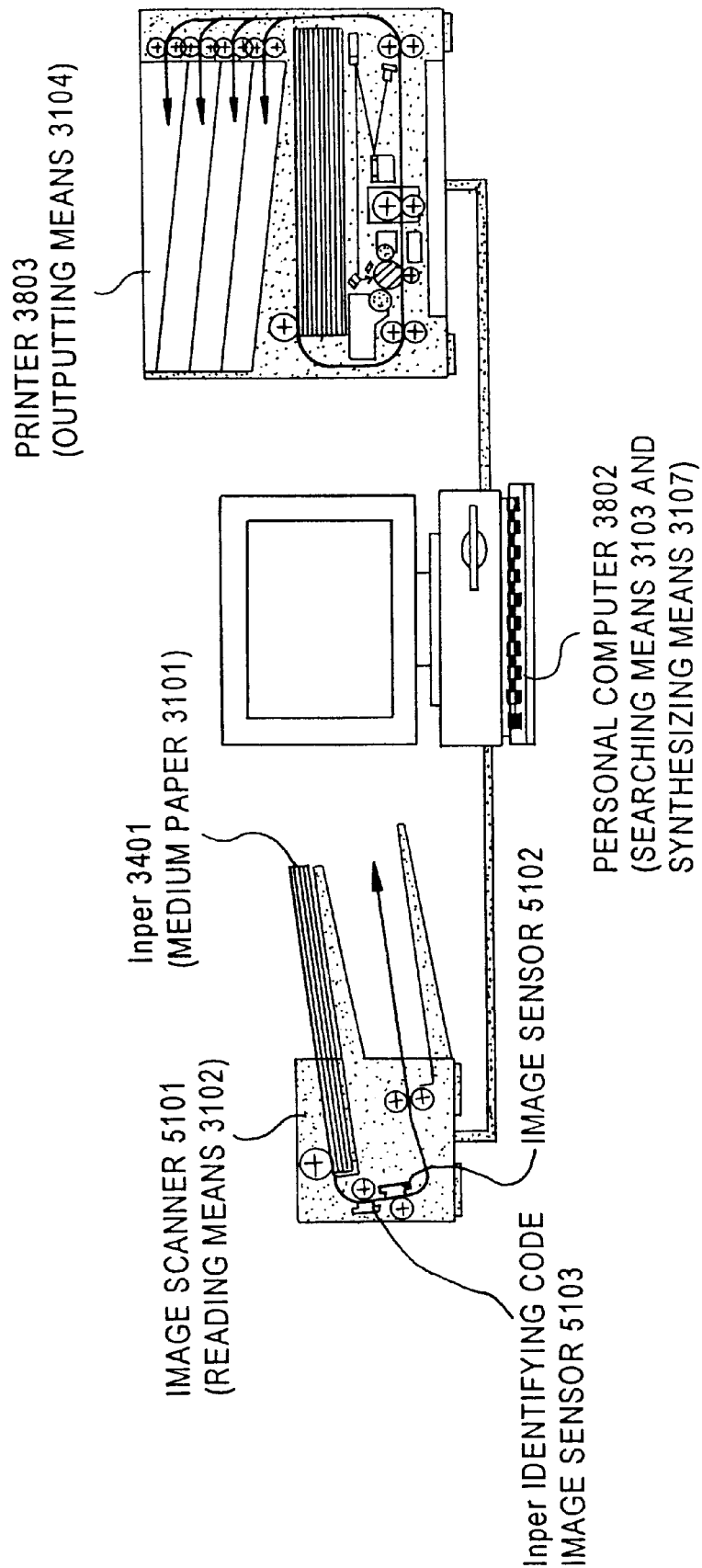
FIG. 49 is a view showing configuration of hardware of PUI according to Embodiment 7.
Figure 50:
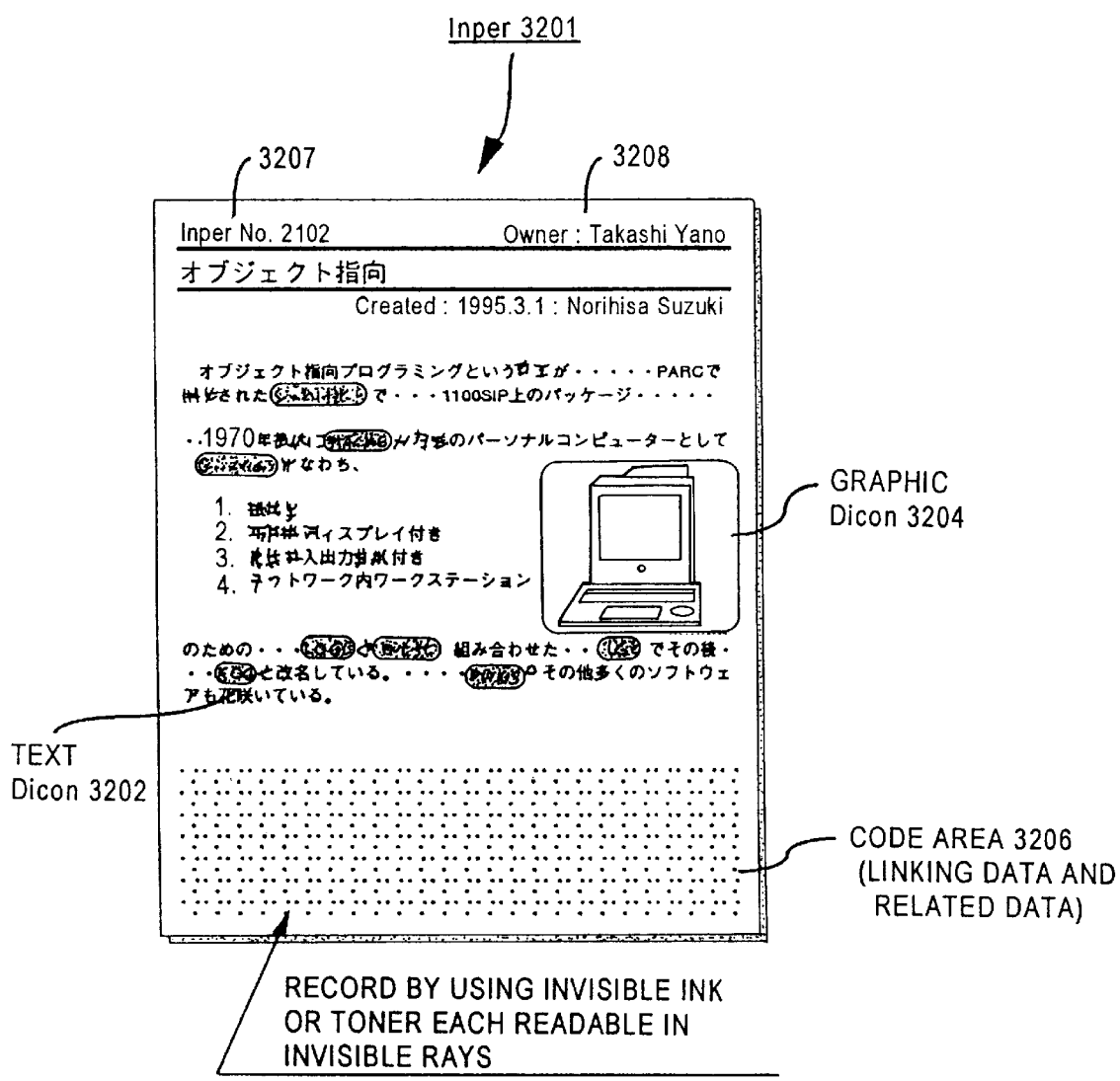
FIG. 50 is an explanatory view showing an example of Inper (Medium paper) using invisible ink or toner readable with invisible lights.
Figure 52:
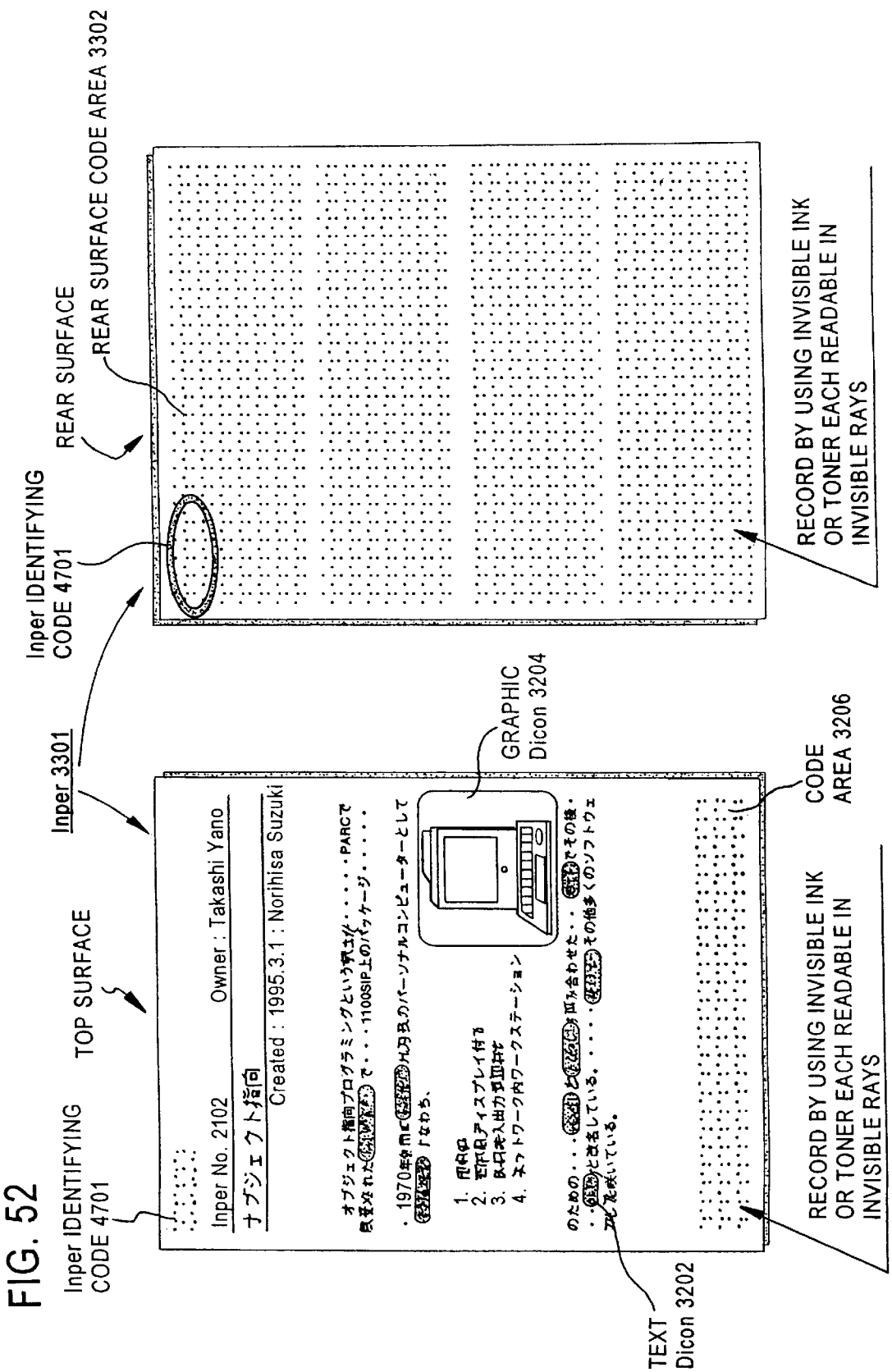
FIG. 52 is an explanatory view showing an example of Inper (Medium paper) using invisible ink or toner readable with invisible lights.
Figure 53:
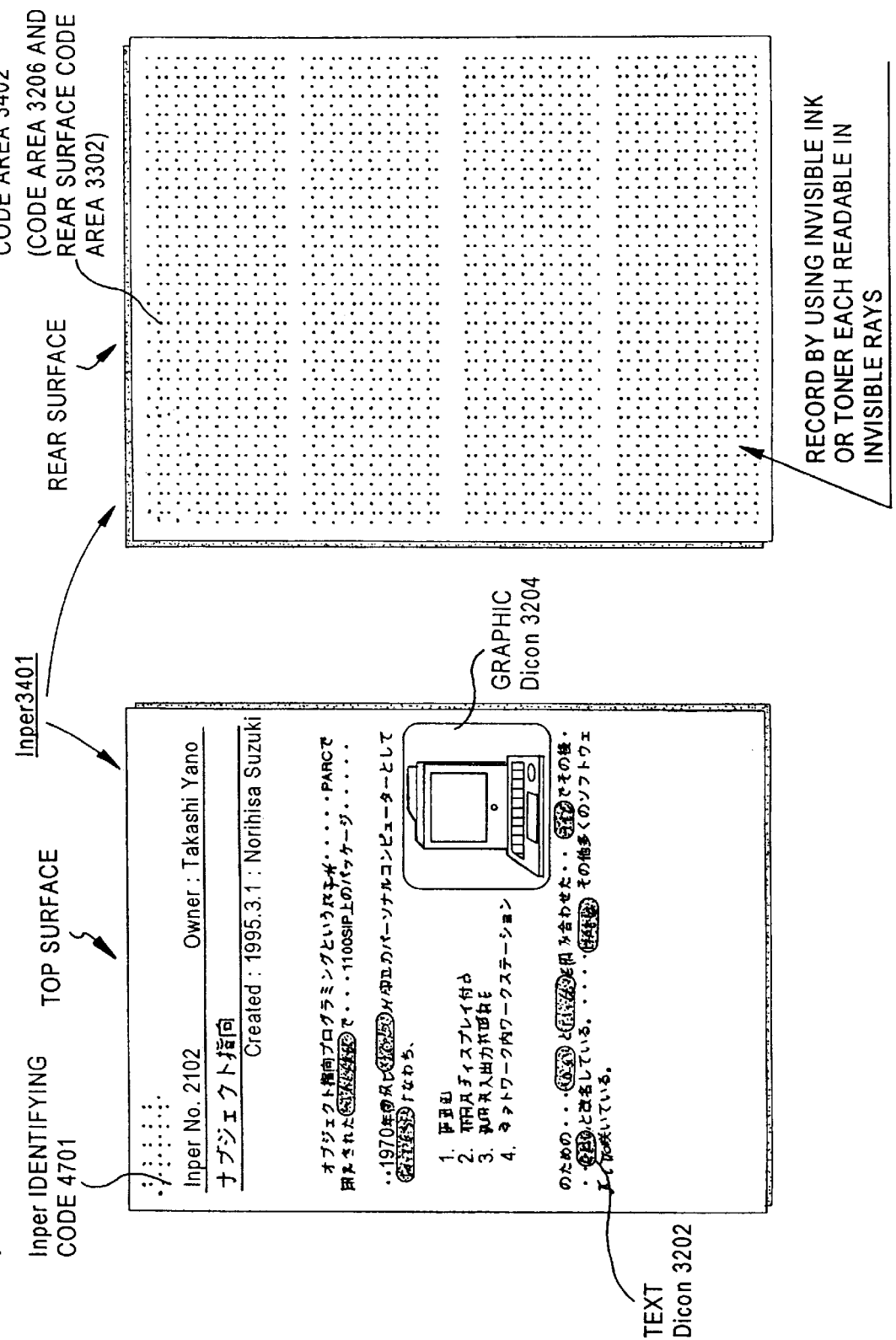
FIG. 53 is an explanatory view showing an example of Inper (Medium paper) using invisible ink or toner readable with invisible lights.

FIG. 49 shows hardware configuration of PUI according to Embodiment 7. The PUI according to Embodiment 7 comprises an image scanner 5101 which is the reading means 3102, a personal computer 3802 playing a role of the searching means 3103 and synthesizing means 3107, and a printer 3803 which is the outputting means 3104.

Herein, the image scanner 5101 comprises an image sensor 5102 for reading out selection data, linking data, and related data; and an Inper identifying code image sensor 5103 for reading out only Inper identifying code 4701.

The Inper identifying code image sensor 5103 reads out only Inper identifying code 4701, so that a small size image sensor can be used as compared to the Image sensor 5102.

[Modified examples of the Embodiments 1 to 7]

In the Inpers 3201, 3301, 3401 according to Embodiments 1 to 7 described above, the code area 3206, the rear surface code area 3302, code area 3402, and the Inper identifying code 4701 are recorded with the two-dimensional bar code and in a state in which a user can easily and visually see it, but, as shown in FIG. 50 to FIG. 53, by recording data in these code areas (linking data, related data, and other data) with invisible ink or toner each readable in invisible rays such as ultraviolet rays and infrared rays, visibility (readability) of data as a document for Inper can further be improved. Also, the Inper can be handled on its appearance in the same manner as an ordinary document can be, and disposable Inpers can also be used for memos or the like, which makes it possible to effectively utilize paper resources.

The embodiments 1 to 7 show examples each of which the reading means 3102 and the outputting means 3104 comprise discrete devices respectively, but the reading means 3102 and the outputting means 3104 may comprise one unit of device with a digital copying machine or the like.

[Examples of an output of related data according to the Embodiments 1 to 7]

Next, a description is made for examples of an output of related data in a case where, in the PUI according to Embodiments 1 to 7, Dicons are marked (selection data) each with a marker on the Inpers 3201, 3301, and 3401, the marked Dicons are read out by the reading means 3102, corresponding related data is searched by the searching means 3103, and the searched related data is outputted by the outputting means 3104.

As shown in FIG. 54A, if a desired Dicon (Small talk-80 herein) is selected among Dicons on Inper 3201 and marks (selection data) are added thereonto, as shown in FIG. 54B, corresponding related data is outputted onto a recording paper. FIG. 54 shows an example of an output in which description data (Dicon) is not present in the related data of the selected Dicon, and only the related data is outputted onto a sheet of recording paper.

Figure 55:
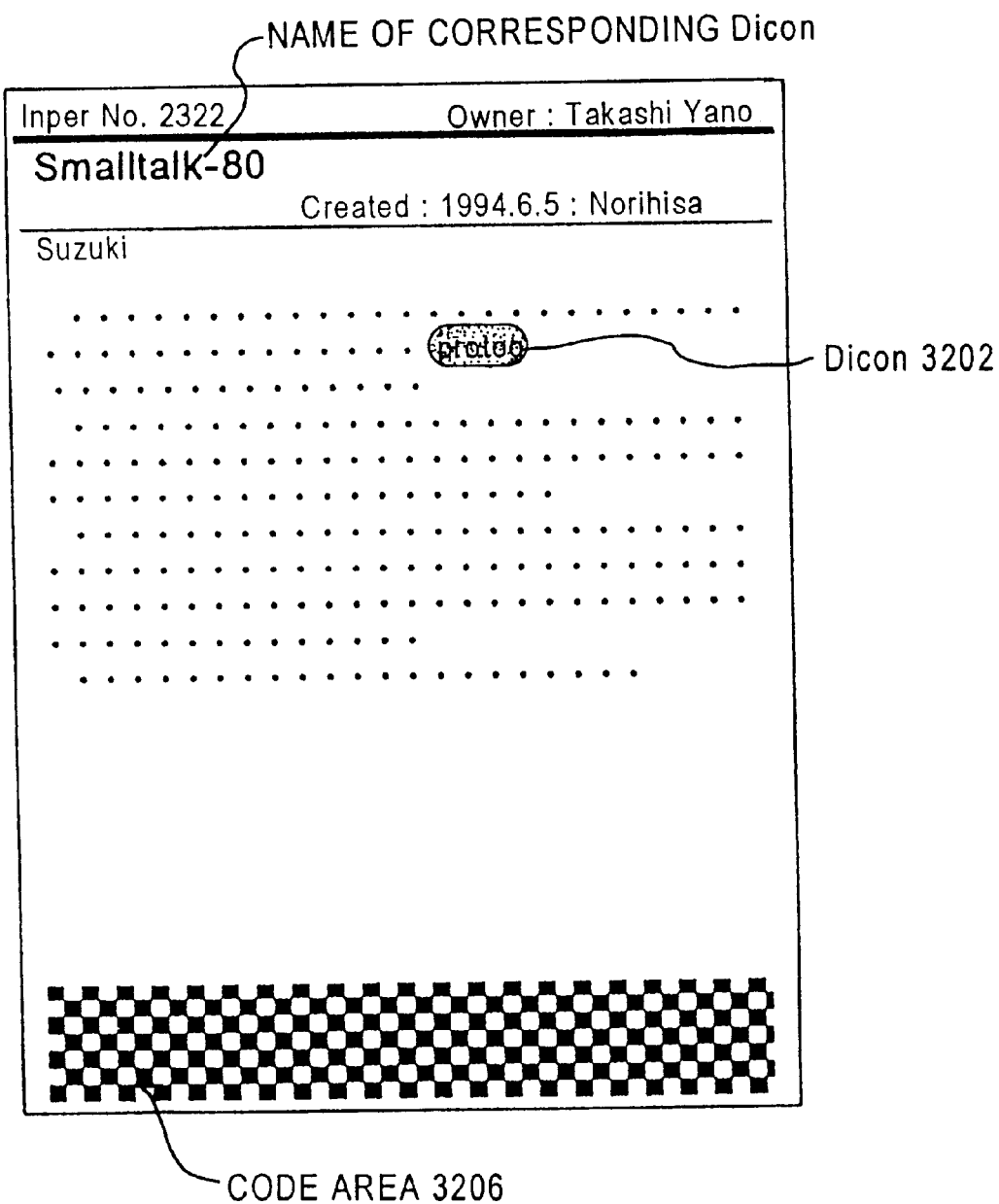
FIG. 55 is an explanatory view showing an example of an output of the related data according to Embodiments 1 to 7.

FIG. 55 shows a case where description data (Dicon) exists in the related data to the Dicon (Smalltalk-80®) selected in FIG. 54A, and in this case, the outputted related data itself becomes new Inper 3201, and similarly by adding marks (selection data) each to a Dicon in the Inper 3201 shown in FIG. 55, related data to the corresponding Dicon can be outputted.

Figure 56:
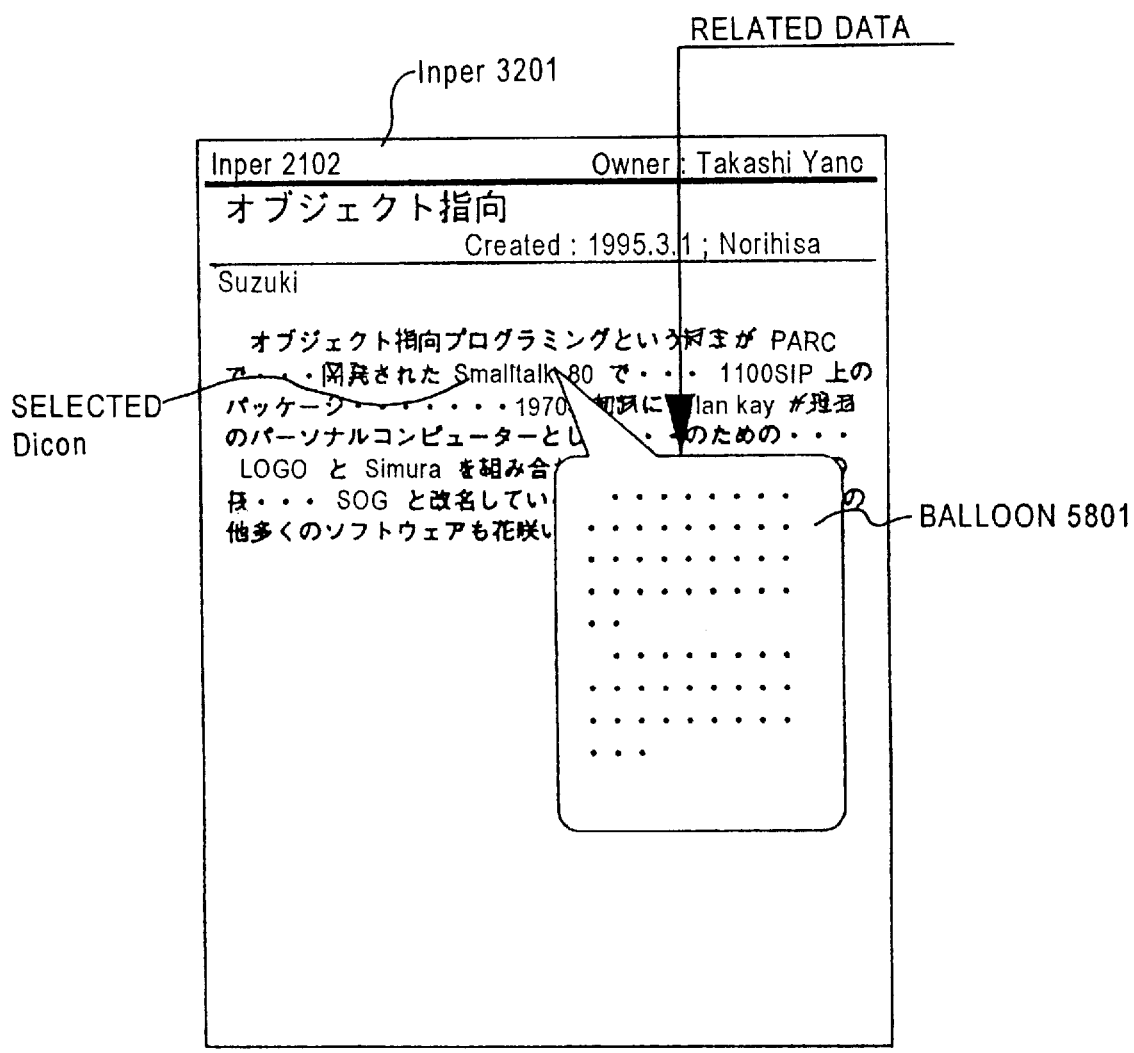
FIG. 56 is an explanatory view showing an example of an output of the related data according to Embodiments 1 to 7.

FIG. 56 shows an example of synthesizing and outputting the related data to the selected Dicon as a balloon 5801 near the selected Dicon in the image on the Inper 3201. As shown in the figure, in a case where the balloon 5801 is used, a portion of the text close to the balloon is not seen, so that the related data outputted in this system is incomplete as Inper 3201, and for this reason, a code area 3206 and Dicons (description data) are not provided in this Inper.

Figure 57:
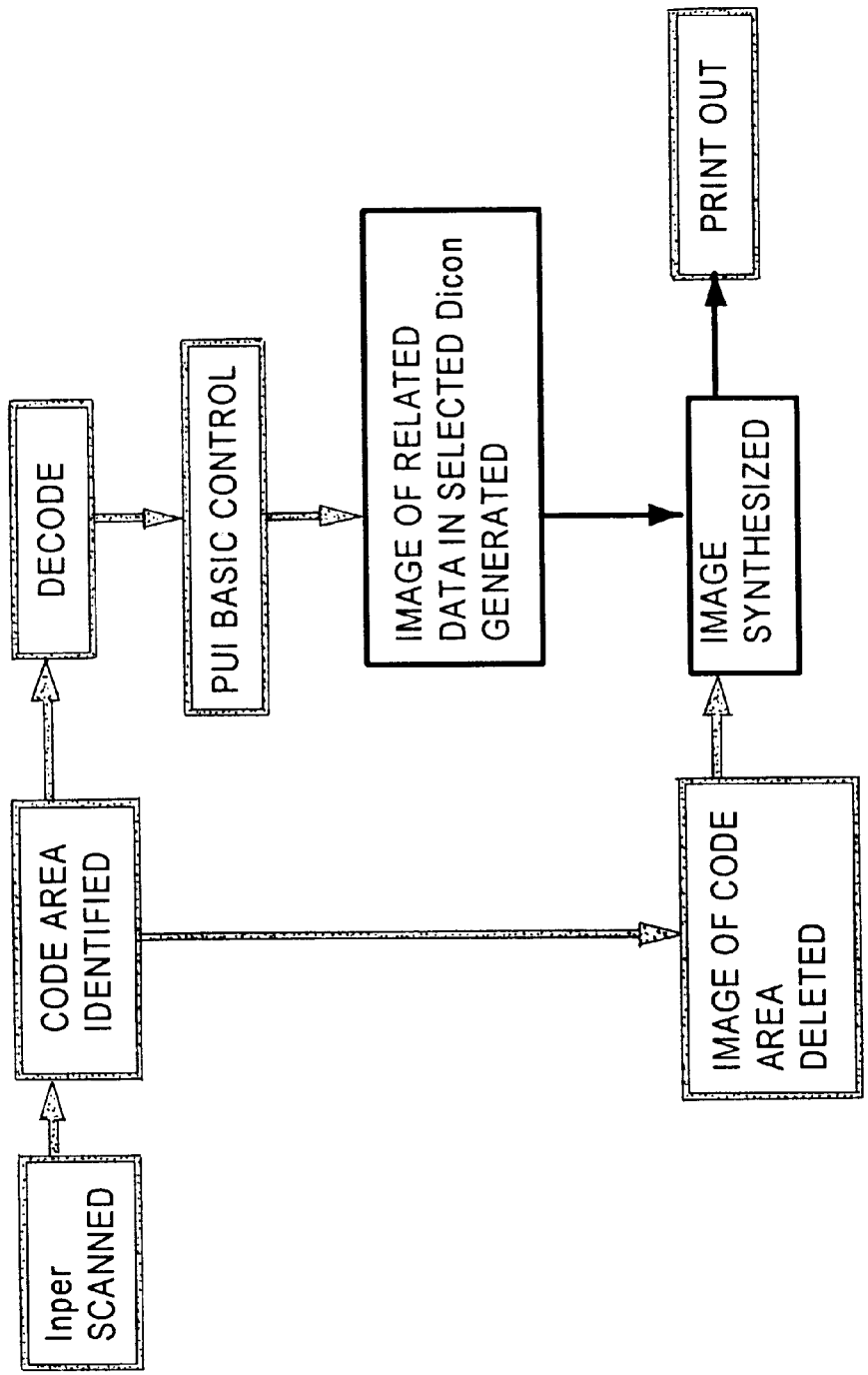
FIG. 57 is an explanatory view showing a sequence of synthesizing an image by using a synthesizing means when related data is synthesized as a balloon.

In this case, as shown in FIG. 57, and referring to the preceding Figs., the Inper is read out (scanned), a code area 3206 is identified, the contents of the code area 3206 (two-dimensional bar code) is decoded, data is inputted thereinto, related data is searched from the selected Dicons (described as a PUI basic control), and an image of the corresponding related data (image data) is generated. At the same time, the image of the code area 3206 is deleted from image data for the entire read-out Inper 3201, and the image obtained by deleting the image of code area 3206 therefrom as described above is synthesized to any images of related data by the synthesizing means 3107 (personal computer 3802) for being outputted by the outputting means 3104.

Figure 58:
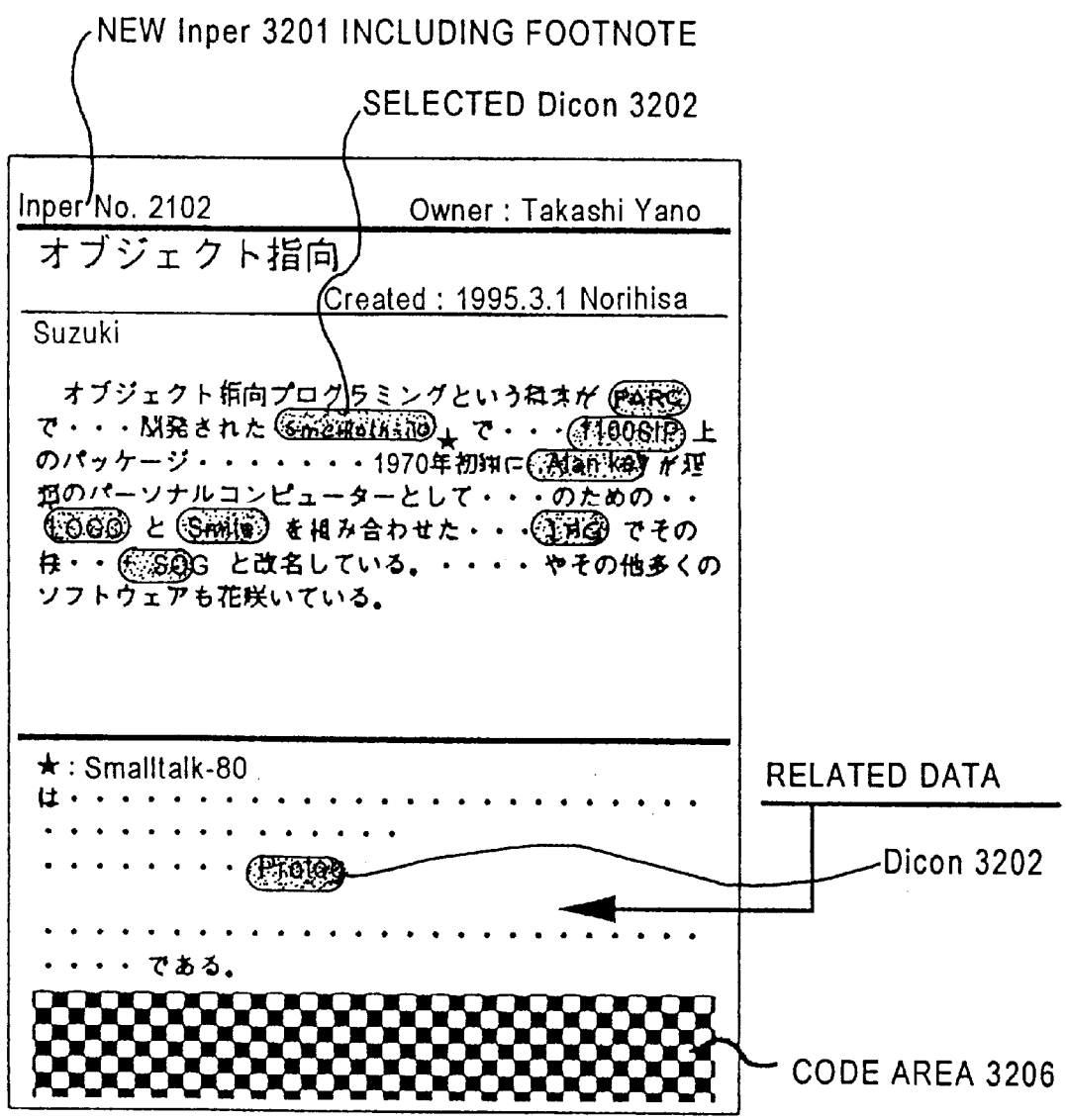
FIG. 58 is an explanatory view showing an example of an output of the related data according to Embodiments 1 to 7.

FIG. 58 shows an example in which the related data to the selected Dicons is synthesized to the image on the Inper 3201 as a footnote. In this case, an asterisk indicating a footnote is added near the selected Dicon, and the related data is synthesized as a footnote in the lower side of the new Inper 3201 including the footnote. Also, it is needless to say that the Inper can be used as Inper by providing therein Dicons and a code area 3206.

Figure 59:
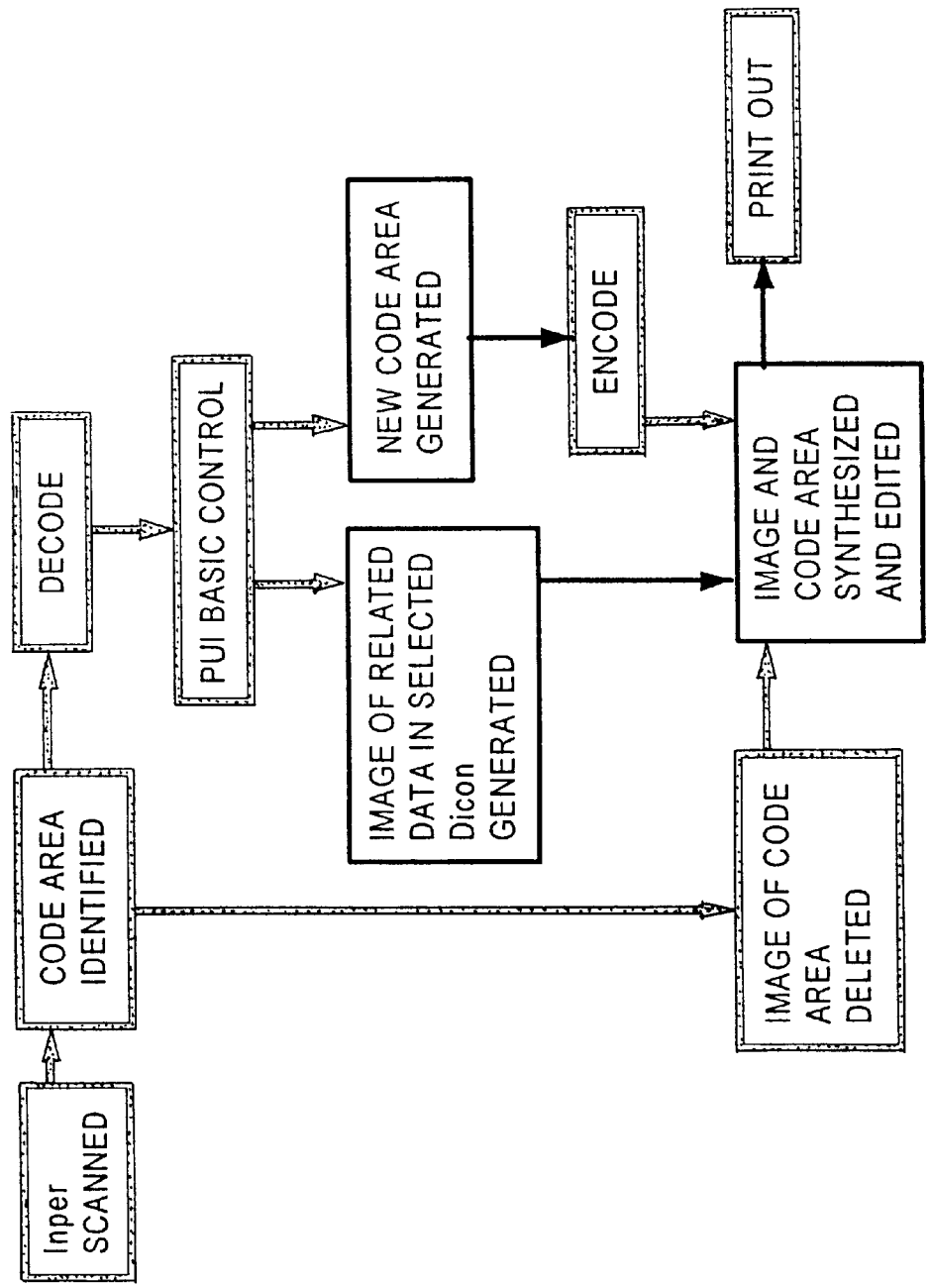
FIG. 59 is an explanatory view showing a sequence of synthesizing an image by using a synthesizing means when related data is synthesized as a footnote.

In this case, as shown in FIG. 59, and referring to the preceding Figs., the Inper is read out (scanned), a code area 3206 is identified, the contents of the code area 3206 (two-dimensional bar code) is decoded, data is inputted thereinto, related data is searched from the selected Dicons (described as a PUI basic control), and an image of the corresponding related data (image data) is generated. At the same time, a new code area 3206 is generated according to the arrangement of Dicons on the new Inper 3201 including any footnotes, and generated data is encoded to two-dimensional bar code. In this step, if any Dicons exist in the related data in the footnote, a new code area 3206 including the Dicons in the related data is generated.

At the same time, the image of the code area 3206 is deleted from image data for the entire read-out Inper 3201, the image obtained by eliminating the image of code area 3206 therefrom as described above is synthesized to any images of related data by the synthesizing means 3107 (personal computer 3802) and a new code area 3206 is synthesized for being outputted by the outputting means 3104.

Figure 60:
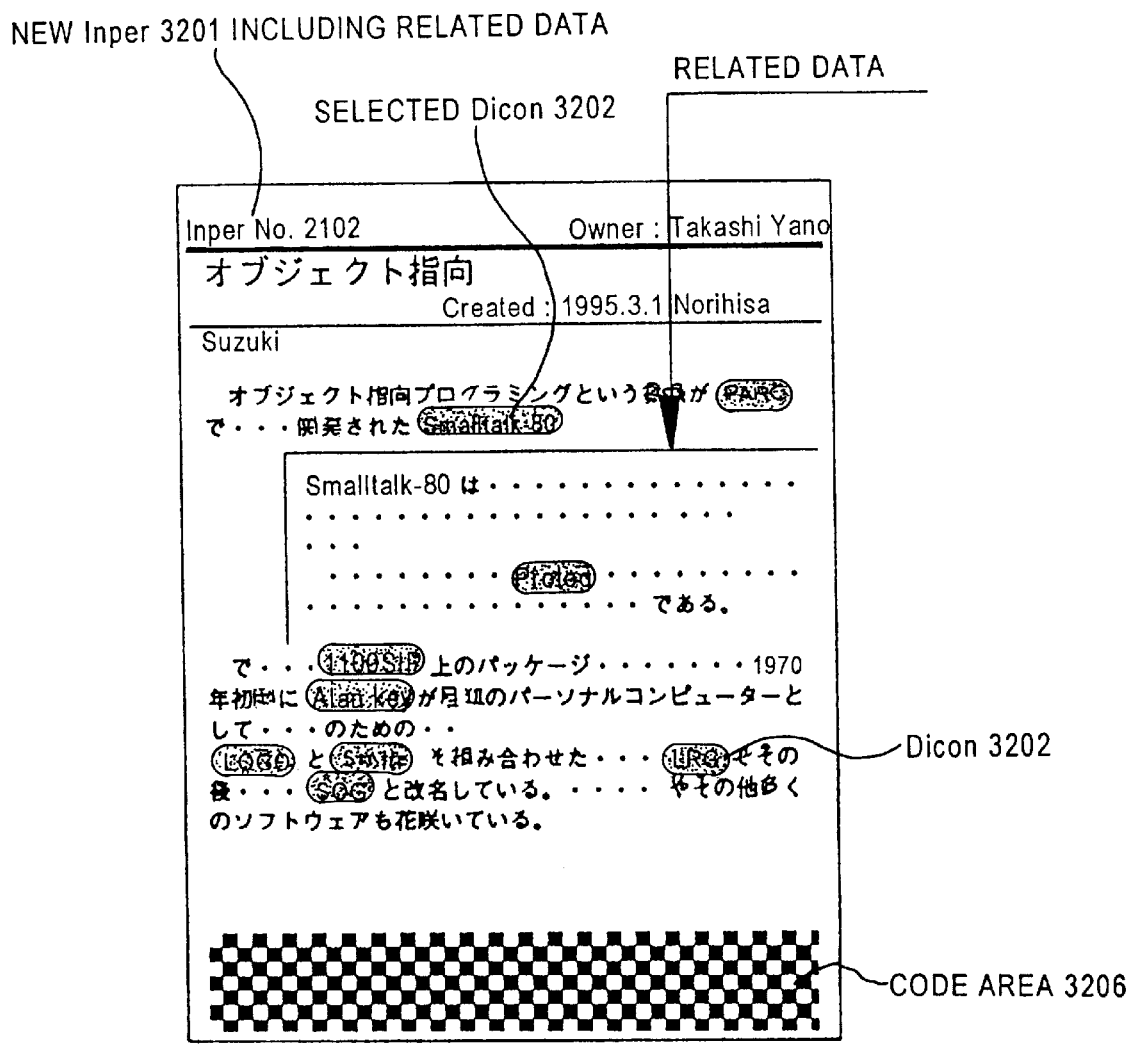
FIG. 60 is an explanatory view showing an example of an output of the related data according to Embodiments 1 to 7.

FIG. 60 shows an example in which each of the related data to the selected Dicon is synthesized as an inserted paragraph at a position immediately after the selected Dicon on the Inper 3201. In this case, for the related data to be inserted, setting of the paragraph may be changed, or visual processing such as an enclosure and a frame is executed thereto to indicate it as related data. Also, it is needless to say that the Inper can be used as Inper by providing therein Dicons and a code area 3206.

Figure 61:
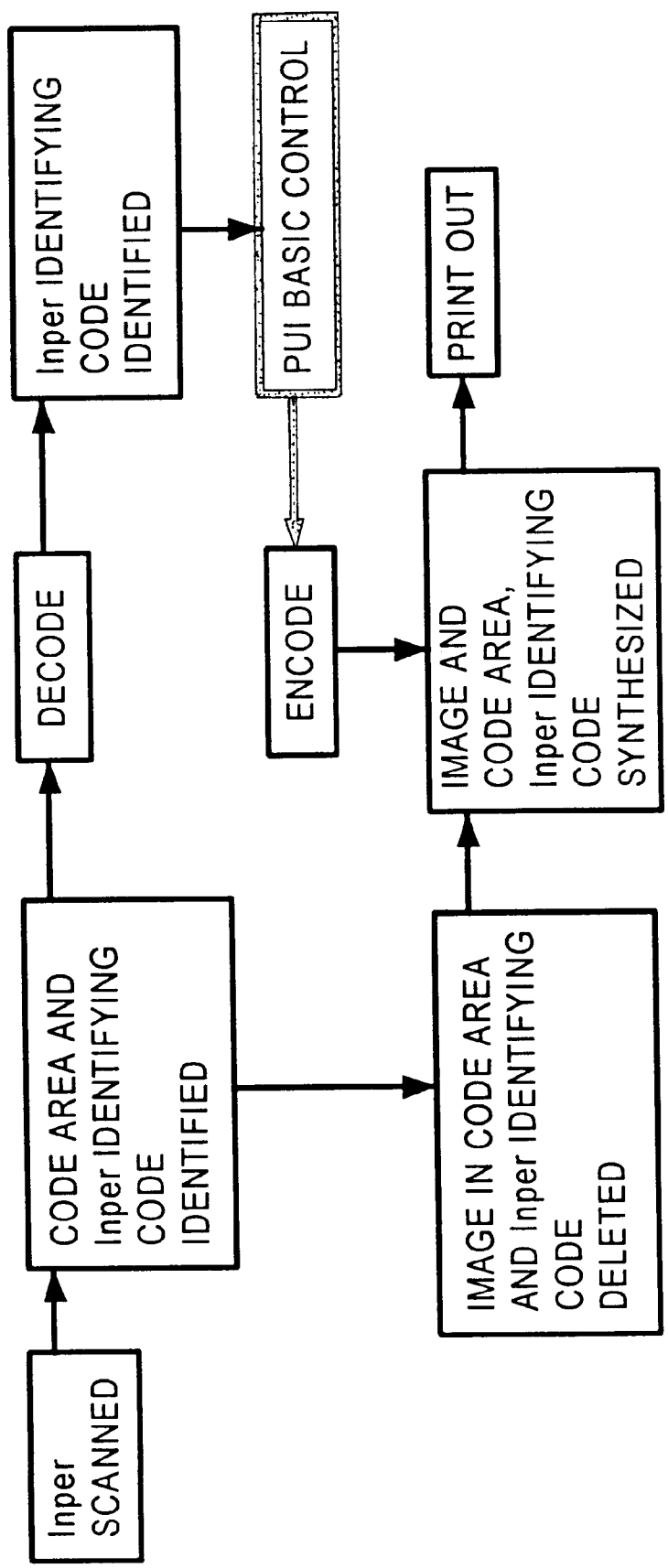
FIG. 61 is an explanatory view showing an example of the sequence in a case where it is identified whether data is Inper or not by using Inper identifying code.

FIG. 61, together with the preceding Figs., shows a sequential example in a case where it is identified whether the Inper is Inper 3201 or not with Inper identifying code 4701. As shown in figure, it is identified that the Inper is Inper 3201 according to the Inper identifying code 4701, and then a PUI basic control (recognition of selected data, linking data, and related data, and searching of the related data) is carried out.

FIG. 62, together with the preceding Figs., shows a sequential example in a case where Inper 3201 not used yet is prepared from the Inper 3201 used once. In a case where Inper 3201 is actually used, there occurs a case where the identical Inper 3201 is used a plurality of times, namely a case where the Inper 3201 added thereto a mark (selection data) and used once is repeatedly used. For this reason, it is required that the used Inper 3201 is recovered and a new (not marked thereon yet) Inper 3201 has to be provided. In this case, it is desirable to store data of the Inper 3201 itself in a code area 3206 by encoding it to output new Inper 3201, but the capacity of the code area 3206 is limited, so that efficiency in this method is not good. Accordingly, as shown in FIG. 62, together with the preceding Figs., an image in which marks (selection data), the code area 3206, and Inper identifying code 4701 are eliminated from the image in which the Inper 3201 is read out by the reading means 3102 is prepared, and at the same time, for the code area 3206 and Inper identifying code 4701, an image decoded once for recognition is again encoded, is synthesized to the image after the elimination, and are outputted by the outputting means. With this feature, new Inper 3201 can be prepared without loosing the data.

[Effects of Embodiments]

With Embodiment 1 to Embodiment 7 as described above, additional detailed data related to words, texts, symbols, or graphics each written on medium paper 3101 are stored in an invisible form on the medium paper 3101, and additional data (related data) which a user requires can electronically be taken out by marking (adding selection data to the data) corresponding description data on the medium paper 3101. Document data to be primarily informed and additional document data (related data) related to the document data are recorded on the identical paper (medium paper), so that the desired related data can be searched with the description data (Dicons) in the document data on the medium paper to be primarily informed. Also, a hyper text (a paper hyper text) with a paper document can be realized, which makes it possible to provide a new method of utilizing a paper document, and also to improve convenience of the paper document.

Also, related data is written on the medium paper 3101 itself, so that such a large-scaled system configuration as to which related data is searched by linking another recording medium for taking it out is not required. Namely, all we need for obtaining data may be medium paper 3101, a digital copying machine or a scanner, and a printer, and for this reason, required related data can be taken out with a simple configuration thereof.

In a case where related data itself is outputted as medium paper 3101, further additional data (related data) can be taken out from the outputted related data (medium paper 3101).

Related data is recorded on the medium paper 3101 as two-dimensional bar code, so that a quantity of data for an entire document to be recorded can be increased, and also a space for storing paper documents can be reduced without being restricted to a size of a visible character.

In the document data administrating system according to the present invention, the linking data comprises description data position data for indicating positions of the description data each written on the medium paper respectively; and address data for having the description position data correspond to the related data file, so that linking data can easily be prepared.

In the document data administrating system according to the present invention, the linking data comprises description position data for indicating positions of the description data each written on the medium paper respectively; and description recognizing data for recognizing description data each written on a position in the description position data, so that linking data can easily be prepared, which makes it possible to further correspond to a large-scaled system.

In the document data administrating system according to the present invention, the related data file includes, as data related to the particular words, texts, symbols, and graphics, at least one piece of description data comprising any of words, texts, symbols, and graphics and linking data for linking the description data to other related data files in the filing means or, so that the outputted related data file can be used as the medium paper. Also data can be linked between the medium papers.

In the document data administrating system according to the present invention, the related data file includes, as data related to the particular words, texts, symbols, and graphics, at least one piece of description data comprising any of words, texts, symbols, and graphics linking data for linking the description data to other related data files in the filing means, and document identifying data for identifying documents each recorded in the related data file or, so that the outputted related data file can be used as the medium paper. Also data can be linked between the medium papers.

In the document data administrating system according to the present invention, the linking data can link one of the description data to a plurality of related data files in the filing means, so that a range of searching and reference thereof with medium paper is extended, and furthermore the convenience of the system can be improved.

In the document data administrating system according to the present invention, the linking data can link a plurality of description data to one of the related data files in the filing means, so that the convenience can be improved. A range of searching and reference thereof with medium paper is extended, and furthermore the convenience of the system can be improved.

In the document data administrating system according to the present invention, the outputting means outputs the related data file to a recorded paper, and the recorded paper outputted by the outputting means can be used as medium paper, so that a range of searching and reference thereof with medium paper is extended, and furthermore the convenience of the system can be improved.

In the document data administrating system according to the present invention, the description data constitutes one portion of the document recorded in the medium paper, so that the medium paper can be handled on its appearance in the same manner as an ordinary document can be, which makes it possible to improve the convenience thereof.

In the document data administrating system according to the present invention, the outputting means outputs document identifying data read out by the reading means in addition to an output of the related data file, so that the outputted related data file is a document related to which of the medium paper can easily be determined.

In the document data administrating system according to the present invention, the outputting means outputs description data selected by the selection data in addition to an output of the related data file, so that the outputted related data file is a document related to which of the medium paper can easily be determined.

In the document data administrating system according to the present invention, the outputting means and reading means constitute a copying device with a printer and a scanner integrated therein, so that the system can be constructed with a simple configuration. Also, works required when the reading means is used and those required when the outputting means is used can be carried out with the identical device, which makes it possible to improve the workability of a user.

In the document data administrating system according to the present invention, the outputting means is a printer, so that the system can be constructed with low costs.

In the document data administrating system according to the present invention, the outputting means is a color printer, so that related data file can be outputted in color, which makes it possible to improve the convenience thereof.

In the document data administrating system according to the present invention, the outputting means is a display screen, so that related data file can be outputted in low-cost configuration. Also, moving pictures can be handled as the contents of data for the related data file, which makes it possible to further improve the convenience thereof.

In the document data administrating system according to the present invention, a device constituting the outputting means is different from that constituting the reading means, so that the system can easily be extended and modified.

In the document data administrating system according to the present invention, the reading means, filing means and outputting means are connected to each other through a network line, so that it is possible to freely arrange each means therein, and also to constitute each means by using usable resources connected to the network line.

In the document data administrating system according to the present invention, the selection data is a mark written with a marker or the like, so that description data can easily be selected. Also a particular means for recording selection data is not required, and for this reason the system can be constructed with low costs.

In the document data administrating system according to the present invention, the description data itself can visually be identified as such when compared to words, texts, symbols, and graphics other than the description data recorded on the medium paper, so that description data can easily be selected.

In the document data administrating system according to the present invention, the description data itself can not visually be identified as such when compared to words, texts, symbols, and graphics other than the description data recorded on the medium paper, so that complication of the medium paper can be prevented even in a case where a number of description data exist on the medium paper.

In the document data administrating system according to the present invention, the linking data is recorded at a specified position on the medium paper in a two-dimensional bar code system, so that linking data can easily be read out. Also data not required for a user can be hidden.

In the method of administrating document data according to the present invention, the linking data comprises description position data for indicating positions of description data respectively on the medium paper, and address data for having the description position data correspond to the related data file, so that linking data can easily be prepared.

In the method of administrating document data according to the present invention, the linking data comprises description position data for indicating positions of description data respectively on the medium paper, and description recognizing data for recognizing description data each written at a position in the description position data, so that linking data can easily be prepared, which makes it possible to further correspond to a large-scaled system.

In the method of administrating document data according to the present invention, the related data file includes, as data related to the particular words, texts, symbols, and graphics, at least one piece of description data comprising any of words, texts, symbols, and graphics and linking data for linking the description data to other related data files, so that the outputted related data file can be used as the medium paper. Also data can be linked between the medium papers.

In the method of administrating document data according to the present invention, the related data file includes, as data related to the particular words, texts, symbols, and graphics, at least one piece of description data comprising any of words, texts, symbols, and graphics linking data for linking the data to another related data file, and document identifying data for identifying documents each recorded in the related data file, so that the outputted related data file can be used as the medium paper. Also data can be linked between the medium papers.

In the method of administrating document data according to the present invention, the linking data can link one of the description data to a plurality of related data files, so that a range of searching and reference thereof with medium paper is extended, and furthermore the convenience of the system can be improved.

In the method of administrating document data according to the present invention, the linking data can link a plurality of description data to one of the related data files, so that a range of searching and reference thereof with medium paper is extended, and furthermore the convenience of the system can be improved.

In the method of administrating document data according to the present invention, the fourth process outputs the related data file to a recorded paper, and the outputted recorded paper can be used as medium paper, so that a range of searching and reference thereof with medium paper is extended, and furthermore the convenience of the system can be improved.

In the method of administrating document data according to the present invention, the description data constitutes one of the document recorded in the medium paper, so that the medium paper can be handled on its appearance in the same manner as an ordinary document can be, which makes it possible to improve the convenience thereof.

In the method of administrating document data according to the present invention, the selection data is a mark written with a marker or the like, so that description data can easily be selected. Also a particular means for recording selection data is not required, and for this reason the system can be constructed with low costs.

In the method of administrating document data according to the present invention, the description data itself can visually be identified as such when compared to words, texts, symbols, and graphics other than the description data recorded on the medium paper, so that description data can easily be selected.

In the method of administrating document data according to the present invention, the description data itself can not visually be identified as such when compared to words, texts, symbols, and graphics other than the description data recorded on the medium paper, so that complication of the medium paper can be prevented even in a case where a number of description data exist on the medium paper.

In the document data administrating system according to the present invention, the linking data comprises description position data for indicating positions of the description data each written on the medium paper respectively; and address data for having the description position data correspond to the related data, so that related data can be taken out without fail according to the linking data.

In the document data administrating system according to the present invention, the linking data comprises description position data for indicating positions of the description data each written on the medium paper respectively; and description recognizing data for recognizing description data each written on a position in the description position data, so that related data can be taken out without fail according to the linking data.

In the document data administrating system according to the present invention, the outputting means outputs the related data to a recorded paper, and the recorded paper outputted by the outputting means can be used as medium paper, so that, by using again the outputted recorded paper as medium paper, the related data can further be taken out from this medium paper.

In the document data administrating system according to the present invention, the description data constitutes one portion of the document recorded on the medium paper, so that it is not required to provide a particular space for recording description data on the medium paper, which is convenient.

The document data administrating system according to the present invention comprises a sheet automatically transferring means for transferring the medium paper to the reading means, reversing the medium paper after the reading means reads out the one side of the medium paper, and transferring it again to the reading means, so that the top and rear surfaces of the medium paper can be read out by one unit of reading means, which makes it possible to construct the device with low costs and also to improve the convenience of the reading operation.

The document data administrating system according to the present invention comprises a checking means for checking whether the related data is recorded on the rear surface of the medium paper or not, and the sheet automatically transferring means, in a case where the related data is checked that it is not recorded thereon by the checking means, carries out the medium paper as it is after the reading means reads out the one side of the medium paper, while in a case where the related data is checked that it is recorded thereon, the reading means reads out one side thereof, then the transferring means reverses the medium paper to transfer it back again to the reading means, so that only required medium paper can be reversed without reversing all of the medium paper, which makes it possible to improve the efficiency of the reading operation.

In the document data administrating system according to the present invention, the reading means checks whether the medium paper is the top surface or rear one thereof from the data on one side of the medium paper initially read out, and in a case of the rear surface, the reading means controls the sheet automatically transferring means to have the medium paper reversed, and reads out the surface thereof, then has the transferring means reverse again the medium paper and reads out the rear surface thereof, so that the medium paper can correctly be read out in the order of the top surface and the rear surface thereof even in a case that the medium paper is not correctly set.

In the document data administrating system according to the present invention, the reading means comprises a first reading section for reading the data recorded on the surface of the medium paper; and a second reading section for reading the data recorded on the rear surface thereof, and further comprises a transferring means for transferring the medium paper to the first reading section, then transferring it to the second reading section, so that data can be read out at high speed without reversing the medium paper.

In the document data administrating system according to the present invention, the related data is recorded on both of the top surface and rear surface of the medium paper, so that more related data can be recorded thereon, and furthermore the convenience thereof can be improved.

In the document data administrating system according to the present invention, the outputting means outputs the description data selected by the selection data in addition to an output of the related data, so that a relation in correspondence of the outputted related data to the description data is made clear, and the convenience thereof can be improved.

In the document data administrating system according to the present invention, a device constituting the outputting means is different from that constituting the reading means, so that the system can easily be extended and modified.

In the document data administrating system according to the present invention, the outputting means outputs the corresponding related data and the image on the medium paper onto different papers respectively, so that data sources (medium paper) of a plurality of outputted related data can clearly be identified with a small amount of sheets of paper even in a case where a plurality of description data are specified at one time and a plurality of related data are outputted.

The document data administrating system according to the present invention comprises a synthesizing means for receiving the corresponding related data searched by the searching means and the image on the medium paper read out by the reading means, and synthesizing the corresponding related data to the image on the medium paper, and the synthesizing means synthesizes the corresponding data close to the selection data in the image on the medium paper, and the outputting means outputs the synthesized image by the synthesizing means, so that a relation in correspondence of the outputted related data to the description data is made clear, and the convenience thereof can be improved.

The document data administrating system according to the present invention comprises a synthesizing means for receiving the corresponding related data searched by the searching means and the image on the medium paper read out by the reading means, and synthesizing the corresponding related data to the image on the medium paper, and the synthesizing means synthesizes the corresponding data in the image on the medium paper as a footnote, and the outputting means outputs the synthesized image by the synthesizing means, so that a relation in correspondence of the outputted related data to the description data is made clear, and the convenience thereof can be improved.

The document data administrating system according to the present invention comprises a synthesizing means for receiving the corresponding related data searched by the searching means and the image on the medium paper read out by the reading means, and synthesizing the corresponding related data to the image on the medium paper, and the synthesizing means synthesizes the corresponding data at a position immediately after the selected description data in the image on the medium paper, and the outputting means outputs the synthesized image by the synthesizing means, so that a relation in correspondence of the outputted related data to the description data is made clear, and the convenience thereof can be improved.

In the document data administrating system according to the present invention, the medium paper identifying means and the reading means comprise the identical device, so that the system can be simplified.

In the document data administrating system according to the present invention, a device constituting the medium paper identifying means is different from that constituting the reading means, so that the system can easily be extended and modified.

In the document data administrating system according to the present invention, the related data is data recorded with one-dimensional bar code or two-dimensional bar code, and the searching means converts data recorded therewith to image data and outputs the image data to the outputting means, so that a large quantity of related data can be recorded on the medium paper.

In the document data administrating system according to the present invention, the related data is recorded with invisible ink or toner readable with invisible lights, so that visibility (readability) of data as a document for medium paper can further be improved. Also, the medium paper can be handled on its appearance in the same manner as an ordinary document can be, and dispensable medium paper can also be used for memos or the like, which makes it possible to effectively utilize paper resources.

In the document data administrating system according to the present invention, the linking data and related data are data each recorded with one-dimensional bar code or two-dimensional bar code, so that a number of linking data and related data can be recorded on the medium paper.

In the document data administrating system according to the present invention, the linking data and related data are recorded each with invisible ink or toner readable with invisible lights, so that visibility (readability) of data as a document for medium paper can further be improved. Also, the medium paper can be handled on its appearance in the same manner as an ordinary document can be, and dispensable medium paper can also be used for memos or the like, which makes it possible to effectively utilize paper resources.

In the method of administrating document data according to the present invention, the related data recorded on the medium paper is data recorded with one-dimensional bar code or two-dimensional bar code, and the related data outputted from the third process is one obtained by converting the data recorded therewith into image data, so that a number of related data can be recorded on the medium paper.

In the method of administrating document data according to the present invention, the linking data comprises description position data for indicating positions of the description data each written on the medium paper respectively; and address data for having the description position data correspond to the related data, so that related data can be taken out without fail according to the linking data.

In the method of administrating document data according to the present invention, the linking data comprises description position data for indicating positions of the description data each written on the medium paper respectively; and description recognizing data for recognizing description data each written on a position in the description position data, so that related data can be taken out without fail according to the linking data.

In the method of administrating document data according to the present invention, the description data constitutes one portion of the document recorded on the medium paper, so that it is not required to provide a particular space for recording description data on the medium paper, which is convenient.

In the method of administrating document data according to the present invention, the related data is recorded on both of the top surface and rear surface of the medium paper, so that more related data can be recorded thereon, and the convenience thereof can further be improved.

The method of administrating document data according to the present invention comprises a fourth process for receiving the corresponding related data and the image on the read-out medium paper, and synthesizing the corresponding related data close to the selection data in the image on the medium paper, and the image synthesized in the fourth process is outputted in the third process, so that a relation of correspondence of the outputted related data to the description data is made clearer, and the convenience thereof can be improved.

The method of administrating document data according to the present invention comprises a fourth process for receiving the corresponding related data and the image on the read-out medium paper, and synthesizing the corresponding related data in the image on the medium paper as a footnote, and the image synthesized in the fourth process is outputted in the third process, so that a relation of correspondence of the outputted related data to the description data is made clearer, and the convenience thereof can be improved.

The method of administrating document data according to the present invention comprises a fourth process for receiving the corresponding related data and the image on the read-out medium paper, and synthesizing the corresponding related data at a position immediately after the selected description data in the image on the medium paper, and the image synthesized in the fourth process is outputted in the third process, so that a relation of correspondence of the outputted related data to the description data is made clearer, and the convenience thereof can be improved.

In the method of administrating document data according to the present invention, the one side of the medium paper is read out in the second process, then the medium paper is reversed and read out again, so that the medium paper can automatically be read out, and the convenience thereof can be improved.

In the method of administrating document data according to the present invention, it is checked in the second process as to whether the related data is recorded on the rear surface of the medium paper or not, and if it is checked that the related data is not recorded thereon, the one side of the medium paper is read out, then the medium paper is carried out as it is, while in a case where it is checked that the related data is recorded thereon, one side thereof is read out in the second process, then the medium paper is reversed and read out again, so that only required description data can be reversed without reversing all of the document paper, which makes it possible to improve the efficiency of the reading operation.

In the method of administrating document data according to the present invention, it is identified in the second process as to whether the medium paper is the top surface or rear surface thereof from the data on one side of the medium paper initially read out, and in a case of the rear surface, the medium paper is reversed, and the surface thereof is read out, and then the medium paper is reversed again and the rear surface thereof is read out, so that the medium paper can correctly be read out in the order of the top surface and the rear surface thereof even in a case where the medium paper is not accurately set on the device.

In the method of administrating document data according to the present invention, in the second process, data on the surface of the medium paper is read out by a first reading section for reading the data recorded on the surface thereof, and then data recorded on the rear surface thereof is read out by a second reading section for reading data recorded on the rear surface thereof, so that data can be read out at high speed without reversing the medium paper.

In the method of administrating document data according to the present invention, the related data recorded on the medium paper is data recorded with one-dimensional bar code or two-dimensional bar code, and the related data outputted from the third process is one obtained by converting the data recorded therewith into image data, so that a number of related data can be recorded on the medium paper.

In the method of administrating document data according to the present invention, the linking data and/or related data are recorded each with invisible ink or toner readable with invisible lights, and are data recorded with one-dimensional bar code or two-dimensional bar code, so that a number of linking data and related data can be recorded on the medium paper.

This application is based on Japanese patent application No. HEI 7-242747 filed in the Japanese Patent Office on Sep. 21, 1995, and Japanese patent application No. HEI 7-338187 filed in the Japanese Patent Office on Dec. 2, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A document data administrating system comprising:
   a filing means for previously storing therein data related to particular words, texts, symbols or graphics as related data files;
   medium paper on which is recorded in a first recording area or areas at least one piece of description data comprising any of words, texts, symbols, and graphics; and in at least one other recording area linking data for linking said description data to the related data file in said filing means; and selection data for selecting particular description data among said description data are recorded;
   a reading means for reading said selection data and said linking data from said medium paper;
   a searching means for searching a corresponding related data file from said filing means according to the selection data and linking data read out by said reading means; and
   an outputting means for outputting the related data file searched by said searching means.

2. A document data administrating system according to claim 1, wherein said linking data comprises description position data for indicating positions of the description data each written on said medium paper respectively; and address data for having said description position data correspond to said related data file.

3. A document data administrating system according to claim 1, wherein said linking data comprises description position data for indicating positions of the description data each written on said medium paper respectively; and description recognizing data for recognizing description data each written on a position in said description position data.

4. A document data administrating system according to claim 1, wherein said related data file includes, as data related to said particular words, texts, symbols, and graphics, at least one piece of description data comprising any of words, texts, symbols, and graphics and linking data for linking said description data to other related data files in said filing means.

5. A document data administrating system according to claim 1, wherein said related data file includes, as data related to said particular words, texts, symbols, and graphics, at least one piece of description data comprising any of words, texts, symbols, and graphics linking data for linking said description data to other related data files in said filing means, and document identifying data for identifying documents each recorded in the related data file.

6. A document data administrating system according to claim 1, wherein said linking data can link one of the description data with a plurality of related data files in said filing means.

7. A document data administrating system according to claim 1, wherein said linking data can link a plurality of description data to one of the related data files in said filing means.

8. A document data administrating system according to claim 1, wherein said outputting means outputs said related data file to a recorded paper, and the recorded paper outputted by said outputting means can be used as medium paper.

9. A document data administrating system according to claim 1, wherein said description data constitutes one portion of the document recorded in said medium paper.

10. A document data administrating system according to claim 1, wherein said outputting means outputs document identifying data read by said reading means in addition to an output of said related data file.

11. A document data administrating system according to claim 1, wherein said outputting means outputs description data selected by said selection data in addition to an output of said related data file.

12. A document data administrating system according to claim 1, wherein said outputting means and reading means constitute a copying device with a printer and a scanner integrated therein.

13. A document data administrating system according to claim 1, wherein said outputting means is a printer.

14. A document data administrating system according to claim 1, wherein said outputting means is a color printer.

15. A document data administrating system according to claim 1, wherein said outputting means is a display screen.

16. A document data administrating system according to claim 1, wherein a device constituting said outputting means is different from that constituting said reading means.

17. A document data administrating system according to claim 1, wherein said reading means, filing means and outputting means are connected to each other through a network line.

18. A document data administrating system according to claim 1, wherein said selection data is a mark written with a marker or the like.

19. A document data administrating system according to claim 1, wherein said description data itself can visually be identified as such when compared to words, texts, symbols, and graphics other than the description data recorded on said medium paper.

20. A document data administrating system according to claim 1, wherein said description data itself can not visually be identified as such when compared to words, texts, symbols, and graphics other than the description data recorded on said medium paper.

21. A document data administrating system according to claim 1, wherein said linking data is recorded at a specified position on said medium paper in a two-dimensional bar code system.

22. A document data administrating system comprising:

a filing means for previously storing therein data related to particular words, texts, symbols or graphics as related data files;

medium paper on which is recorded in a first recording area or areas at least one piece of description data comprising any of words, texts, symbols, and graphics, and in at least one other recording area linking data for linking said description data to the related data file in said filing means, selection data for selecting particular description data among said description data, and document identifying data for identifying the recorded document are recorded;

a reading means for reading said selection data, linking data, and document identifying data from said medium paper;

a searching means for searching a corresponding related data file from said filing means according to the selection data, linking data, and document identifying data read out by said reading means; and an outputting means for outputting the related data file searched by said searching means.

23. A document data administrating system according to claim 22, wherein said linking data comprises description position data for indicating positions of the description data each written on said medium paper respectively; and address data for having said description position data correspond to said related data file.

24. A document data administrating system according to claim 22, wherein said linking data comprises description position data for indicating positions of the description data each written on said medium paper respectively; and description recognizing data for recognizing description data each written on a position in said description position data.

25. A document data administrating system according to claim 22, wherein said related data file includes, as data related to said particular words, texts, symbols, and graphics, at least one piece of description data comprising any of words, texts, symbols, and graphics and linking data for linking said description data to other related data files in said filing means.

26. A document data administrating system according to claim 22, wherein said related data file includes, as data related to said particular words, texts, symbols, and graphics, at least one piece of description data comprising any of words, texts, symbols, and graphics linking data for linking said description data to other related data files in said filing means, and document identifying data for identifying documents each recorded in the related data file.

27. A document data administrating system according to claim 22, wherein said linking data can link one of the description data with a plurality of related data files in said filing means.

28. A document data administrating system according to claim 22, wherein said linking data can link a plurality of description data to one of the related data files in said filing means.

29. A document data administrating system according to claim 22, wherein said outputting means outputs said related data file to a recorded paper, and the recorded paper outputted by said outputting means can be used as medium paper.

30. A document data administrating system according to claim 22, wherein said description data constitutes one portion of the document recorded in said medium paper.

31. A document data administrating system according to claim 22, wherein said outputting means outputs document identifying data read by said reading means in addition to an output of said related data file.

32. A document data administrating system according to claim 22, wherein said outputting means outputs description data selected by said selection data in addition to an output of said related data file.

33. A document data administrating system according to claim 22, wherein said outputting means and reading means constitute a copying device with a printer and a scanner integrated therein.

34. A document data administrating system according to claim 22, wherein said outputting means is a printer.

35. A document data administrating system according to claim 22, wherein said outputting means is a color printer.

36. A document data administrating system according to claim 22, wherein said outputting means is a display screen.

37. A document data administrating system according to claim 22, wherein a device constituting said outputting means is different from that constituting said reading means.

38. A document data administrating system according to claim 22, wherein said reading means, filing means and outputting means are connected to each other through a network line.

39. A document data administrating system according to claim 22, wherein said selection data is a mark written with a marker or the like.

40. A document data administrating system according to claim 22, wherein said description data itself can visually be identified as such when compared to words, texts, symbols, and graphics other than the description data recorded on said medium paper.

41. A document data administrating system according to claim 22, wherein said description data itself can not visually be identified as such when compared to words, texts, symbols, and graphics other than the description data recorded on said medium paper.

42. A document data administrating system according to claim 22, wherein said linking data is recorded at a specified position on said medium paper in a two-dimensional bar code system.

43. A method of administrating document data comprising:
- a first process for previously storing therein data related to particular words, texts, symbols or graphics as related data files;
- a second process for reading selection data and linking data from medium paper on which is recorded in a first recording area or areas at least one piece of description data comprising any of words, texts, symbols, and graphics, and in at least one other recording area linking data for linking said description data to the related data file in said filing means, and selection data for selecting particular description data among said description data are recorded;
- a third process for searching a corresponding related data file from the stored related data files according to the read-out selection data and linking data; and
- a fourth process for outputting the searched related data file.

44. A method of administrating document data according to claim 43, wherein said linking data comprises description position data for indicating positions of description data respectively on said medium paper, and address data for having said description position data correspond to said related data file.

45. A method of administrating document data according to claim 43, wherein said linking data comprises description position data for indicating positions of description data respectively on said medium paper, and description recognizing data for recognizing a description data written at a position in said description position data.

46. A method of administrating document data according to claim 43, wherein said related data file includes, as data related to said particular words, texts, symbols, and graphics, at least one piece of description data comprising any of words, texts, symbols, and graphics and linking data for linking said description data to other related data files.

47. A method of administrating document data according to claim 43, wherein said related data file includes, as data related to said particular words, texts, symbols, and graphics, at least one piece of description data comprising any of words, texts, symbols, and graphics linking data for linking said description data to another related data file, and document identifying data for identifying documents each recorded in the related data file.

48. A method of administrating document data according to claim 43, wherein said linking data can link one of the description data to a plurality of related data files.

49. A method of administrating document data according to claim 43, wherein said linking data can link a plurality of description data to one of the related data files.

50. A method of administrating document data according to claim 43, wherein said fourth process outputs said related data file to a recorded paper, and the outputted recorded paper can be used as medium paper.

51. A method of administrating document data according to claim 43, wherein said description data constitutes one portion of the document recorded in said medium paper.

52. A method of administrating document data according to claim 43, wherein said selection data is a mark written with a marker or the like.

53. A method of administrating document data according to claim 43, wherein said description data itself can visually be identified as such when compared to words, texts, symbols, and graphics other than the description data recorded on said medium paper.

54. A method of administrating document data according to claim 43, wherein said description data itself can not visually be identified as such when compared to words, texts, symbols, and graphics other than the description data recorded on said medium paper.

55. A method of administrating document data comprising:
- a first process for previously storing therein data related to particular words, texts, symbols or graphics as related data files;
- a second process for reading selection data, linking data, and document identifying data from medium paper on which is recorded in a first recording area or areas at least one piece of description data comprising any of words, texts, symbols, and graphics, and in at least one other recording area linking data for linking said description data to the related data file in said filing means, selection data for selecting particular description data from said description data, and document identifying data for identifying the recorded document are recorded;
- a third process for searching a corresponding related data file from the stored related data files according to the read-out selection data, linking data, and document identifying data; and
- a fourth process for outputting the searched related data file.

56. A method of administrating document data according to claim 55, wherein said linking data comprises description position data for indicating positions of description data respectively on said medium paper, and address data for having said description position data correspond to said related data file.

57. A method of administrating document data according to claim 55, wherein said linking data comprises description position data for indicating positions of description data respectively on said medium paper, and description recognizing data for recognizing a description data written at a position in said description position data.

58. A method of administrating document data according to claim 55, wherein said related data file includes, as data related to said particular words, texts, symbols, and graphics, at least one piece of description data comprising any of words, texts, symbols, and graphics and linking data for linking said description data to other related data files.

59. A method of administrating document data according to claim 55, wherein said related data file includes, as data related to said particular words, texts, symbols, and graphics, at least one piece of description data comprising any of words, texts, symbols, and graphics linking data for linking said description data to another related data file, and document identifying data for identifying documents each recorded in the related data file.

60. A method of administrating document data according to claim 55, wherein said linking data can link one of the description data to a plurality of related data files.

61. A method of administrating document data according to claim 55, wherein said linking data can link a plurality of description data to one of the related data files.

62. A method of administrating document data according to claim 55, wherein said fourth process outputs said related data file to a recorded paper, and the outputted recorded paper can be used as medium paper.

63. A method of administrating document data according to claim 55, wherein said description data constitutes one portion of the document recorded in said medium paper.

64. A method of administrating document data according to claim 55, wherein said selection data is a mark written with a marker or the like.

65. A method of administrating document data according to claim 55, wherein said description data itself can visually be identified as such when compared to words, texts, symbols, and graphics other than the description data recorded on said medium paper.

66. A method of administrating document data according to claim 55, wherein said description data itself can not visually be identified as such when compared to words, texts, symbols, and graphics other than the description data recorded on said medium paper.

67. A document data administrating system comprising:

medium paper on which is recorded in a first recording area or areas at least one piece of related data comprising data related to particular words, texts, symbols, and graphics, at least one piece of description data comprising any of words, texts, symbols, and graphics, and in at least one other recording area linking data for linking said description data to said related data, and selection data for selecting particular description data among said description data are recorded;

a reading means for reading said selection data, said linking data, and related data from said medium paper;

a searching means for searching the corresponding related data from said related data according to the selection data and linking data read out by said reading means; and an outputting means for outputting the related data file searched by said searching means.

68. A document data administrating system according to claim 67, wherein said related data is recorded on both of the top surface and rear surface of said medium paper.

69. A document data administrating system according to claim 67, wherein said outputting means outputs the description data selected by said selection data in addition to an output of said related data.

70. A document data administrating system according to claim 67, wherein a device constituting said outputting means is different from that constituting said reading means.

71. A document data administrating system according to claim 67, wherein said related data is data recorded with one-dimensional bar code or two-dimensional bar code, and said searching means converts data recorded therewith to image data and outputs the image data to said outputting means.

72. A document data administrating system according to claim 67, wherein said related data is recorded with invisible ink or toner readable with invisible lights.

73. A document data administrating system according to claim 67, wherein said linking data and related data are data each recorded with one-dimensional bar code or two-dimensional bar code.

74. A document data administrating system according to claim 67, wherein said linking data and related data are recorded each with invisible ink or toner readable with invisible lights.

75. A document data administrating system according to claim 67, wherein said linking data comprises description position data for indicating positions of the description data each written on said medium paper respectively; and address data for having said description position data correspond to said related data.

76. A document data administrating system according to claim 67, wherein said linking data comprises description position data for indicating positions of the description data each written on said medium paper respectively, and description recognizing data for recognizing description data each written on a position in said description position data.

77. A document data administrating system according to claim 67, wherein said outputting means outputs said related data to a recorded paper, and the recorded paper outputted by said outputting means can be used as medium paper.

78. A document data administrating system according to claim 67, wherein said description data constitutes one portion of the document recorded on said medium paper.

79. A document data administrating system comprising:

medium paper on which is recorded in a first recording area or areas at least one piece of related data comprising data related to particular words, texts, symbols, and graphics; at least one piece of description data comprising any of words, texts, symbols, and graphics; and in at least one other recording area linking data for linking said description data to said related data; and selection data for selecting particular description data among said description data are recorded;

a reading means for reading said selection data, said linking data, and related data from said medium paper;

a searching means for searching the corresponding related data from said related data according to the selection data and linking data read out by said reading means; and an outputting means for outputting the related data file searched by said searching means, wherein said related data is recorded on the rear surface of said medium paper.

80. A document data administrating system according to claim 79, wherein said reading means comprises a first reading section for reading the data recorded on the surface of said medium paper; and a second reading section for reading the data recorded on the rear surface thereof, and further comprises a transferring means for transferring said medium paper to said first reading section, then transferring it to said second reading section.

81. A document data administrating system according to claim 79, wherein said related data is recorded on both of the top surface and rear surface of said medium paper.

82. A document data administrating system according to claim 79, wherein said outputting means outputs the description data selected by said selection data in addition to an output of said related data.

83. A document data administrating system according to claim 79, wherein a device constituting said outputting means is different from that constituting said reading means.

84. A document data administrating system according to claim 79, wherein said related data is data recorded with one-dimensional bar code or two-dimensional bar code, and said searching means converts data recorded therewith to image data and outputs the image data to said outputting means.

85. A document data administrating system according to claim 79, wherein said related data is recorded with invisible ink or toner readable with invisible lights.

86. A document data administrating system according to claim 79, wherein said linking data and related data are data each recorded with one-dimensional bar code or two-dimensional bar code.

87. A document data administrating system according to claim 79, wherein said linking data and related data are recorded each with invisible ink or toner readable with invisible lights.

88. A document data administrating system according to claim 79 comprising a sheet automatically transferring means for transferring said medium paper to said reading means, and reversing said medium paper after said reading means reads out the one side of said medium paper, and transferring it again to said reading means.

89. A document data administrating system according to claim 88, wherein said reading means checks whether said medium paper is the top surface or rear one thereof from the data on the side of said medium paper initially read out, and in a case of the rear surface, the reading means controls said sheet automatically transferring means to have said medium paper reversed, and reads out the surface thereof, then has the transferring means reverse again said medium paper and reads out the rear surface thereof.

90. A document data administrating system according to claim 88 comprising a checking means for checking whether said related data is recorded on the rear surface of said medium paper or not, wherein said sheet automatically transferring means, in a case where said related data is checked that it is not recorded thereon by said checking means, carries out the medium paper as it is after said reading means reads out the one side of said medium paper, while in a case where said related data is checked that it is recorded thereon, said reading means reads out one side thereof, then said transferring means reverses said medium paper to carry it back again to said reading means.

91. A document data administrating system according to claim 90, wherein said reading means checks whether said medium paper is the top surface or rear one thereof from the data on the side of said medium paper initially read out, and in a case of the rear surface, the reading means controls said sheet automatically transferring means to have said medium paper reversed, and reads out the surface thereof, then has the transferring means reverse again said medium paper and reads out the rear surface thereof.

92. A document data administrating system according to claim 79, wherein said reading means comprises a first reading section for reading the data recorded on the surface of said medium paper; and a second reading section for reading the data recorded on the rear surface thereof, and further comprises a transferring means for transferring said medium paper to said first reading section, then transferring it to said second reading section.

93. A document data administrating system according to claim 79, wherein said related data is recorded on both of the top surface and rear surface of said medium paper.

94. A document data administrating system according to claim 79, wherein said outputting means outputs the description data selected by said selection data in addition to an output of said related data.

95. A document data administrating system according to claim 79, wherein a device constituting said outputting means is different from that constituting said reading means.

96. A document data administrating system comprising:
  medium paper on which is recorded in a first recording area or areas at least one piece of related data comprising data related to particular words, texts, symbols, and graphics; at least one piece of description data comprising any of words, texts, symbols, and graphics, and in at least one other recording area linking data for linking said description data to said related data, and selection data for selecting particular description data among said description data are recorded;
  a reading means for reading said selection data, said linking data, and related data from said medium paper;
  a searching means for searching the corresponding related data from said related data according to the selection data and linking data read out by said reading means; and
  an outputting means for outputting the related data file searched by said searching means and an image on the medium paper read out by said reading means.

97. A document data administrating system according to claim 96, wherein said outputting means outputs said corresponding related data and the image on said medium paper onto different papers respectively.

98. A document data administrating system according to claim 96 comprising a synthesizing means for receiving said corresponding related data searched by said searching means and the image on the medium paper read out by said reading means, and synthesizing said corresponding related data to the image on said medium paper, wherein said synthesizing means synthesizes said corresponding data close to the selection data in the image on said medium paper, and said outputting means outputs the synthesized image by said synthesizing means.

99. A document data administrating system according to claim 96 comprising a synthesizing means for receiving said corresponding related data searched by said searching means and the image on the medium paper read out by said reading means, and synthesizing said corresponding related data to the image on said medium paper, wherein said synthesizing means synthesizes said corresponding data in the image on said medium paper as a footnote, and said outputting means outputs the synthesized image by said synthesizing means.

100. A document data administrating system according to claim 96 comprising a synthesizing means for receiving said corresponding related data searched by said searching means and the image on the medium paper read out by said reading means, and synthesizing said corresponding related data to the image on said medium paper, wherein said synthesizing means synthesizes said corresponding data at a position immediately after the selected description data in the image on said medium paper, and said outputting means outputs the synthesized image by said synthesizing means.

101. A document data administrating system according to claim 96, wherein said related data is data recorded with one-dimensional bar code or two-dimensional bar code, and said searching means converts data recorded therewith to image data and outputs the image data to said outputting means.

102. A document data administrating system according to claim 96, wherein said related data is recorded with invisible ink or toner readable with invisible lights.

103. A document data administrating system according to claim 96, wherein said linking data and related data are data each recorded with one-dimensional bar code or two-dimensional bar code.

104. A document data administrating system according to claim 96, wherein said linking data and related data are recorded each with invisible ink or toner readable with invisible lights.

105. A document data administrating system comprising:
  medium paper on which is recorded in a first recording area or areas at least one piece of related data comprising data related to particular words, texts, symbols, and graphics, at least one piece of description data comprising any of words, texts, symbols, and graphics, and in at least one other recording area linking data for linking said description data to said related data, and selection data for selecting particular description data among said description data are recorded;
  a medium paper identifying means for identifying whether a sheet of paper which is an object to be read out is said medium paper or not;
  a reading means for reading said selection data, said linking data, and related data from said medium paper in a case where it is identified that the paper is the medium paper by said medium paper identifying means;

a searching means for searching the corresponding related data from said related data according to the selection data and linking data read out by said reading means; and an outputting means for outputting the related data file searched by said searching means.

106. A document data administrating system according to claim 105, wherein said medium paper identifying means and said reading means comprise the identical device.

107. A document data administrating system according to claim 105, wherein a device constituting said medium paper identifying means is different from that constituting said reading means.

108. A document data administrating system according to claim 105, wherein said related data is data recorded with one-dimensional bar code or two-dimensional bar code, and said searching means converts data recorded therewith to image data and outputs the image data to said outputting means.

109. A document data administrating system according to claim 105, wherein said related data is recorded with invisible ink or toner readable with invisible lights.

110. A document data administrating system according to claim 105, wherein said linking data and related data are data each recorded with one-dimensional bar code or two-dimensional bar code.

111. A document data administrating system according to claim 105, wherein said linking data and related data are recorded each with invisible ink or toner readable with invisible lights.

112. A method of administrating document data comprising:

a first process for reading selection data, linking data, and related data from a medium paper on which is recorded in a first recording area or areas at least one piece of related data comprising data relating to words, texts, symbols, and graphics, at least one piece of description data comprising any of words, texts, symbols, and graphics, and in at least one other recording area linking data for linking said description data to said related data, and selection data for selecting particular description data among said description data are recorded;

a second process for searching a corresponding related data file from said related data according to the read-out selection data and linking data; and a third process for outputting the searched corresponding related data.

113. A method of administrating document data according to claim 112, wherein said related data recorded on said medium paper is data recorded with one-dimensional bar code or two-dimensional bar code, and the related data outputted from said third process is one obtained by converting the data recorded therewith into image data.

114. A method of administrating document data according to claim 112, wherein said linking data comprises description position data for indicating positions of the description data each written on said medium paper respectively; and address data for having said description position data correspond to said related data.

115. A method of administrating document data according to claim 112, wherein said linking data comprises description position data for indicating positions of the description data each written on said medium paper respectively; and description recognizing data for recognizing description data each written on a position in said description position data.

116. A method of administrating document data according to claim 112, wherein said description data constitutes one portion of the document recorded on said medium paper.

117. A method of administrating document data according to claim 112, wherein said related data is recorded on both of the top surface and rear surface of said medium paper.

118. A method of administrating document data according to claim 112, wherein the related data recorded on said medium paper is data recorded with one-dimensional bar code or two-dimensional bar code, and the related data outputted from said third process is one obtained by converting the data recorded therewith into image data.

119. A method of administrating document data according to claim 112, wherein said linking data and/or related data are recorded each with invisible ink or toner readable with invisible lights.

120. A method of administrating document data comprising:

a first process for reading selection data, linking data, and related data from a medium paper on which is recorded in a first recording area or areas at least one piece of related data comprising data relating to words, texts, symbols, and graphics, at least one piece of description data comprising any of words, texts, symbols, and graphics, and in at least one other recording area linking data for linking said description data to said related data, and selection data for selecting particular description data among said description data are recorded;

a second process for searching a corresponding related data file from said related data according to the read-out selection data and linking data ; and a third process for outputting said corresponding searched related data, wherein said related data is recorded on the rear surface of said medium paper.

121. A method of administrating document data according to claim 120, wherein said related data is recorded on both of the top surface and rear surface of said medium paper.

122. A method of administrating document data comprising:

a first process for reading selection data, linking data, and related data from a medium paper on which is recorded in a first recording area or areas at least one piece of related data comprising data relating to words, texts, symbols, and graphics, at least one piece of description data comprising any of words, texts, symbols, and graphics, and in at least one other recording area linking data for linking said description data to said related data, and selection data for selecting particular description data among said description data are recorded;

a second process for searching a corresponding related data file from said related data according to the read-out selection data and linking data; and a third process for outputting said corresponding searched related data and an image on the medium paper read out in said first process.

123. A method of administrating document data according to claim 122 comprising a fourth process for receiving said corresponding related data and the image on said read-out medium paper, and synthesizing said corresponding related data close to the selection data in the image on said medium paper, wherein the image synthesized in said fourth process is outputted in said third process.

124. A method of administrating document data according to claim 122 comprising a fourth process for receiving said corresponding related data and the image on said read-out medium paper, and synthesizing said corresponding related data in the image on said medium paper as a footnote, wherein the image synthesized in said fourth process is outputted in said third process.

125. A method of administrating document data according to claim 122 comprising a fourth process for receiving said corresponding related data and the image on said read-out medium paper, and synthesizing said corresponding related data at a position immediately after the selected description data in the image on said medium paper, wherein the image synthesized in said fourth process is outputted in said third process.

126. A method of administrating document data according to claim 122, wherein the related data recorded on said medium paper is data recorded with one-dimensional bar code or two-dimensional bar code, and the related data outputted from said third process is one obtained by converting the data recorded therewith into image data.

127. A method of administrating document data according to claim 122, wherein said linking data and/or related data are recorded each with invisible ink or toner readable with invisible lights.

128. A method of administrating document data comprising:
- a first process for identifying whether a sheet of paper for an object to be read out is specified medium paper or not;
- a second process for reading selection data, linking data, and related data from a medium paper on which, in a case where it is identified that the paper is medium paper in said first process, is recorded in a first recording area or areas at least one piece of related data comprising data relating to words, texts, symbols, and graphics, at least one piece of description data comprising any of words, texts, symbols, and graphics, and in at least one other recording area linking data for linking said description data to said related data, and selection data for selecting particular description data among said description data are recorded;
- a third process for searching a corresponding related data file from said related data according to the read-out selection data and linking data; and
- a fourth process for outputting said corresponding searched related data.

129. A method of administrating document data according to claim 128, wherein said second process reads out one side of said medium paper, then reverses said medium paper and reads it again.

130. A method of administrating document data according to claim 128, wherein said second process checks whether said related data is recorded on the rear surface of said medium paper or not and if it is checked that said related data is not recorded thereon, reads out one side of said medium paper, then carries out the medium paper as it is, while in a case where it is checked that said related data is recorded thereon, said second process reads out one side thereof, then reverses said medium paper and reads it again.

131. A method of administrating document data according to claim 128, wherein said second process identifies whether said medium paper is the top surface or rear surface thereof from the data on one side of said medium paper initially read out, and in a case of the rear surface, the second process reverses said medium paper, and reads out the surface thereof, and then reverses again said medium paper and reads out the rear surface thereof.

132. A method of administrating document data according to claim 128, wherein, in said second process, data on the surface of said medium paper is read out in a first reading section for reading out the data recorded on the surface thereof, and then data recorded on the rear surface thereof is read in a second reading section for reading data recorded on the rear surface thereof.

133. A method of administrating document data according to claim 128, wherein the related data recorded on said medium paper is data recorded with one-dimensional bar code or two-dimensional bar code, and the related data outputted from said third process is one obtained by converting the data recorded therewith into image data.

134. A method of administrating document data according to claim 128, wherein said linking data and/or related data are recorded each with invisible ink or toner readable with invisible lights.

* * * * *